United States Patent
Hanashima et al.

(10) Patent No.: US 7,236,668 B2
(45) Date of Patent: Jun. 26, 2007

(54) SPOT-SIZE TRANSFORMER, METHOD OF PRODUCING SPOT-SIZE TRANSFORMER AND WAVEGUIDE-EMBEDDED OPTICAL CIRCUIT USING SPOT-SIZE TRANSFORMER

(75) Inventors: Naoki Hanashima, Chuo-ku (JP); Reio Mochida, Chuo-ku (JP)

(73) Assignee: TDK Corporation, Chuo-ku, Tokyo (JP)

( * ) Notice: Subject to any disclaimer, the term of this patent is extended or adjusted under 35 U.S.C. 154(b) by 0 days.

(21) Appl. No.: 11/399,183

(22) Filed: Apr. 6, 2006

(65) Prior Publication Data
US 2006/0182394 A1    Aug. 17, 2006

Related U.S. Application Data

(62) Division of application No. 10/678,981, filed on Oct. 3, 2003.

(30) Foreign Application Priority Data

Oct. 8, 2002  (JP) .............................. 2002-295334
Feb. 4, 2003  (JP) .............................. 2003-026621

(51) Int. Cl.
*G02B 6/26*  (2006.01)
*G02B 6/42*  (2006.01)
*G02B 6/10*  (2006.01)

(52) U.S. Cl. .................. 385/43; 385/129; 385/130; 385/131; 385/132

(58) Field of Classification Search ............ 385/15–52, 385/129–132
See application file for complete search history.

(56) References Cited

U.S. PATENT DOCUMENTS 4,733,941 A    3/1988   Broer et al. ............. 350/96.33

(Continued)

FOREIGN PATENT DOCUMENTS

JP         63-217307         9/1988

(Continued)

OTHER PUBLICATIONS

Bakke, T. et al., "Vertically Tapered Core Polymeric Optical Spot-Size Transformer," *Electronics Letters* 37 (24):1475-1476, Nov. 2001.

(Continued)

*Primary Examiner*—Kaveh Kianni
*Assistant Examiner*—Charlie Peng
(74) *Attorney, Agent, or Firm*—Seed IP Law Group PLLC

(57) ABSTRACT

The present invention is to provide a spot-size transformer which can transform the beam spot-size in a waveguide separated by a groove and a waveguide-embedded optical circuit using the spot-size transformer. The spot-size transformer according to the present invention comprises a first optical waveguide having a first core and a first cladding covering substantially the whole surface of the first core, a second optical waveguide having a second core provided as an extension of the first cladding and a second cladding, a transition waveguide positioned between the first and second optical waveguides, the transition waveguide having a first core whose width of the extension becomes gradually narrower as it goes toward the second optical waveguide.

25 Claims, 40 Drawing Sheets

U.S. PATENT DOCUMENTS

| | | | |
|---|---|---|---|
| 5,151,955 A | 9/1992 | Ohta et al. | 385/6 |
| 5,157,746 A | 10/1992 | Tobita et al. | 385/33 |
| 6,130,778 A | 10/2000 | Iwatsuka et al. | 359/497 |
| 6,330,378 B1* | 12/2001 | Forrest et al. | 385/43 |
| 6,363,188 B1 | 3/2002 | Alphonse | 359/497 |
| 6,411,764 B1 | 6/2002 | Lee | 385/131 |
| 6,801,692 B2 | 10/2004 | Nishimura et al. | 385/49 |
| 6,813,417 B2 | 11/2004 | Oh et al. | 385/43 |
| 2002/0106159 A1 | 8/2002 | Nishimura et al. | 385/49 |
| 2002/0141682 A1 | 10/2002 | Ryu et al. | 385/14 |
| 2003/0053756 A1 | 3/2003 | Lam et al. | 385/49 |
| 2004/0264863 A1 | 12/2004 | Suzuki et al. | 385/43 |

FOREIGN PATENT DOCUMENTS

| | | |
|---|---|---|
| JP | 02-163708 | 6/1990 |
| JP | 03-063606 | 3/1991 |
| JP | 06-163874 | 6/1994 |
| JP | 07-110415 | 4/1995 |
| JP | 08-086929 | 4/1996 |
| JP | 09-265018 | 10/1997 |
| JP | 10-068910 | 3/1998 |
| JP | 10-339848 | 12/1998 |
| JP | 11-119158 | 4/1999 |
| JP | 2000-056149 | 2/2000 |
| JP | 2000-249856 | 9/2000 |
| JP | 2002-122750 | 4/2002 |
| JP | 2002182051 | 6/2002 |
| JP | 2002-519842 | 7/2002 |
| JP | 2003-533896 | 11/2003 |
| WO | 97/47998 | 12/1997 |
| WO | 02/05000 | 1/2002 |

OTHER PUBLICATIONS

Bakke, T. et al., "Polymeric Buried Core Adiabatic Optical Spot-Size Transformer," *Electronics Letters* 38 (7):319-321, Mar. 2002.

Electronics Letters, Mar. 28, 2002, vol. 38 No. 7, pp. 319-321.

Mitomi, O. et al., "Design of a Single-Mode Tapered Waveguide for Low-Loss Chip-to-Fiber Coupling," *IEEE Journal of Quantum Electronics* 30 (8):1787-1793, Aug. 1994.

Mizuno, T. et al., "Low-Loss 1.5%-Delta Arrayed Waveguide Grating with Narrow Laterally Tapered Spotsize Converter," *Electronics Letters* 37 (24):1452-1454, Nov. 2001.

Shani, Y. et al., "Efficient coupling of a semiconductor laser to an optical fiber by means of a tapered waveguide on silicon," Dec. 4, 1989, Appl. Phys. Lett. 55 (23), pp. 2389-2391.

Shani, Y. et al., "Efficient Coupling of a Semiconductor Laser to an Optical Fiber by Means of a Tapered Waveguide on Silicon," *Appl. Phys. Lett.* 55 (23):2389-2391, Dec. 1989.

Spühler, M. et al., "A Very Short Planar Silica Spot-Size Converter Using a Nonperiodic Segmented Waveguide," *Journal of Lightwave Technology* 16 (9):1680-1685, Sep. 1998.

* cited by examiner

SPOT-SIZE TRANSFORMER, METHOD OF PRODUCING SPOT-SIZE TRANSFORMER AND WAVEGUIDE-EMBEDDED OPTICAL CIRCUIT USING SPOT-SIZE TRANSFORMER

CROSS-REFERENCE TO RELATED APPLICATION

This application is a divisional of U.S. patent application Ser. No. 10/678,981, filed Oct. 3, 2003, now pending, which application is incorporated herein by reference in its entirety.

BACKGROUND OF THE INVENTION

The present invention relates to a spot-size transformer and a method of producing the same, more particularly, to a low-loss spot-size transformer and a method of producing the same. Further, the present invention relates to a waveguide-embedded optical circuit using the spot-size transformer, and particularly to a waveguide-embedded optical circuit that has low loss and can be fabricated at low cost.

DESCRIPTION OF THE PRIOR ART

In recent years, optical communication is widely utilized to transmit information at high data rate. In optical communications, an optical isolator element, an optical filter or the like is suitably inserted at a predetermined part of an optical waveguide (optical fiber or embedded type optical waveguide) to constitute an optical circuit.

FIG. 1 shows a ferrule for connecting optical fibers that is one kind of optical waveguide, and FIG. 1(*a*) is a schematic perspective of the ferrule. FIG. 1(*b*) is a cross sectional view taken along line D—D of FIG. 1(*a*). As shown in FIGS. 1 (*a*) and (*b*), a ferrule 10 is used to connect two optical fibers 11, 12, and a groove 10*a* is formed in the region of the junction between the two optical fibers. The optical fiber 11 comprises an bare fiber 11*c* consisting of a core 11*a* and a cladding 11*b* covering the core 11*a*, and a jacket 11*d* covering the bare fiber 11*c*. Similarly, the optical fiber 12 comprises an bare fiber 12*c* consisting of a core 12*a* and a cladding 12*b* covering the core 11*a*, and a jacket 12*d* covering the bare fiber 12*c*. Inside the ferrule 10, jackets 11*d*, 12*d* of the optical fibers 11, 12, are removed to expose the bare fibers 11*c*, 12*c*. The bare fiber 11*c* terminates at one side wall portion of the groove 10*a* and the element fiber 12*c* terminates at the other side wall portion of the groove 10*a*. That is, the end face of the element fiber 11*c* and the end face of the bare fiber 12*c* are opposed to each other across the groove 10*a* formed in the ferrule 10.

FIG. 2 shows an optical filter installed in the ferrule 10. FIG. 2(*a*) is a schematic perspective view thereof and FIG. 2(*b*) is a cross sectional view taken along line E—E of FIG. 2(*a*). As shown in FIGS. 2(*a*) and (*b*), light entering from one end of the optical fibers 11, 12 is filtered by the optical filter 30 inserted into the groove 10*a* in accordance with the filter characteristics and exits from the other end of the optical fibers 11, 12. It is therefore possible to extract a light of desired wavelength.

FIG. 3 shows a waveguide-embedded optical circuit, constituting a kind of an optical waveguide. FIG. 3(*a*) is a schematic perspective view thereof and FIG. 3(*b*) is a cross sectional view taken along line F—F of FIG. 3(*a*). As shown in FIGS. 3(*a*) and (*b*), the waveguide-embedded optical circuit 20 comprises a substrate 21, a cladding layer 22 formed on the substrate 21 and a core region 23 formed in the cladding layer 22. The cladding layer 22 and the core region 23 are separated by a groove 24 into a part composed of a cladding layer 22*a* and a core region 23*a*, and a part composed of a cladding layer 22*b* and a core region 23*b*. The core region 23*a* therefore terminates at one side wall portion of the groove 24 and the core region 23*b* terminates at the other side wall portion of the groove 24. That is, the end face of the core region 23*a* and the end face of the core region 23*b* are opposed to each other across the groove 24.

FIG. 4 shows an optical filter installed in the waveguide-embedded optical circuit 20. FIG. 4(*a*) is a schematic perspective thereof and FIG. 4(*b*) is a cross sectional view thereof taken along line G—G of FIG. 4(*a*). As shown in FIGS. 4(*a*) and (*b*), light entering from one end of the core regions 23*a*, 23*b* is filtered by the optical filter 30 inserted into the groove 24 formed in the cladding 22 and exits from the other end of the core region 23*a*, 23*b*. It is therefore possible to extract a light of desired wavelength.

Further, a non-reciprocal optical functional element, such as an optical isolator element, is generally constituted to have an optical isolator, such as a faraday rotator or polarizer, positioned between two lenses. Similarly, an optical filter is also generally constituted to have an optical filter element positioned between the two lenses. Such configurations are well known in the art (see, for example, JP10-68910A, JP09-68660A). However, since a so-configured optical circuit has many parts, it is difficult to miniaturize, and since it needs high precision alignment of the optical axis, the production cost becomes high. Thus, the optical circuit of the waveguide-embedded type, in which the optical functional element is directly inserted in a groove formed by separating the optical waveguide without lenses, has attracted attention.

However, when light propagates through the optical waveguide separated by the groove, loss occurs that is caused mainly by diffraction in the separated region.

FIG. 5 is a diagram for explaining this loss, and schematically shows the state of light propagation from an optical waveguide 41 consisting of a core 41*a* and a cladding 41*b* across a gap to an optical waveguide 42 consisting of a core 42*a* and a cladding 42*b*, wherein FIG. 5(*a*) shows the case of a small core size and FIG. 5(*b*) shows the case of large core size. As shown in FIGS. 5(*a*) and (*b*), since the light exiting the optical waveguide spreads owing to diffraction, diffraction loss increases as the gap "d" becomes larger. On the other hand, as can be seen from a comparison of FIG. 5(*a*) and FIG. 5(*b*), since the diffraction becomes very pronounced as the beam-spot becomes smaller, it is necessary to make the gap width narrow and enlarge the diameter of beam spot in order to reduce diffraction loss.

For this reason, when connecting two optical fibers using a ferrule, loss resulting from diffraction can be reduced if the spot-size is transformed by using a TEC (Thermally Expanded Core) fiber, i.e., a fiber whose core diameter has been locally expanded at the end. As is well known, the core in a TEC fiber is expanded by heating with a micro-burner, heater or the like. This is described in, for example, "Efficient coupling of a semiconductor laser to an optical fiber by means of a tapered waveguide on silicon" (Appl. Phys. Lett. 55(23), 4 Dec. 1989, pp 2389–2391), "Polymeric buried core adiabatic optical spot-size transformer" (ELECTRONICS LETTERS Vol. 38, No. 7, 28th Mar. 2002, pp 319–321) and "Photoinduced refractive index change in B and Ge codoped $SiO_2$ formed by TEOS-PECVD method" (The Japan Society of Applied Physics Digest 2a-ZF-3, September 1999, p 1021).

However, since the heat capacity of the waveguide-embedded optical circuit shown in FIGS. 3 and 4 is very large compared with that of an optical fiber, it is difficult to expand the diameter of a core locally by heating in the manner of a TEC fiber. Thus, in this kind of optical waveguide, there is a problem that the loss owing to the diffraction that arises in the groove in which the optical filter is inserted becomes large.

SUMMARY OF THE INVENTION

It is therefore an object of the present invention to provide a spot-size transformer which can transform the beam spot-size in a waveguide separated by a groove and a waveguide-embedded optical circuit using the spot-size transformer.

Another object of the present invention to provide a spot-size transformer that can transform the beam spot-size with low loss in a waveguide and a waveguide-embedded optical circuit using the spot-size transformer.

Further object of the present invention is to provide a method for easily forming a spot-size transformer in a waveguide-embedded optical circuit.

A spot-size transformer according to the present invention comprises a first optical waveguide having a first core and a first cladding covering substantially the whole surface of the first core, a second optical waveguide having a second core provided as an extension of the first cladding and a second cladding, a transition waveguide positioned between the first and second optical waveguides, the transition waveguide having a first core whose width of the extension becomes gradually narrower as it goes toward the second optical waveguide.

According to the present invention, since the first cladding which belongs to the first optical waveguide is used as the second core which belongs to the second optical waveguide with the transition waveguide, it is possible to expand the spot-size of the beam which propagates from the first optical waveguide to the second optical waveguide. Furthermore, since the first cladding covers substantially the whole surface of the first core, the center of the beam spot which propagates though the first optical waveguide and the center of the beam spot which propagates through the second optical waveguide does not displaced greatly, so that it is possible to transform beam spot-size with low loss.

In a preferred aspect of the present invention, each of the first optical waveguide and the second optical waveguide is channel-type.

In a further preferred aspect of the present invention, the center of the first core and the center of the second core are positioned substantially on the same axis. According to this aspect of the present invention, since the center of the beam spot which propagates in the first optical waveguide and the center of the beam spot which propagates in the second optical waveguide are substantially coincide, it is possible to transform the beam spot size more efficiently.

In a further preferred aspect of the present invention, the first cladding has at least a lower cladding positioned under the first core and an upper cladding positioned above the first core, and the bottom of the first core is in contact with the lower cladding and the upper surface and the both sides of the first core are in contact with the upper cladding.

In a further preferred aspect of the present invention, the end face of the second core is substantially rectangular. And the section with the first cladding and the part constituting the second core that is an extension thereof substantially perpendicular to the axis are rectangular.

In a further preferred aspect of the present invention, the first core has a shape obtained by omitting the end of the part that becomes gradually narrower. According to this aspect of the present invention, it is possible to reduce the fluctuation of in the characteristic caused by the fabrication conditions.

In a further preferred aspect of the present invention, the second cladding is formed of ladder silicone or a silica glass. According to this aspect of the present invention, it is possible to prevent the strain induced by difference in thermal expansion coefficient between the first cladding and the second cladding. And it is possible to prevent a change of the difference of the refractive indexes of the first cladding and the second cladding induced by temperature dependency.

In a further preferred aspect of the present invention, the second cladding is formed using a thin film process selected from a group consisting of a CVD process, a sputtering process, a vacuum deposition process, a FHD process and a sol-gel process.

A spot-size transformer according to the present invention comprises a first optical waveguide having a first core and a first cladding covering the first core, a second optical waveguide having a second core and a second cladding covering the second core, a transition waveguide which is positioned between the first and the second optical waveguide, wherein a light propagated into the first waveguide has a first optical field distribution, a light propagated into the second waveguide has a second optical field distribution, the transition waveguide changes from the first optical photoelectric field to the second optical field gradually or changes from the second optical field to the first optical field gradually; and the second core covers the first core at least in the part corresponding to the transition waveguide and includes the region where a refractive index is changing by irradiating energy beam.

According to the present invention, since the spot size of the beam which propagates from the first optical waveguide to the second optical waveguide can be expanded, it is possible to reduce a refractive loss significantly by arranging an optical functional element on the side of the second optical waveguide. Moreover, since the second core includes the region where the refractive index is changing by irradiating energy beam, it can be produced by a comparatively easy fabrication process.

In a preferred aspect of the present invention, the width of the part of the first core correspond to the transition waveguide becomes gradually narrower as it goes toward the second optical waveguide. The part of at least the first cladding is provided as the extension of the second optical waveguide. In a further preferred aspect of the present invention, the second cladding has a first part which consists of substantially non-doped silica glass and a second part which consists of silica glass containing at least germanium (Ge). The second part further contains a first element which reduces refractive index, and the refractive indexes of the first part and the second part are substantially equal. In a further preferred aspect of the present invention, the first core consists of a material in which at least germanium (Ge), a first element and a second element which raise its refractive index are contained in the silica glass. The first element is boron (B) and the second element is phosphorus (P).

In a further preferred aspect of the present invention, the first optical waveguide and the second optical waveguide are channel-type and the center of the first core and the second core are located approximately on the same axis. Since the center of the beam spot hardly displaces in the above transition waveguide, it is possible to minimize the loss arising in the transition waveguide.

A waveguide-embedded optical circuit according to the present invention comprises each of the first spot-size transformer and the second t spot-size transformer including at least a first optical waveguide having a first core and a first cladding, a second optical waveguide having a second core which is provided as the extension of the first cladding and a second cladding, the second optical waveguide of the first spot-size transformer and the second optical waveguide of the second spot-size transformer, which face each other through a groove.

According to this aspect of the present invention, after the incident light in the first optical waveguide which is the first spot-size transformer propagates to the second waveguide whose beam spot is expanded, the incident light propagates to the second waveguide which is the second spot-size transformer, which face each other across a groove, and the beam spot is reduced again, and the incident light propagates in the first optical waveguide. Since the beam spot of the light propagating through the groove is expanded, it is possible to reduce refractive loss significantly.

In a further preferred aspect of the present invention, the waveguide-embedded optical circuit further comprises an optical functional element which is inserted in the groove. According to the present invention, it is possible to extract a light of desired wavelength with low-loss.

In a further preferred aspect of the present invention, each of the first spot-size transformer and the second spot-size transformer comprises a transition waveguide which is positioned between the first and the second optical waveguide, the transition waveguide having the first core whose width of the part becomes gradually narrower as it goes toward the second optical waveguide. Further, the first cladding covers substantially the whole surface of the first core. The center of the first core and the center of the second core are positioned substantially on the same axis.

Further, a waveguide-embedded optical circuit according to the present invention comprises a pair of the spot-size transformers mentioned above, the second optical waveguide of one spot-size transformer and the second optical waveguide of the other spot-size transformer, which face each other across a groove. According to this aspect of the present invention, it is possible to reduce refractive loss in the groove significantly. Therefore, if an optical filter or an optical isolator element is inserted in the groove, a low-loss waveguide-embedded optical circuit can be constituted. If several pairs of the waveguide-embedded optical circuit are utilized, an arrayed low-loss waveguide-embedded optical circuit can be constituted.

The present invention further provides a method of producing a spot-size transformer which comprises a first optical waveguide, a second waveguide and a transition waveguide positioned between the first optical waveguide and the second optical waveguide, which method comprises the steps of forming a region of the core corresponding to the part of the first optical waveguide and the transition waveguide, forming a cladding layer covering at least the region of the second optical waveguide and the transition waveguide, and changing the refractive index gradually by projecting high-energy beam onto at least a part of the cladding layer corresponding to the transition waveguide and the second optical waveguide.

In a preferred aspect of the present invention, the step of forming the region of the core includes the steps of forming a core layer, and patterning the core layer so that the width of the core layer is substantially constant in the part corresponding to the first optical waveguide and becomes gradually thinner as it goes toward the second optical waveguide in the part corresponding to the transition waveguide. In a further preferred aspect of the present invention, the region in which the refractive index is change by irradiation with the high-energy beam comprises the core of the second optical waveguide and at least a part of the cladding of the first optical waveguide.

According to this aspect of the present invention, since the size of the beam spot is changed without substantially displacing the center of the beam spot in the channel type optical waveguide, it is possible to transform the spot-size at a low-loss.

Moreover, according to the present invention, since the first cladding is changed to the second core gradually by using a transition waveguide, the spot-size transformer can be produced by a comparatively easy fabrication process.

Furthermore, according to the present invention, since the region which is the first cladding as well as the second cladding (refractive index changing region) is formed by irradiating ultraviolet rays, the spot-size transformer can be produced by a comparatively easy fabrication process.

Furthermore, according to the present invention, since two spot-size transformers face each other across a groove and the beam spot is expanded in the groove, it is possible to reduce refractive loss significantly.

Furthermore, according to the present invention, since the beam spot is transformed by the transition waveguide, it is possible to reduce refractive loss significantly in the groove by applying the present invention to the optical waveguide pair separated by the groove.

BRIEF DESCRIPTION OF THE DRAWINGS

FIG. 1 shows a ferrule which connects the optical fiber which is a kind of an optical waveguide and FIG. 1(a) is a schematic perspective and FIG. 1(b) is a cross sectional view taken along line D—D of FIG. 1(a).

FIG. 2 shows the state where a optical filter is equipped in the ferrule 10 and FIG. 2(a) is a schematic perspective and FIG. 2(b) is a cross sectional view taken along line E—E of FIG. 2(a).

FIG. 3 shows a waveguide-embedded optical circuit which is a kind of an optical waveguide and FIG. 3(a) is a schematic perspective and FIG. 3(b) is a cross sectional view taken along line F—F of FIG. 3(a).

FIG. 4 shows the state where a optical filter is equipped in a waveguide-embedded optical circuit 20 and FIG. 4(a) is a schematic perspective and FIG. 4(b) is a cross sectional view taken along line G—G of FIG. 4(a).

FIG. 5 is a explanation about the loss which originates in diffraction phenomena occurs and FIG. 5(a) shows the case of small core size and FIG. 5(b) shows the case of large core size.

DESCRIPTION OF THE PREFERRED EMBODIMENT

Preferred embodiments of the present invention will now be explained with reference to the drawings.

Figure 6:
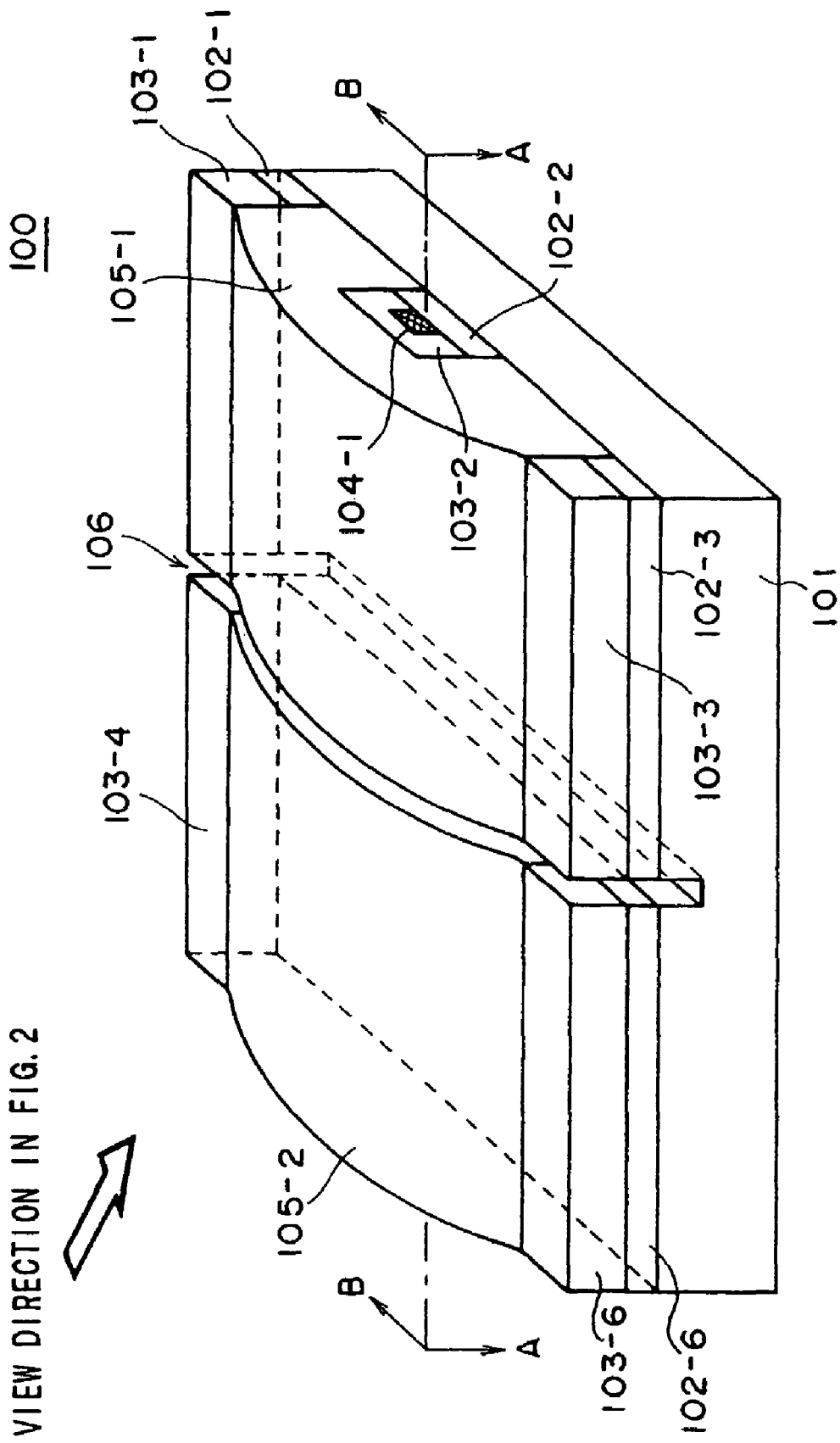
FIG. 6 is a schematic perspective view showing a waveguide-embedded optical circuit 100 that is a preferred embodiment of the present invention seen from one direction.
Figure 7:
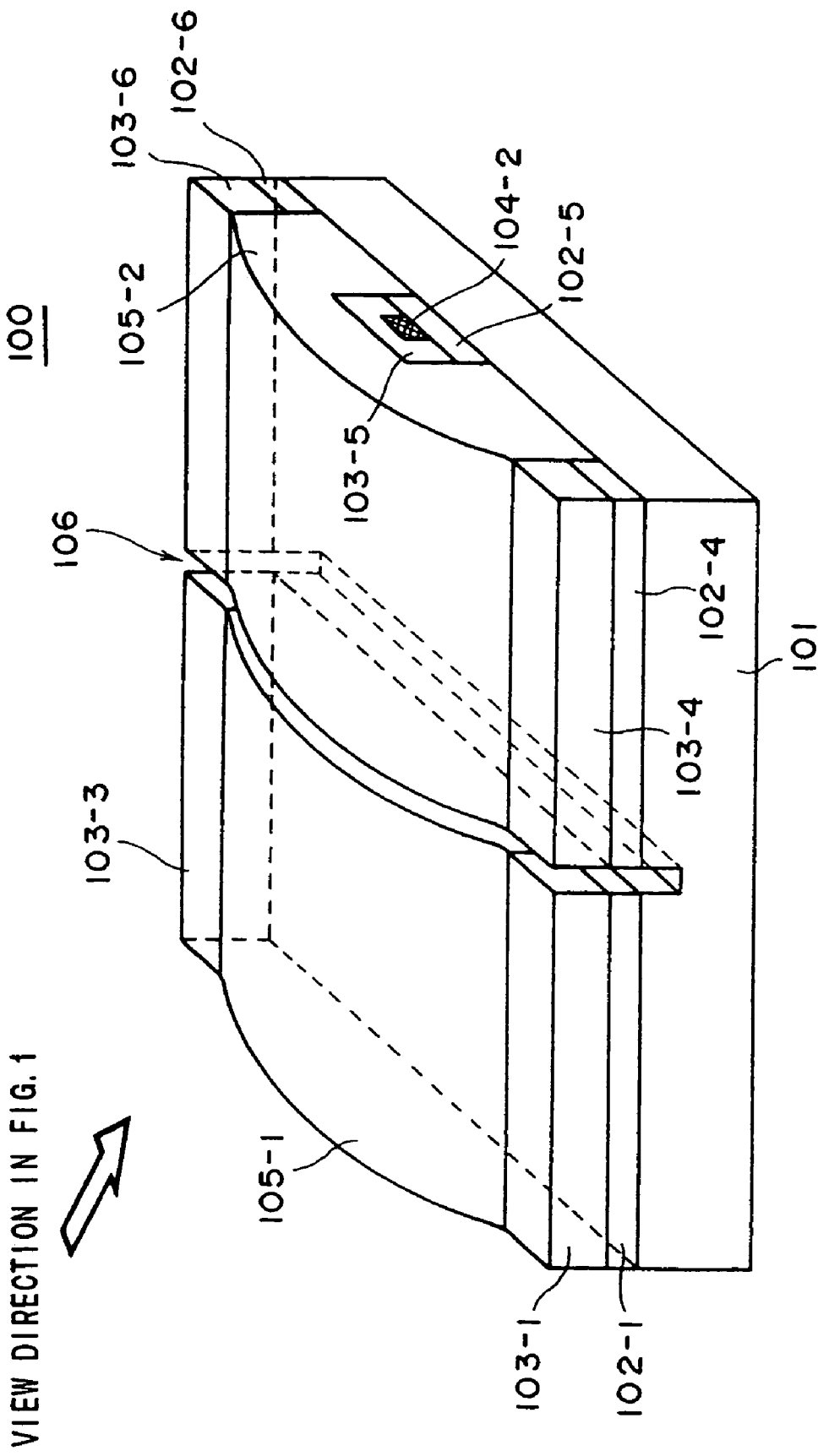
FIG. 7 is a schematic perspective view showing a waveguide-embedded optical circuit 100 that is a preferred embodiment of the present invention seen from opposite direction.

FIG. 6 is a schematic perspective view showing a waveguide-embedded optical circuit 100 that is a preferred embodiment of the present invention seen from one direction, and FIG. 7 is a schematic perspective view showing the waveguide-embedded optical circuit 100 seen from opposite direction.

As shown in FIG. 6 and FIG. 7, the waveguide-embedded optical circuit 100 of this embodiment comprises a substrate 101, lower cladding layers 102-1–102-6 (sometimes collectively called "lower cladding layer 102"), upper cladding layers 103-1–103-6 (sometimes collectively called "upper cladding layer 103"), core regions 104-1 and 104-2 (sometimes collectively called "core region 104") and optical resin layers 105-1 and 105-2 (sometimes collectively called "optical resin layer 105") The part including the lower cladding layers 102-1–102-3, the upper cladding layers 103-1–103-3, the core region 104-1 and the optical resin layer 105-1 is separated by a groove 106 from the part including the lower cladding layers 102-4–102-6, the upper cladding layers 103-4–103-6, the core region 104-2 and the optical resin layer 105-2.

The groove 106 is formed on the upper face of the substrate 101 to extend downward, making it possible to fully insert an optical filter described later in detail so as to cover the whole cross-sectional area of the core region 104, the upper cladding layer 103 and the lower cladding layer 102 with the filter.

The substrate 101 serves to ensure mechanical strength of the waveguide-embedded optical circuit 100. The material of the substrate 101 is not particularly limited insofar as the substrate 101 can ensure the mechanical strength of the waveguide-embedded optical circuit 100 and silicone or glass is preferably used as the material of the substrate 101.

The lower cladding layers 102-2,102-5 and the upper cladding layers 103-2,103-5 serve as the "first cladding" and the "second core" described later in detail and their material is not particularly limited insofar as the refractive indexes of the substrate 101 and the core region 104 are different but silica glass or polymer is preferably used as the material of the substrate 101 and the core region 104. Other portions of the lower cladding 102 (the lower cladding layers 102-1, 102-3, 102-4 and 102-6) and other portions of the upper cladding layer 103 (the lower cladding layers 103-1, 103-3, 103-4 and 103-6) are formed of the same material as the lower cladding layers 102-2,102-5 and the upper cladding layers 103-2,103-5.

The core region 104 serves as "the first core" described later in detail and the material of the core region 104 is not particularly limited insofar as the refractive indexes of the lower cladding layer 102 and the upper cladding layer 103 are different and silica glass or polymer is preferably used as the material of the core region 104. In the core region 104, the core region 104-1 is formed on part of the surface of the lower cladding layer 102 and the surface of the lower cladding layer 102, and the core region 104-1 is covered with the upper cladding layer 103-5.

The optical resin layer 105 serves as the "second cladding" described later in detail and the material of the optical resin layer 105 is not particularly limited insofar as the refractive indexes of the lower cladding layer 102 and the upper cladding layer 103 are different and an ultraviolet curable resin is preferably used as the material of the core region 104 in this embodiment.

Figure 8:
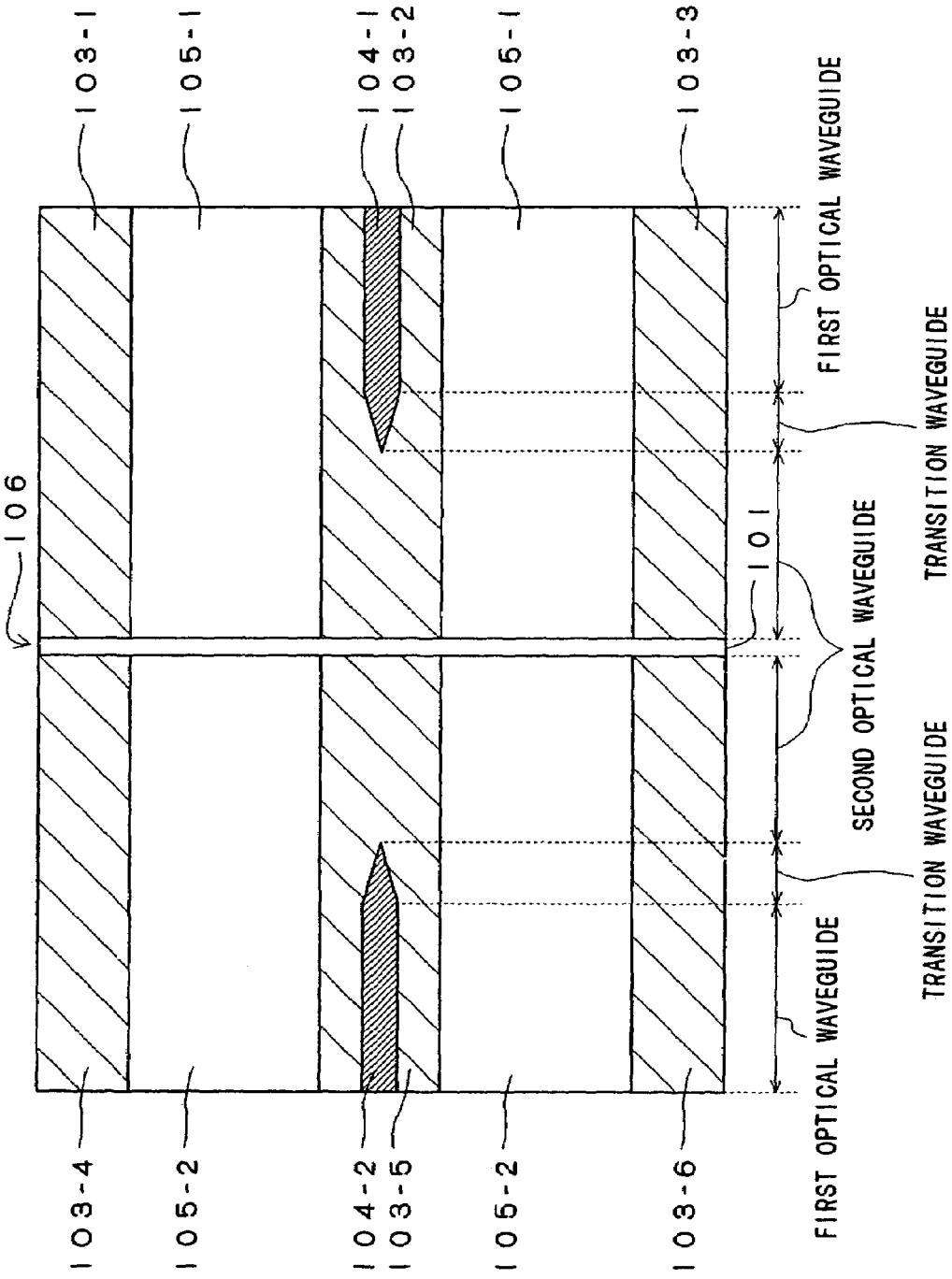
FIG. 8 is a cross sectional view taken along line A—A of FIG. 6.
Figure 9:
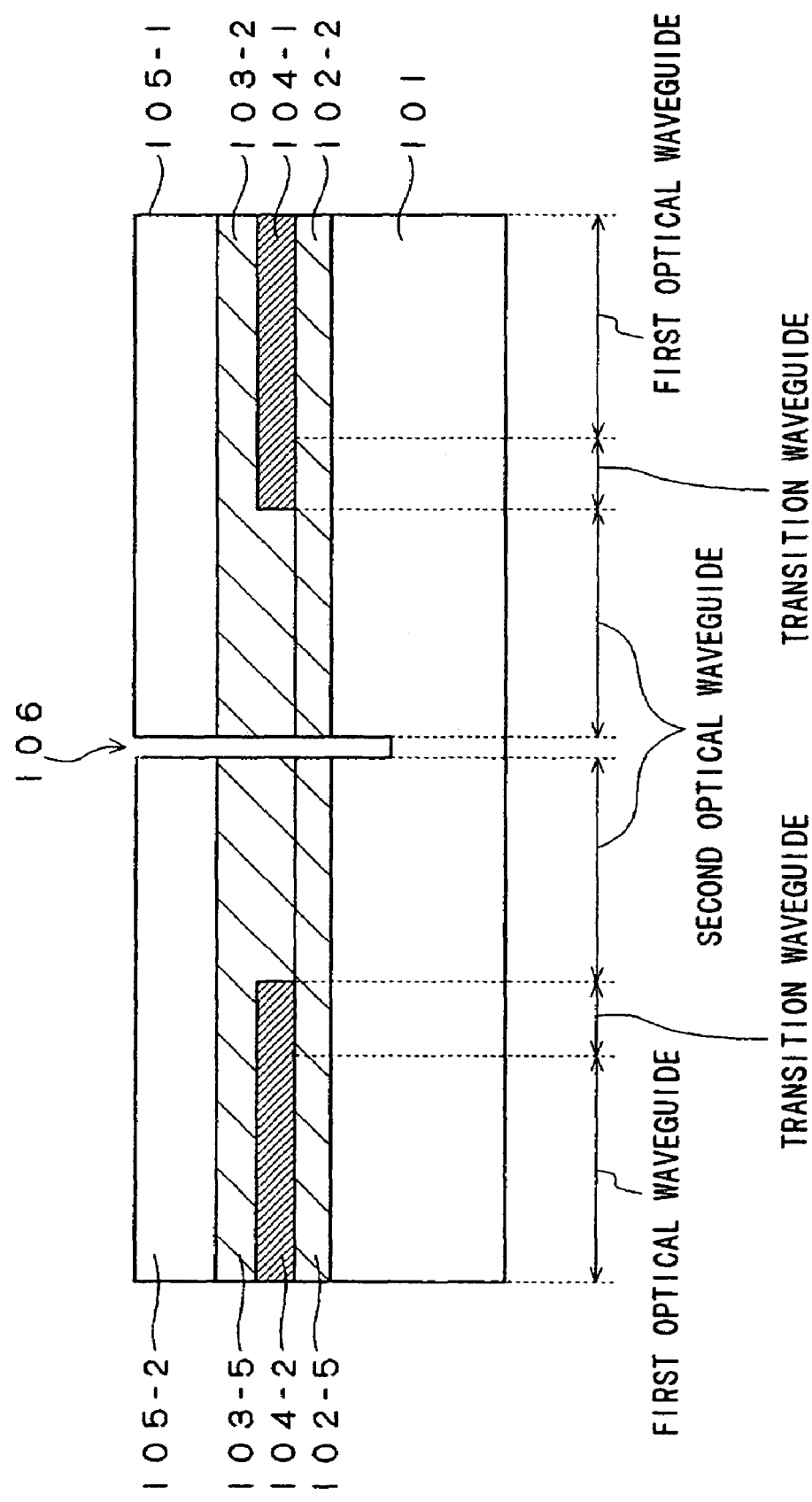
FIG. 9 is a cross sectional view taken along line B—B of FIG. 6.

FIG. 8 is a cross sectional view taken along line A—A in FIG. 6, and FIG. 9 is a cross sectional view taken along line B—B in FIG. 6. As shown in FIG. 8 and FIG. 9, the core region 104-1,104-2 has substantially fixed width (length of the up and down direction in FIG. 8) over a given distance from the end face, and after that, the width of the end portion of the core region 104-1,104-2 becomes gradually narrower as it goes toward the groove 106. For this reason, the core region 104-1, 104-2 is not present between the lower cladding layer 102-2,102-5 and the upper cladding layer 103-2, 103-5 in the portion near the groove 106, so that the upper cladding layer 103-2 is directly laminated on the lower cladding layer 102-2 and the upper cladding layer 103-5 is directly laminated on the lower cladding layer 102-5.

In the specification, the section where the width of the core regions 104-1,104-2 is set substantially uniform is called the "first waveguide", the section where the core regions 104-1, 104-2 is not present is called the "second waveguide", and the section where the width of the core regions 104-1,104-2 becomes gradually narrower toward the groove 106 is called the "transition waveguide". The first waveguide, the transition waveguide and the second waveguide are united and are collectively called the "spot-size transformer". Therefore, the waveguide-embedded optical circuit 100 of this embodiment includes two spot-size transformers which face each other across the groove 106, and in each spot-size transformer, the second waveguide is positioned on the opposite side of the groove 106 (the opposite side is the end side of the waveguide-embedded optical circuit 100).

The first waveguide is a channel type optical waveguide constituted by the first core and the first cladding, and the second optical waveguide is a channel type optical waveguide constituted by the second core and the second cladding. As described above, each of the first cladding and the second core is constituted by the layered members comprised of the lower cladding layer 102-2 and the upper cladding layer 103-2, or the layered member comprised of the lower cladding layer 102-5 and the upper cladding layer 103-5. Moreover, the transition waveguides are constituted by the region where the core changes from the first core to the second core and the cladding changes from the first cladding to the second cladding. In this transition region, the spot-size of the propagated beam changes from the relatively small spot-size in the first optical waveguide to a relatively large spot-size in the second optical waveguide (from relatively large spot-size in the second optical waveguide to relatively small spot-size in the first optical waveguide). That is, the actual spot size transformation is performed in the transition waveguide.

Figure 10:
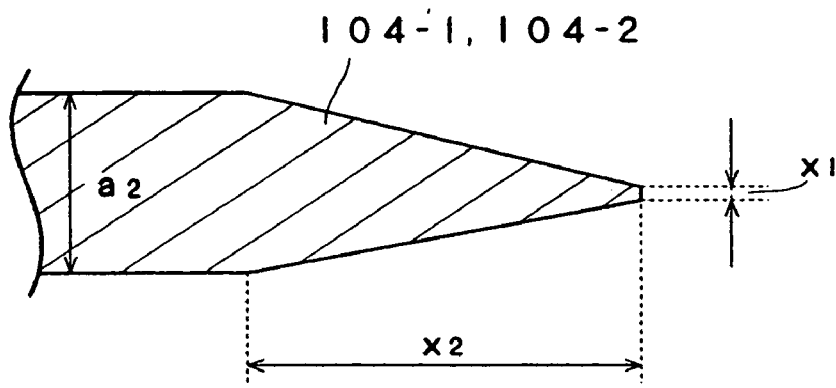
FIG. 10 is an expanded plain view which shows the end of the core region 104-1 and 104-2.

It is preferable for the end of the taper portion of the core regions 104-1,104-2 to be sharper from the theoretical viewpoint of suppressing excessive loss. However, from the viewpoint of actual fabrication, the shape with the end of the taper portion cut off as shown in FIG. 10 is preferable. In this case, the width of the end part "$x_1$" is preferably set to a small value within the range which does not vary greatly depending on the fabrication conditions. Specifically, it is preferably set to 1 μm or less, more preferably set to 0.6 μm or less. If the width $x_1$ of the end part is set to 1 μm or less, it becomes possible to suppress excessive loss to about 0.8 dB or less in most cases, and if the width $x_1$ of the end part is set to 0.6 μm or less, it becomes possible to suppress excessive loss to about 0.4 dB or less in most cases. The length "$x_2$" of the tapered part is not limited but it is preferably set between about 100 times and 200 times the width $a_2$ of the untapered part (the region corresponding to the first optical waveguide) in the core region 104-1, 104-2. By these settings, it becomes possible to prevent enlargement of the waveguide-embedded optical circuit 100 and effectively suppress the excessive loss generated in the transition waveguide.

As shown in FIG. 8 and FIG. 9, the width (length of the up and down (vertical) direction in FIG. 8) and the height (length of the up and down (vertical) direction in FIG. 9) of the layered member, which is the first cladding and the second cladding, comprised of the lower cladding layer 102-2 and the upper cladding layer 103-2 has a substantially fixed width in the section from the end of face the waveguide-embedded optical circuit 100 to the groove 106. The same is true of the layered member of the lower cladding layer 102-5 and the lower cladding layer 103-5.

Figure 11:
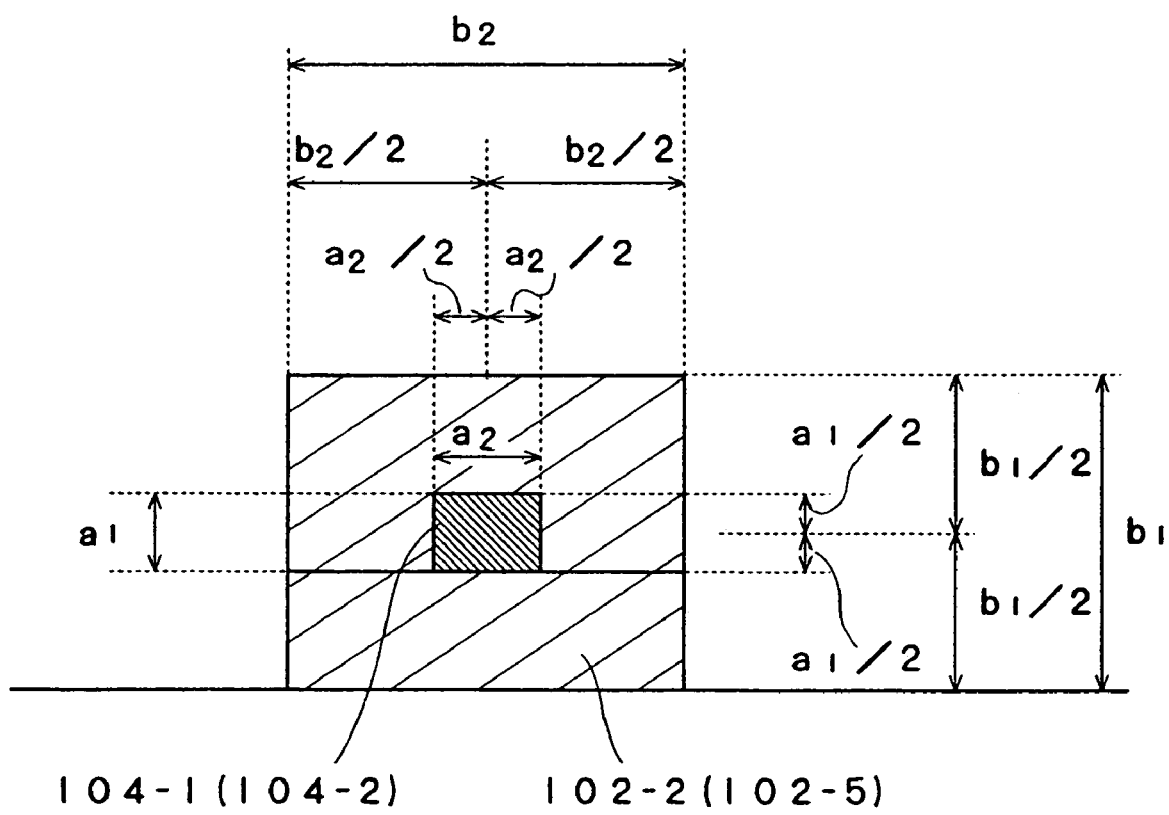
FIG. 11 shows in detail configuration between the lower cladding layer 102-2, 102-5 and the upper cladding layer 103-2, 103-5, and the core region 104-1, 104-2 in the waveguide-embedded optical circuit 100.

FIG. 11 shows in detail the configuration between the lower cladding layers 102-2,102-5 and upper cladding layers 103-2,103-5, and the core region 104-1, 104-2 in the waveguide-embedded optical circuit 100.

As shown in FIG. 11, when the height of the core regions 104-1, 104-2 is set to $a_1$ and the height of the layered member comprised of the lower cladding layers 102-2 and the upper cladding layers 103-2, and the layered member comprised of the lower cladding layer 102-5 and the upper cladding layer 103-5 is set to $b_1$, it is preferable to align the line which separates the core regions 104-1, 104-2 in the height direction $a_1/2$ and the line which separates the layered members in the height direction $b_1/2$ substantially coincide. That is, it is preferable to align the center line in the height direction of the core regions 104-1, 104-2 and the center line in the height direction of the layered members substantially coincide. Similarly, when the width of the core region 104-1, 104-2 is set to $a_2$ and the width of the layered members is set to $b_2$, it is preferable to align the line which separates the core region 104-1, 104-2 in the height direction $a_2/2$ and the line which separates the layered members in the height direction $b_2/2$ substantially coincide. That is, it is preferable to align the center line in the width direction of the core regions 104-1, 104-2 and the center line in the width direction of the layered members substantially coincide. This means that it is preferable to align the central point in the width direction of the core regions 104-1, 104-2 and the central point in the width direction of the layered members substantially coincide.

The height $a_1$, and width $a_2$ of the core regions 104-1, 104-2 are not limited but are preferably set to almost the same size as the diameter of the core of an ordinary optical fiber (about 7 μm). When they are so set, it becomes possible to connect the first optical waveguide and optical fiber directly by a groove of V shape etc.

In the waveguide-embedded optical circuit 100 having the above-described configuration, after the light entering the first optical waveguide propagates through the first core to the groove 106, it gradually penetrate into the first cladding in the transition waveguide where the width of the first core becomes gradually narrower. Thus, in the transition waveguide, the first cladding begins to serve as a second core as it goes toward the groove 106 and comes to serve almost totally as a second core in the second optical waveguide. Therefore, the beam spot exiting from the groove 106 is expanded to larger than the beam spot entering the first optical waveguide. Further, after the light entering the second optical waveguide propagates through the second core to the opposite side from the groove 106, the incident light gradually penetrate to the first cladding in the transition waveguide where the width of the first core becomes gradually wider. Thus, in the transition waveguide, the second core begins to serve as the first cladding as it goes toward the opposite side from the groove 106 and comes to serve almost totally as the first cladding in the first optical waveguide. Therefore, the beam spot exiting from the first optical waveguide is reduced to smaller than the beam spot entering from the groove 106.

In the waveguide-embedded optical circuit 100 having the above-described configuration, an optical filter can be inserted in the groove 106.

Figure 12:
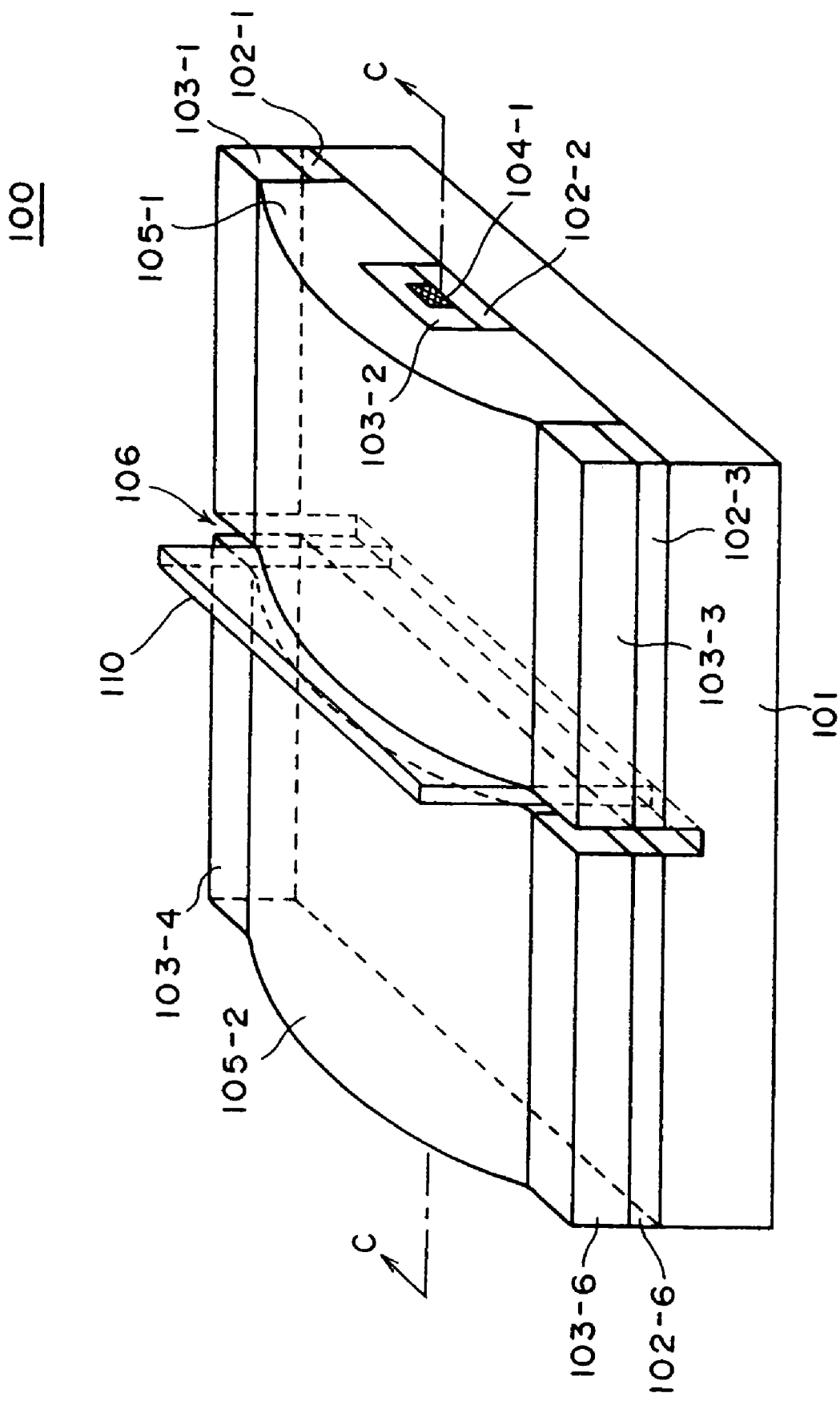
FIG. 12 is a schematic perspective view schematically showing the state where the optical filter 110 is equipped in the waveguide-embedded optical circuit 100
Figure 13:
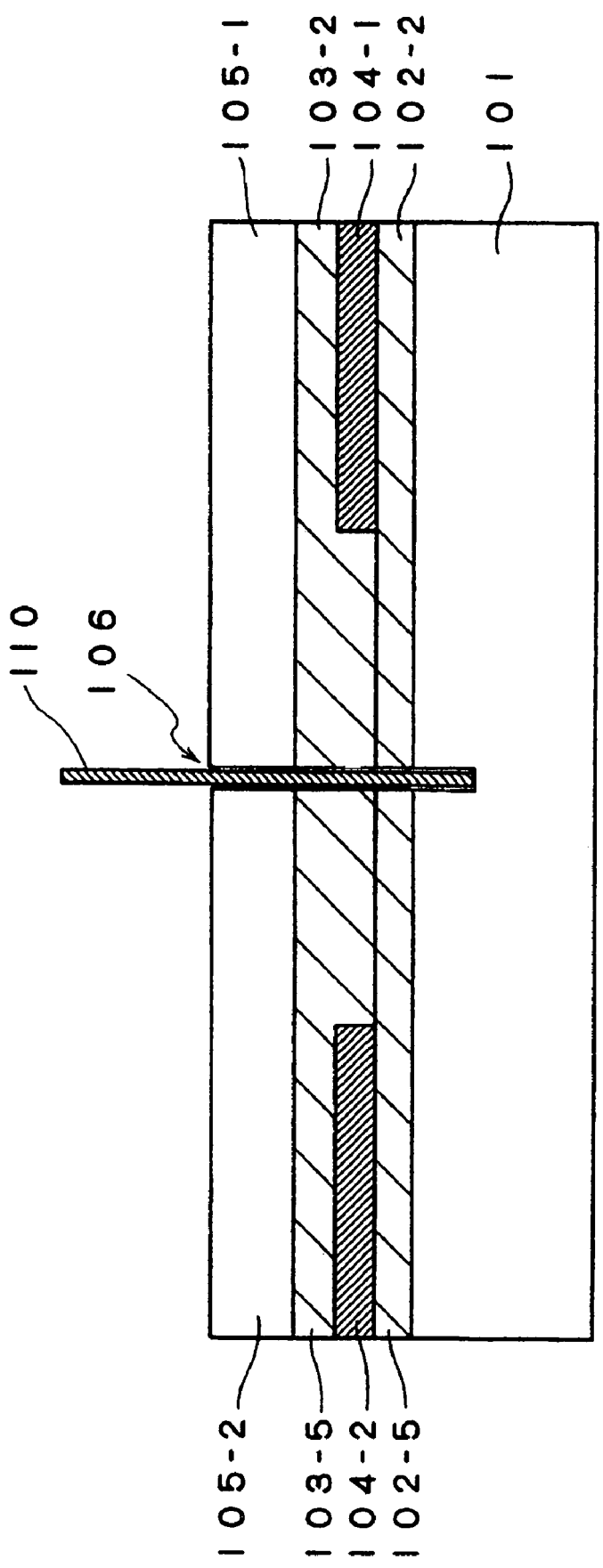
FIG. 13 is a cross sectional view taken along line C—C of FIG. 12.

FIG. 12 is a schematic perspective view schematically showing the state where an optical filter 110 is installed in the waveguide-embedded optical circuit 100 and FIG. 13 is a cross sectional view taken along line C—C of FIG. 12. As shown in FIG. 12 and FIG. 13, the beam propagated from one side of the core region 104-1, 104-2 is filtered in accordance with the characteristic of the optical filter 110 inserted into the groove 106 and propagates to the other side of the core regions 104-1, 104-2. Thereby, it is possible to extract a light of desired wavelength.

Figure 1A:
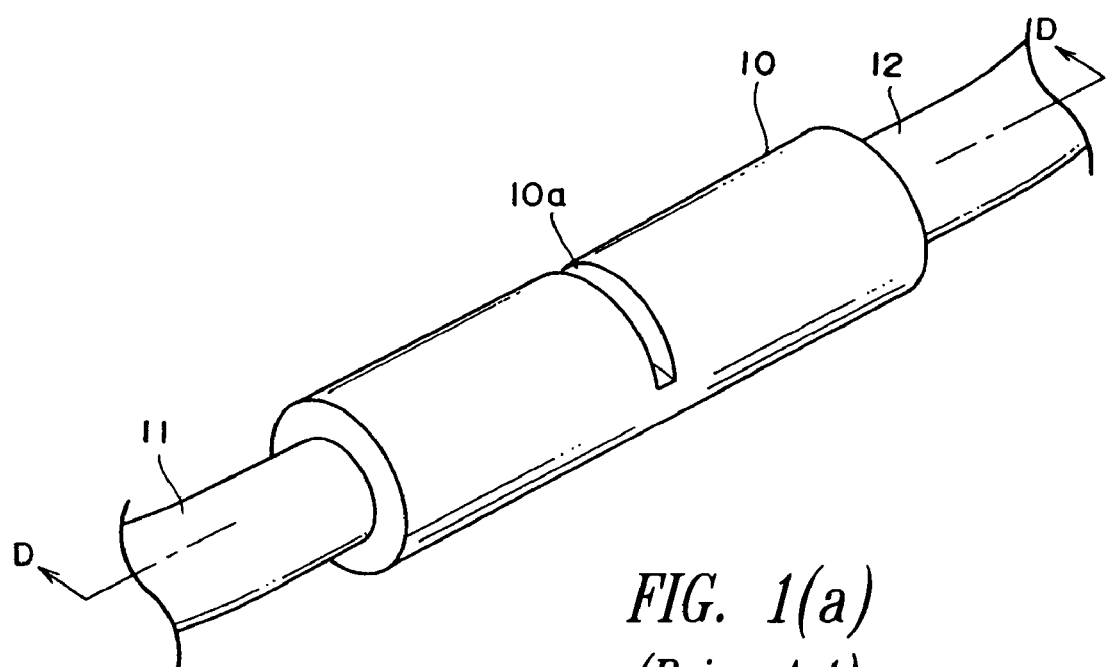
Figure 1B:
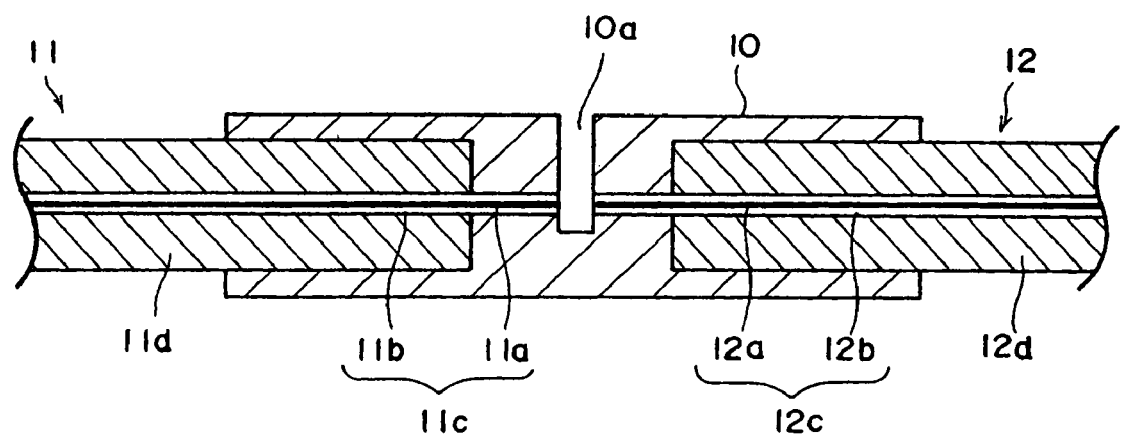
Figure 2A:
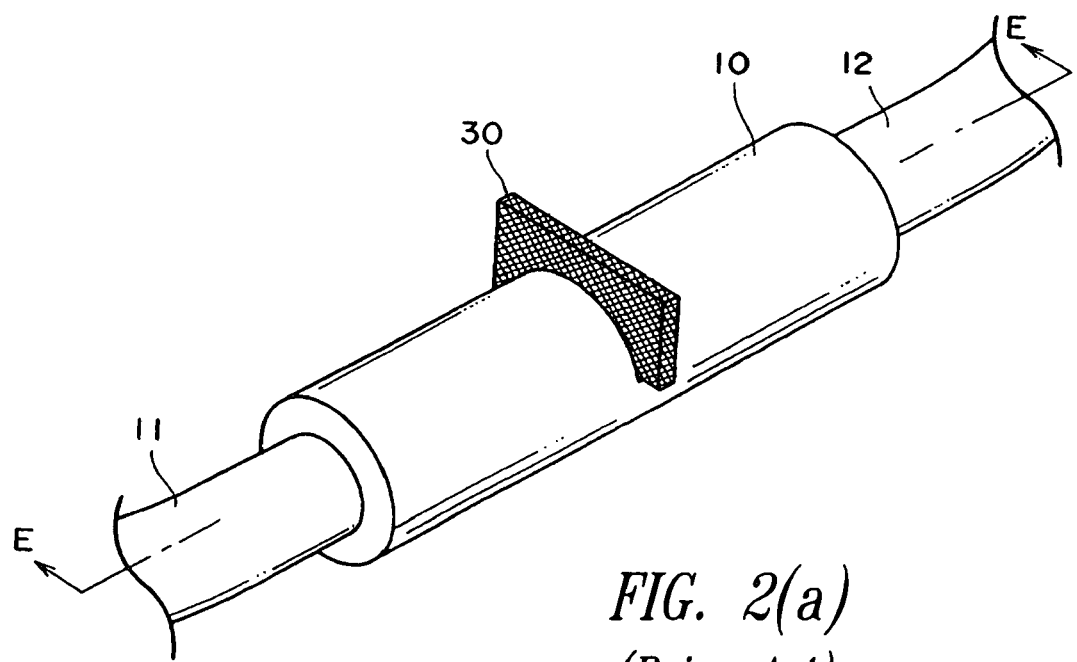
Figure 2B:
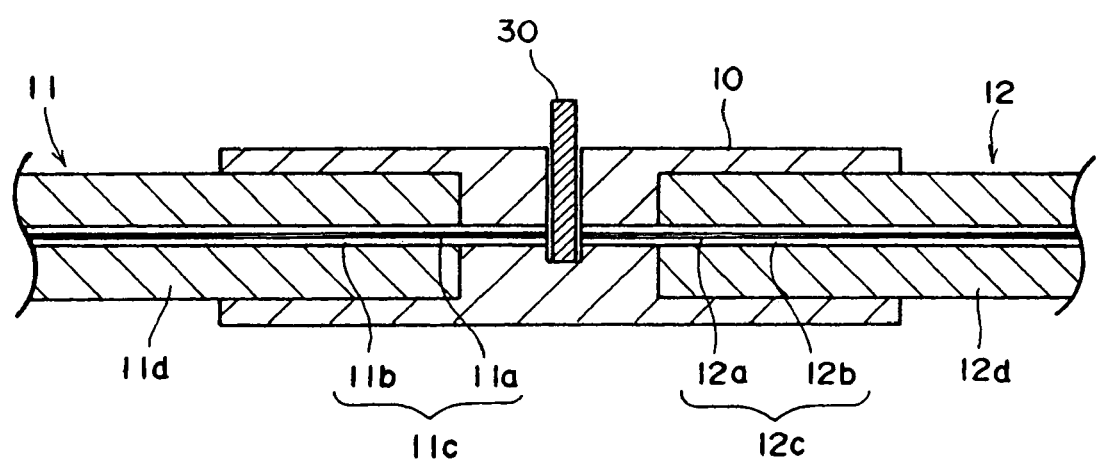
Figure 3A:
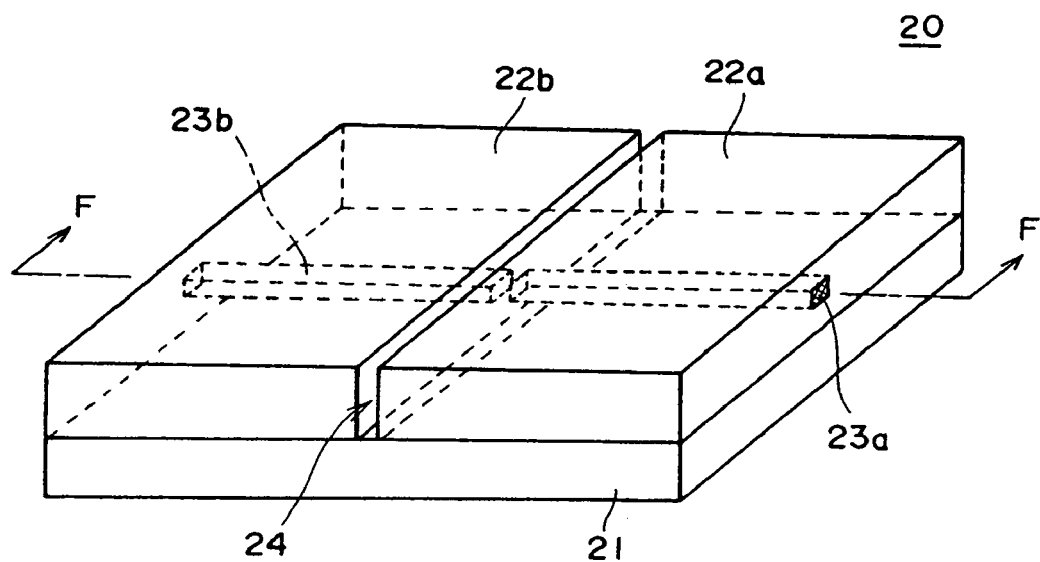
Figure 3B:
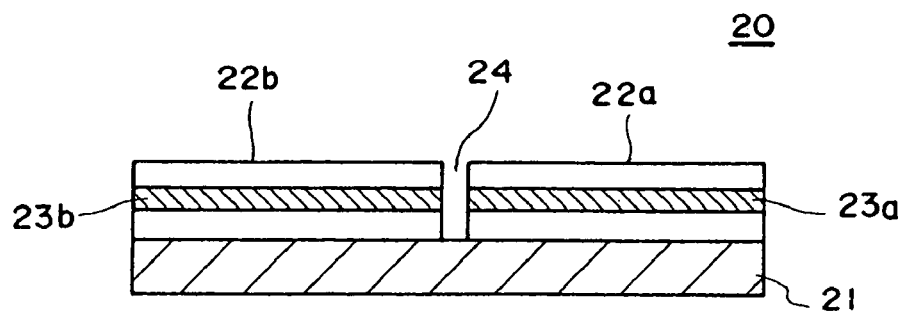
Figure 4A:
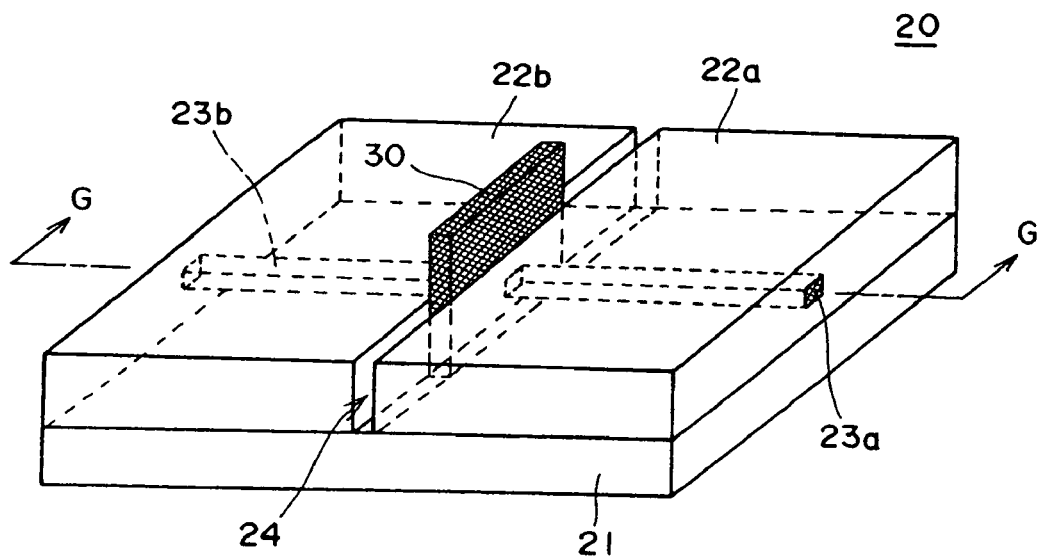
Figure 4B:
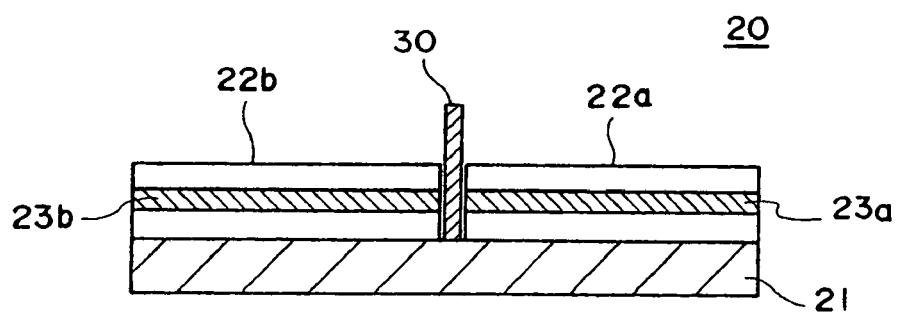
Figure 5A:
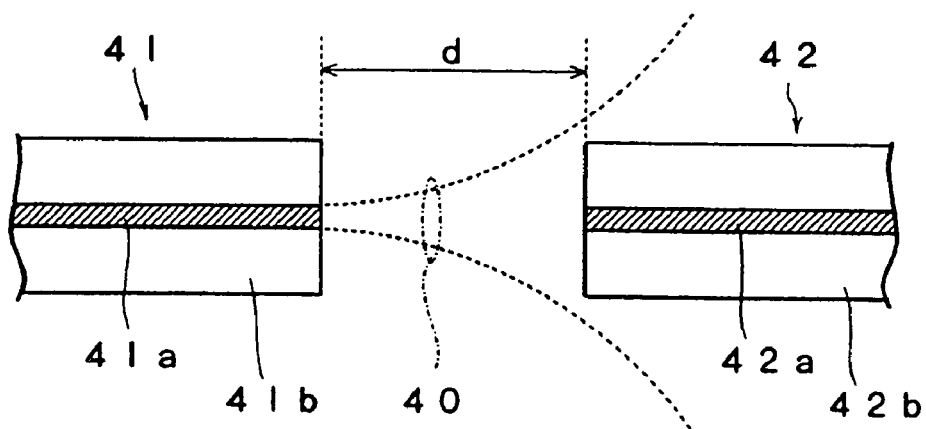
Figure 5B:
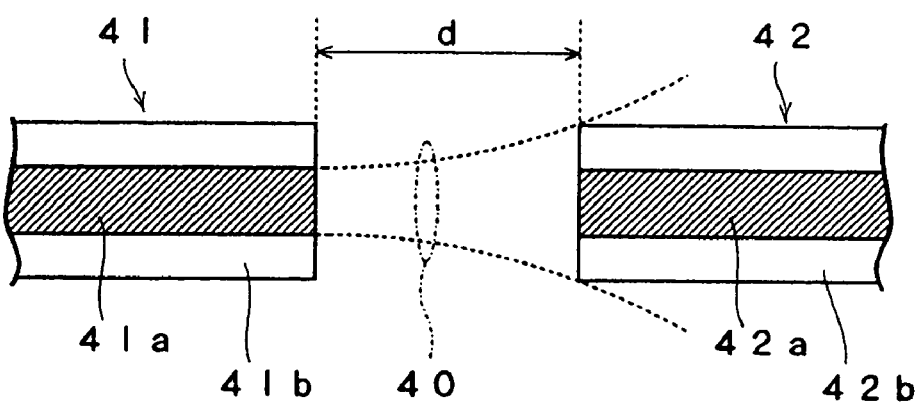

In the waveguide-embedded optical circuit 100 of this embodiment, since the portion separated by the groove 106 serves as a second optical waveguide with a core of larger diameter than the first optical waveguide, the beam spot propagating through the groove 106 is expanded to larger than the beam spot which propagates through the first waveguide. As a result, it is possible to significantly reduce the diffraction loss arising in the groove 106. Therefore, it becomes possible to achieve desired filtering at lower loss than with the conventional waveguide-embedded optical circuit shown in FIG. 3 and FIG. 4. Further, in the waveguide-embedded optical circuit 100 of this embodiment, as explained with reference to FIG. 11, it is possible to minimize the loss arising in the transition waveguide because the center of the beam spot hardly displaces in the transition waveguide if the center section of the core regions 104-1, 104-2, which are the center of the first core, and the center section of the layered members, which is the second core, are made coincident.

Next, the fabrication process of the waveguide-embedded optical circuit 100 of this embodiment will be explained with reference to the drawing.

Figure 14:
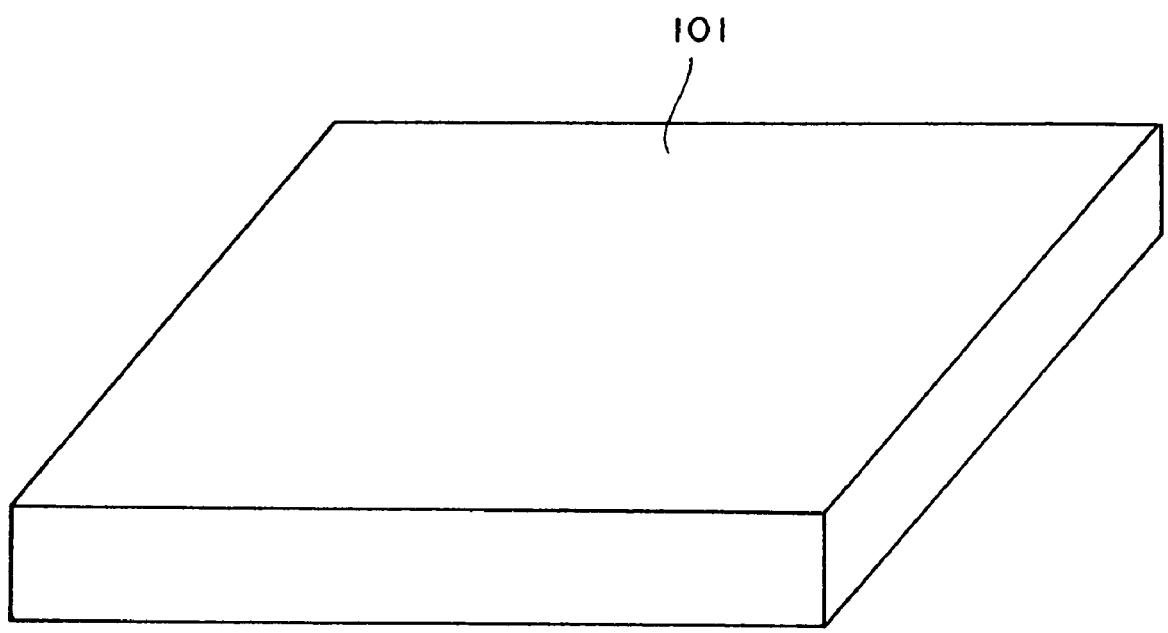
FIG. 14 is a schematic perspective view which shows a state of the waveguide-embedded optical circuit 100 in fabrication process.
Figure 15:
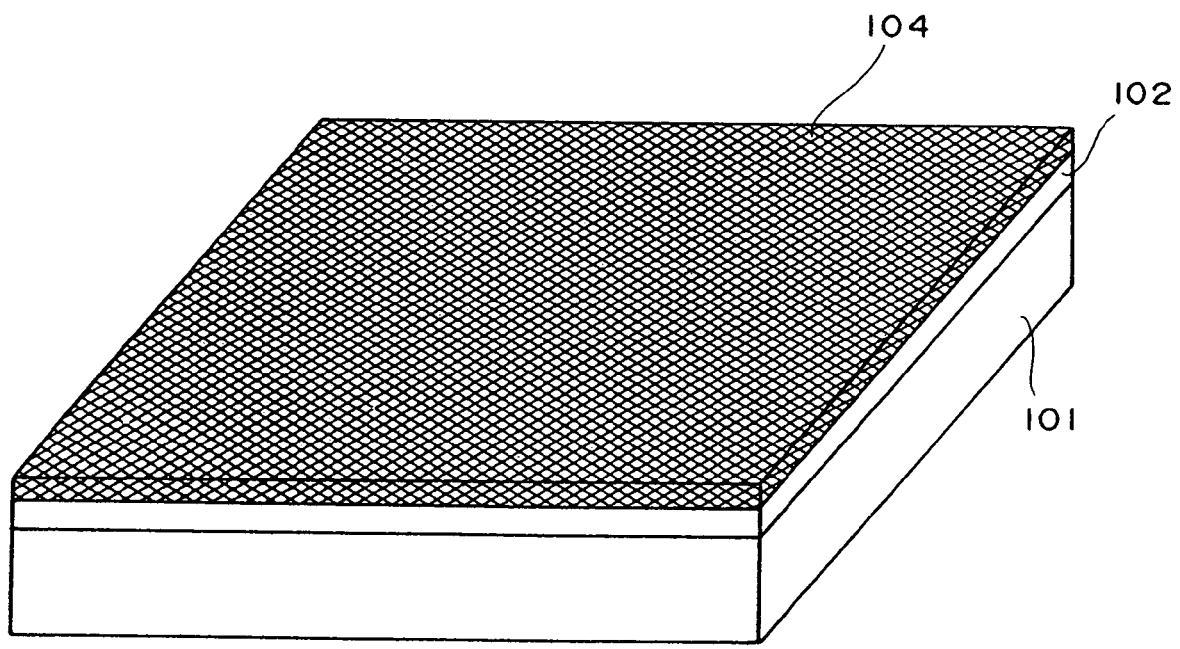
FIG. 15 is a schematic perspective view which shows a state of the waveguide-embedded optical circuit 100 in fabrication process.

First, a substrate 101 of given area is prepared (FIG. 14) and the lower cladding layer 102 and the core region 104 are formed in order over the whole surface of the substrate 101 (FIG. 15). The method of forming the lower cladding layer 102 and the core region 104 is not particularly limited but a vapor phase growth process using chemical species containing elements for forming the lower cladding layer 102 and the core region 104 such as a CVD process, a sputtering process, a vacuum deposition process, an FHD (Flame Hydrolysis Deposition) process, a coating process or the like is preferably used. Further, in the case where silica glass is used as the material of the lower cladding layer 102 and the core region 104, the CVD process or the FHD process is more preferably used from the viewpoint of productivity and quality. Further, in the case where polymer is used as the material of the lower cladding layer 102 and the core region 104, a coating process is more preferably used from the viewpoint of easy processing.

Figure 16:
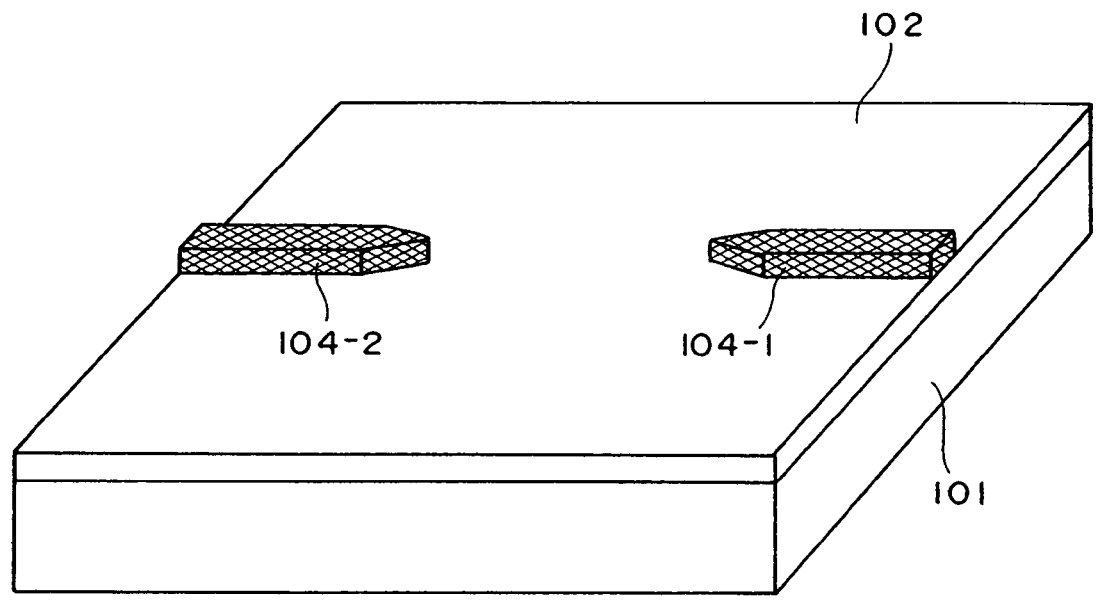
FIG. 16 is a schematic perspective view which shows a state of the waveguide-embedded optical circuit 100 in fabrication process.

Next, the core regions 104-1, 104-2 are formed by patterning the core region 104 (FIG. 16). The core regions 104-1, 104-2 are formed to the shape mentioned above so as to provide the part where the width is fixed and the part where the width becomes gradually narrower. The method of patterning the core region 104 is not particularly limited but it is preferable to form a metal mask layer over the whole surface of the core region 104, apply photoresist on the metal mask layer, form an etching mask for leaving the core regions 104-1, 104-2, and remove the unnecessary portions of the core region 104 using the etching mask. The removal of the unnecessary portions of the core region 104 is preferably performed by dry etching.

Figure 17:
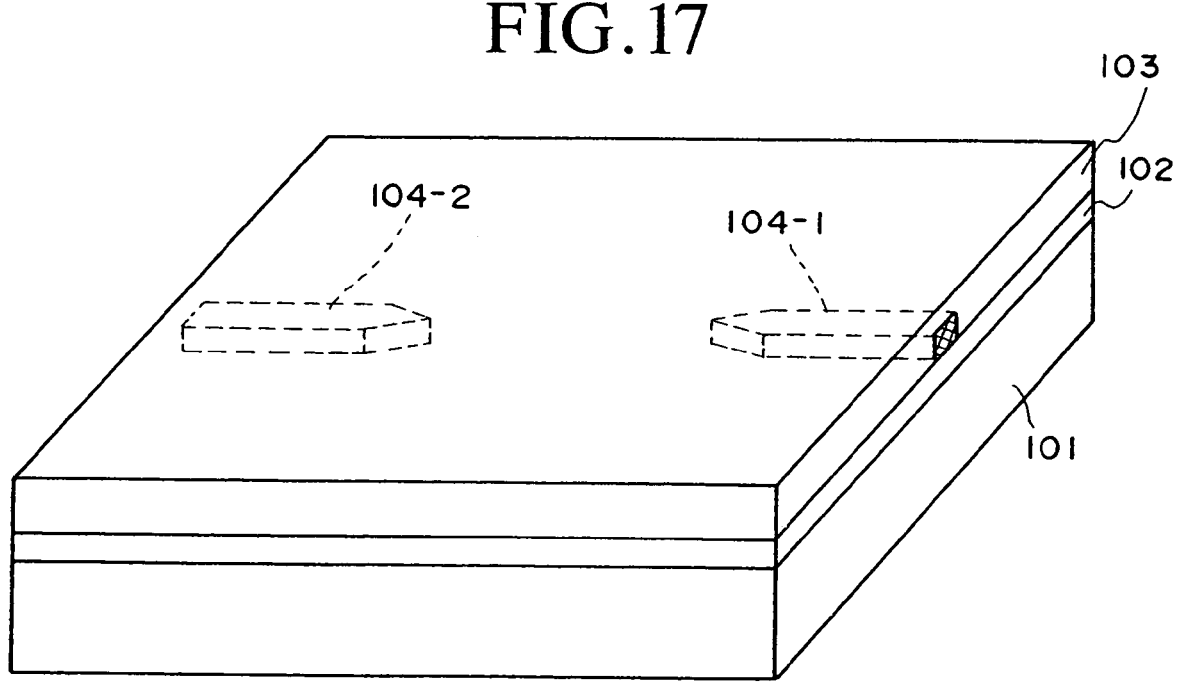
FIG. 17 is a schematic perspective view which shows a state of the waveguide-embedded optical circuit 100 in fabrication process.

Next, the upper cladding layer 103 is formed over the whole surface of the lower cladding layer 102 (FIG. 17). The method of forming the upper cladding layer 103 is not particularly limited, but the vapor phase growth process using chemical species containing elements for forming the upper cladding layer 103 or coating is preferably used in the same way as when forming the lower cladding layer 102 and the core region 104. Further, as mentioned above, in the case where silica glass is used as the material of the upper cladding layer 103, the CVD process or the FHD process is more preferably used. Further, as mentioned above, in the case where polymer is used as a material of the upper cladding layer 103, the coating process is more preferably used.

Figure 18:
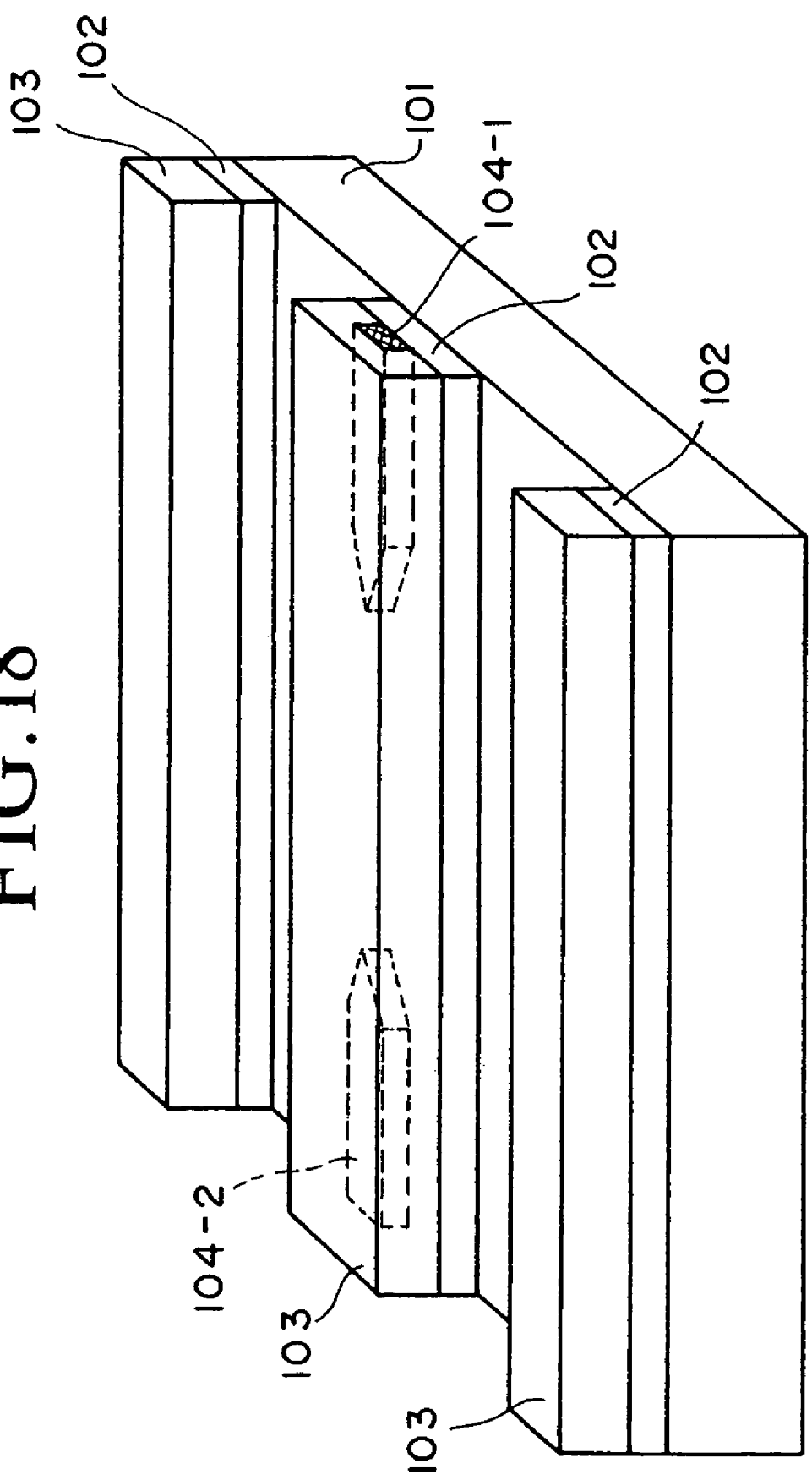
FIG. 18 is a schematic perspective view which shows a state of the waveguide-embedded optical circuit 100 in fabrication process.

Next, three parallel rod-shaped members are formed by patterning the layered members of the lower cladding layer 102 and the upper cladding layer 103 (the core region 104 is partially included) (FIG. 18). Since the center rod-shaped member is used as the first optical waveguide and the second optical wave guide (second core), it is necessary to control the size of rod-shaped member accurately. On the other hand, since the two rod-shaped members on the both sides are used as an outer frame of the optical resin layer 105, which is filled in the following processes, it is not necessary to control the size of the two rod-shaped members so accurately as the center rod-shaped member. The method of patterning the layered members of the lower cladding layer 102 and the upper cladding layer 103 is not particularly limited, but it is preferable to form a metal mask layer over the whole surface of the upper cladding layer 103, apply photoresist on the metal mask layer, form an etching mask as to leave the three parallel rod-shaped members, and move the unnecessary portions of the lower cladding layer 102 and the upper cladding layer 103 using the etching mask. The removal of the unnecessary portions of the lower cladding layer 102 and the upper cladding layer 103 is preferably performed by dry etching.

Figure 19:
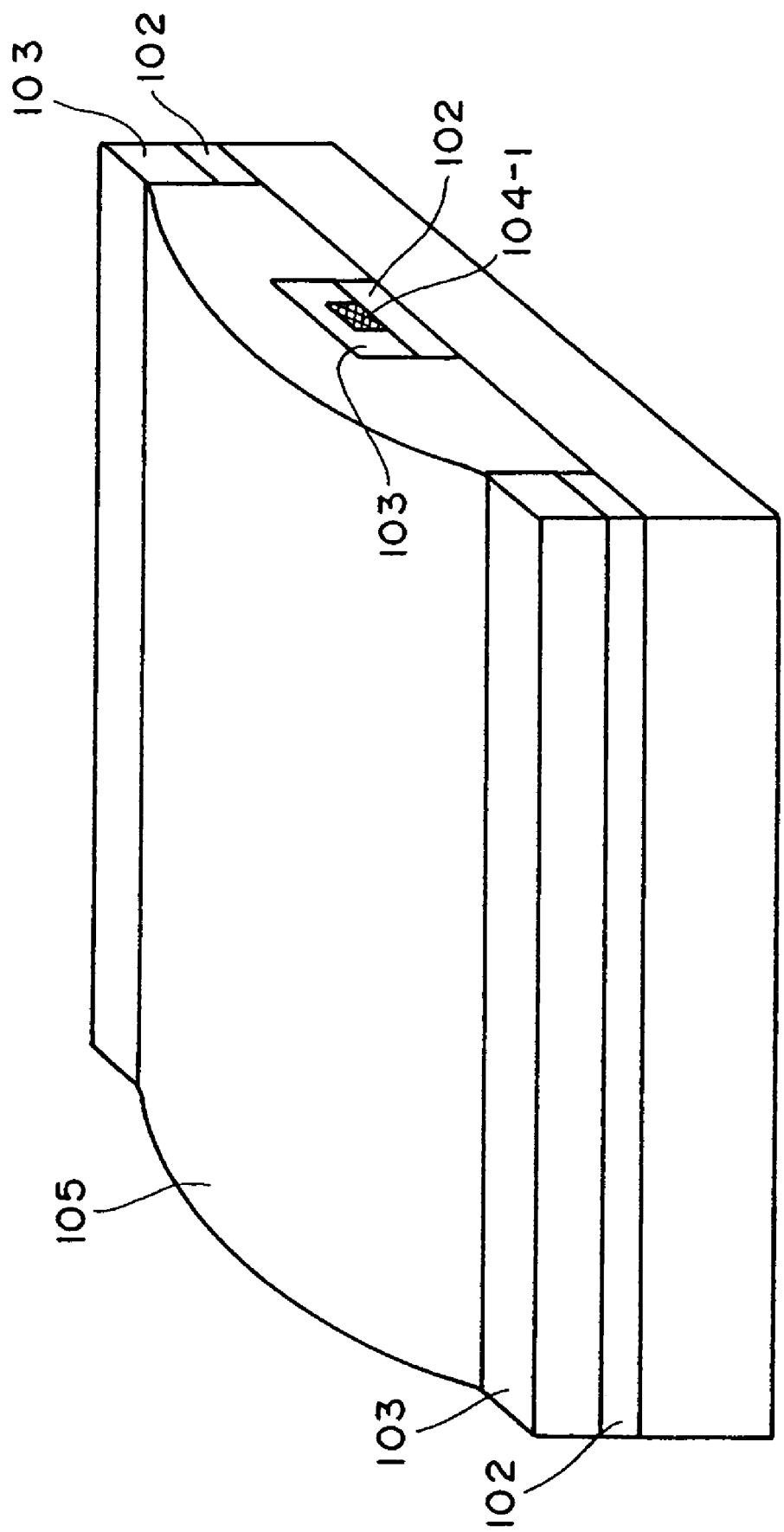
FIG. 19 is a schematic perspective view which shows a state of the waveguide-embedded optical circuit 100 in fabrication process.

Further, the regions between the central rod-shaped member and the rod-shaped members on the both sides are filled with the optical resin layer 105 so as to cover the central rod-shaped member (FIG. 19), the optical resin layer 105 is hardened, and the groove 106 is formed (FIG. 6, FIG. 7). The method of forming the groove 106 is not particularly limited, but it is preferably formed by dicing using a dicing machine.

In the waveguide-embedded optical circuit 100, after the light entering the first optical waveguide propagates through the first core toward the groove 106, propagates through the transition waveguide and the second optical waveguide, exit at the groove 106, and then enters the second optical waveguide. Since the energy of the light entering the second optical waveguide is confined at a region 10 μm from the surface of the second core (first cladding), it is preferable for the thickness of the optical resin layers 107-1, 107-2, 108-1, 108-2 serving as the second cladding to be 10 μm or greater.

Other preferred embodiments of the present invention will now be explained.

Figure 20:
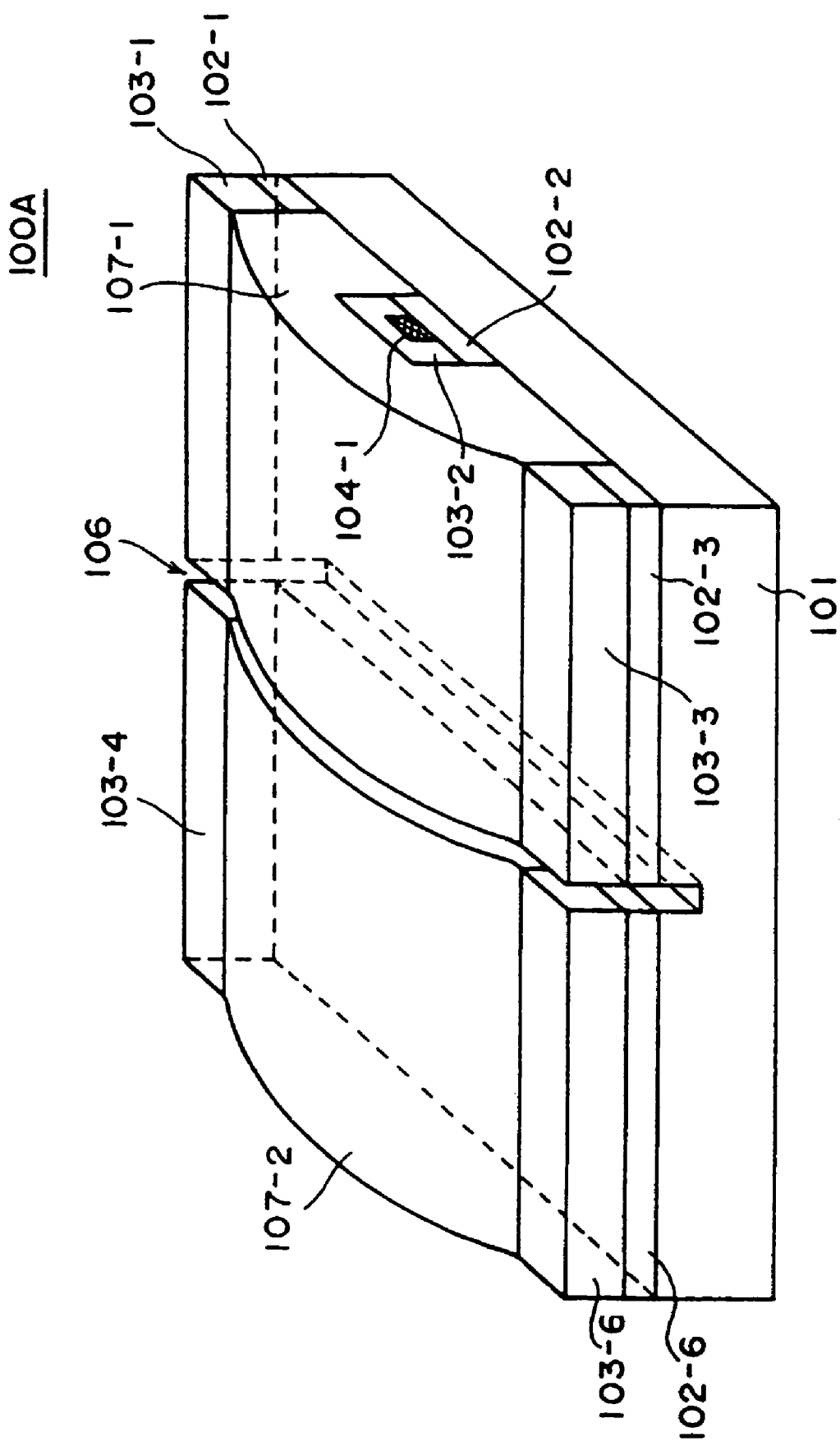
FIG. 20 is a schematic perspective view showing the waveguide-embedded optical circuit 100A that is the other preferred embodiment of the present invention.

FIG. 20 is a schematic perspective view showing a waveguide-embedded optical circuit 100A that is another preferred embodiment of the present invention.

As shown in FIG. 20, the waveguide-embedded optical circuit 100A is different from the waveguide-embedded optical circuit 100 shown in FIG. 6 in the point that a ladder silicone is used for the optical resin layers 107-1, 107-2. The waveguide-embedded optical circuit 100A is the same as the waveguide-embedded optical circuit 100 shown in FIG. 6 in other aspects.

In the case of the functional group having siloxane as its main chain structure generally contained in silicone, the optical characteristic of the waveguide are degraded owing to light absorption that occurs as a function of the vibration mode and frequency. However, in this embodiment, the functional group having siloxane as its main chain structure contained in ladder silicone is removed by condensation occurring when ladder silicone is heated. Therefore, degradation of the optical characteristic of the waveguide caused by absorption of light can be prevented.

Moreover, since ladder silicone and silica glass have siloxane as their main chain structure, the thermal expansion coefficients of ladder silicone and silica glass are almost the same and the temperature dependency of the refractive indexes of ladder silicone and silica glass are also almost the same. Therefore, when the lower cladding layer 102 and the upper cladding layer 103 are formed of silica glass, the thermal expansion coefficient of the center rod-shaped member and the optical resin layers 107-1, 107-2 are almost the same and the temperature dependency of the refractive indexes of the central rod-shaped member and the optical resin layers 107-1, 107-2 is also almost the same. Consequently, the strain induced by difference in thermal expansion coefficient at the boundary of the central rod-shaped member and the optical resin layers 107-1, 107-2 can be prevented. And a change of the difference of the refractive indexes induced by temperature dependency at boundary of the center rod-shaped member and the optical resin layers 107-1, 107-2 can be prevented.

As a shown FIG. 20, the waveguide-embedded optical circuit 100A is fabricated by coating and heating the paste of the ladder silicone on the surface of the central rod-shaped member among the three parallel rod-shaped members shown in FIG. 18 and hardening the ladder silicone.

Another preferred embodiment of the present invention will now be explained.

Figure 21:
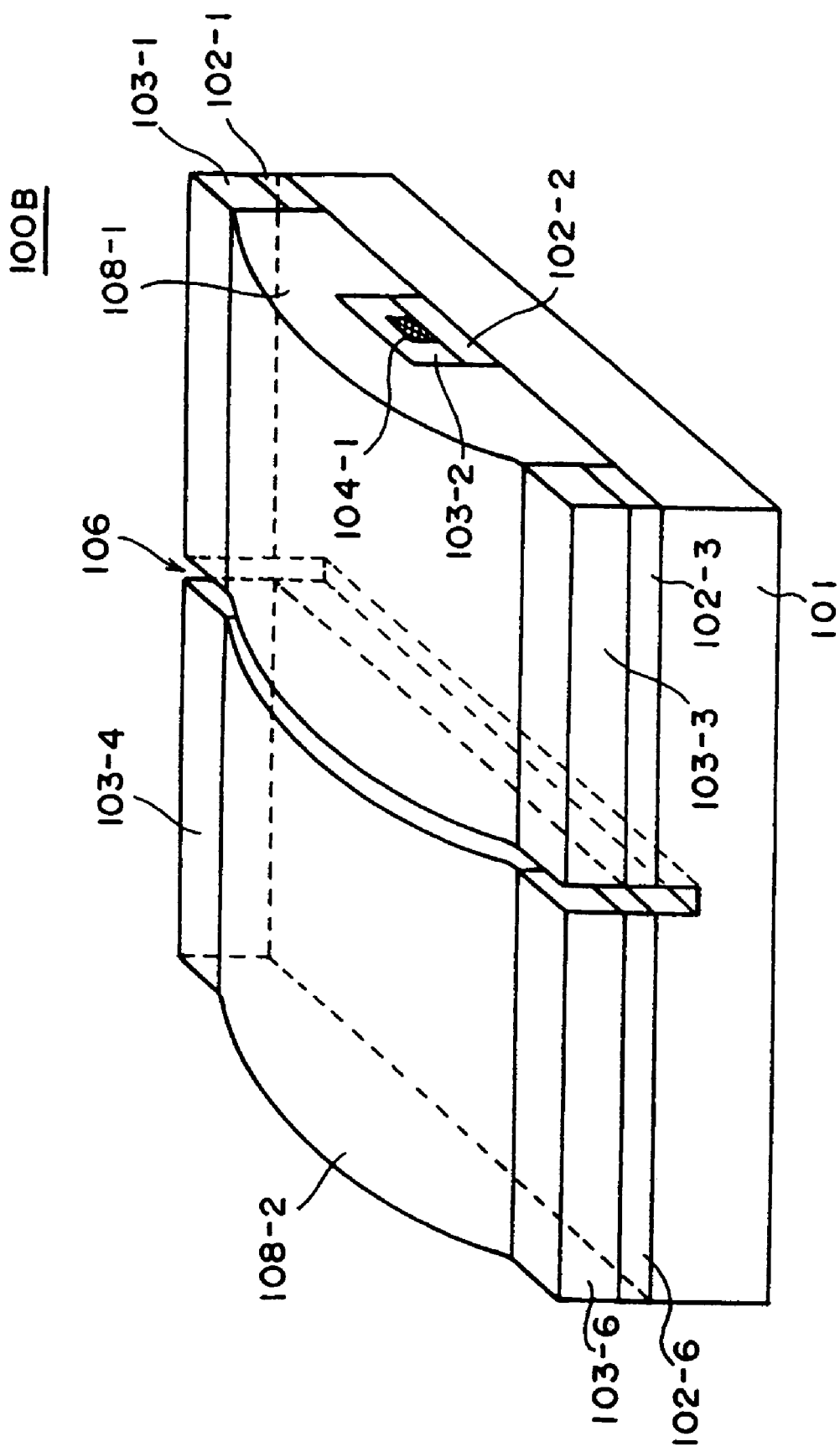
FIG. 21 is a schematic perspective view showing the waveguide-embedded optical circuit 100B that is the other preferred embodiment of the present invention.

FIG. 21 is a schematic perspective view showing a waveguide-embedded optical circuit 100B that is another preferred embodiment of the present invention. The center rod-shaped member and the optical resin layers 108-1, 108-2 are formed using the same silica glass. Consequently, strain induced by difference in thermal expansion coefficient at the boundary of the central rod-shaped member and the optical resin layers 108-1, 108-2 can be prevented. And a change of the difference of the refractive indexes induced by temperature dependency at the boundary of the center rod-shaped member and the optical resin layers 108-1, 108-2 can be prevented.

As a shown FIG. 21, the waveguide-embedded optical circuit 100B is different from the waveguide-embedded optical circuit 100 shown in FIG. 6 in the point that silica glass is used for the optical resin layer 105. The waveguide-embedded optical circuit 100B is the same as the waveguide-embedded optical circuit 100 shown in FIG. 6 in other aspects.

The lower cladding layer 102, the upper cladding layer 103, and the optical resin layers 108-1, 108-2 are formed using the same silica glass. Consequently, the strain induced by difference in thermal expansion coefficient at the boundary of the central rod-shaped member and the optical resin layers 108-1, 108-2 can be prevented. And the strain induced by difference in the temperature dependency of the refractive indexes at the boundary of the center rod-shaped member and the optical resin layers 108-1, 108-2 can be prevented.

As a shown FIG. 21, the waveguide-embedded optical circuit 100B is fabricated by forming a silica glass film on the surface of the central rod-shaped member among the three parallel rod-shaped members shown in FIG. 18.

The silica glass film is formed using the CVD process, the sputtering process, the vacuum deposition process, the FHD process or the sol-gel process.

In the case where the silica glass film is formed by the CVD process, it is desirable to raise the temperature of the surface of the central rod-shaped member to promote formation of the silica glass film. This enables reliable formation of the silica glass film over the whole surface of the central rod-shaped member.

In the case where the silica glass film is formed by the sputtering process or the vacuum deposition process, it is desirable to use an apparatus having rotary and revolutionary mechanisms. This enables the silica glass film to be uniformly formed over the whole surface of the central rod-shaped member by setting the substrate 101 formed with the central rod-shaped member in the apparatus equipped with the rotary and revolutionary mechanisms, and rotating and revolving the substrate 101 to deposit the silica glass vapor deposition particles on the surface of the central rod-shaped member.

In the case where the silica glass film is formed by the sol-gel process, it is desirable to form an amorphous silica film on the surface of the central rod-shaped member beforehand using liquid phase deposition or the like. By forming the amorphous silica film, it is possible to prevent cracking of the silica glass film that might be caused by volume contraction when the silica glass film is formed by the sol gel process.

Another preferred embodiment of the present invention will now be explained.

Figure 22:
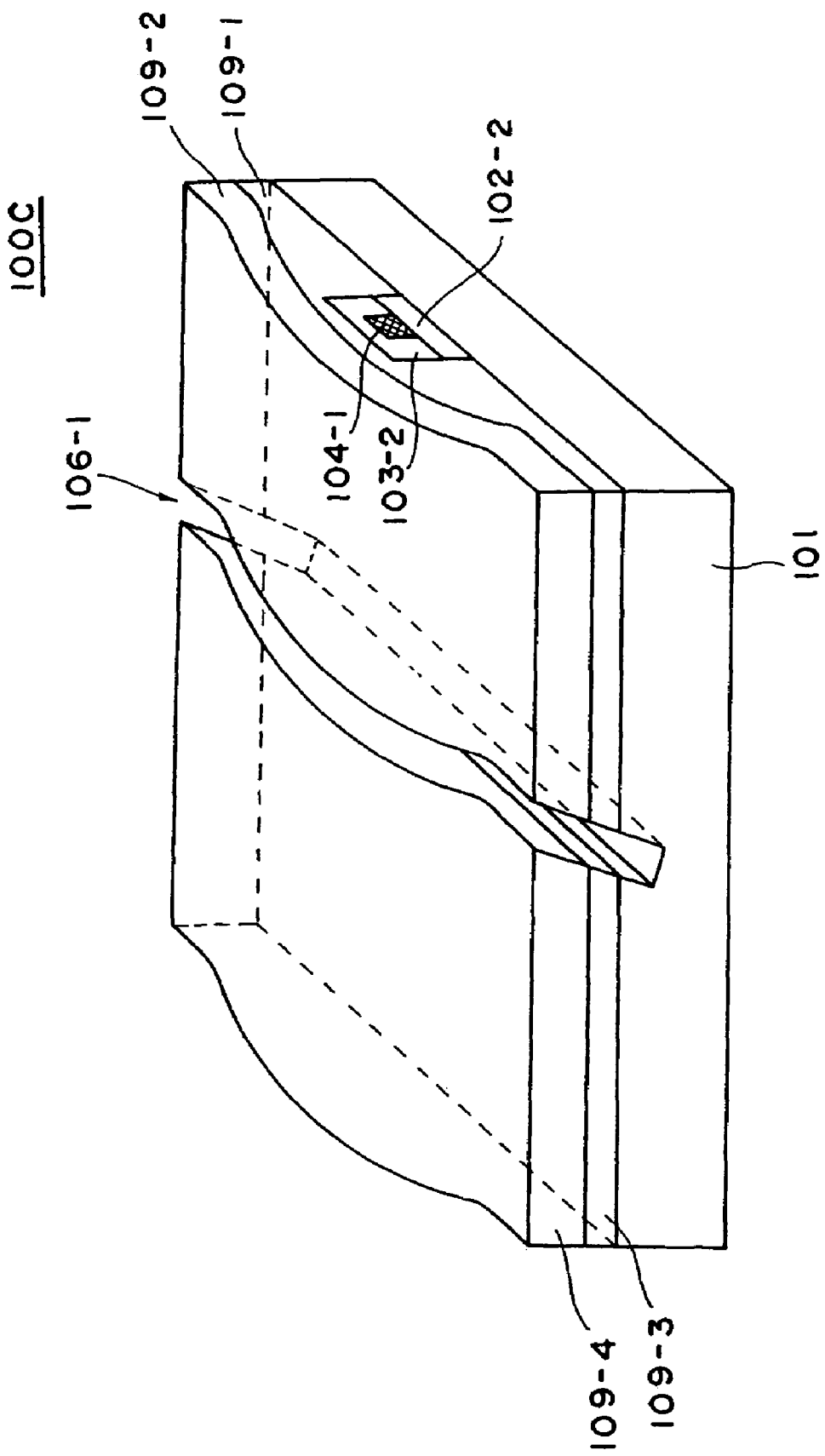
FIG. 22 is a schematic perspective view showing the waveguide-embedded optical circuit 100C that is the other preferred embodiment of the present invention.

FIG. 22 is a schematic perspective view showing a waveguide-embedded optical circuit 100C that is another preferred embodiment of the present invention.

As shown in FIG. 22, the waveguide-embedded optical circuit 100C of this embodiment comprises the substrate 101, the lower cladding layers 102-2, 102-6 (not shown), the upper cladding layers 103-2, 103-5 (not shown), the core regions 104-1–104-2 (not shown) and the optical resin layers 109-1–109-4. The wave-guide embedded optical circuit 100c is separated by a groove 106-1 into a part composed of the lower cladding layer 102-2, the upper cladding layer 103-2, the core region 104-1 and the optical resin layer 109-1, 109-2, and a part composed of the lower cladding layer 102-5, the upper cladding layer 103-5, the core region 104-2 and the optical resin layers 109-3, 109-4.

The waveguide-embedded optical circuit 100C is fabricated as following. First, a substrate 101 of given area is prepared and the lower cladding layer 102 and the core region 104 are formed in order over the whole surface of the substrate 101. The core regions 104-1,104-2 are formed by patterning the core region 104 and the upper cladding layer 103 is formed on the surface of the lower cladding layer 102 and the core region 104. One rod-shaped member is formed by patterning the layered members of the lower cladding layer 102 and the upper cladding layer 103. And the optical resin layers 109-1, 109-2 are formed to cover the rod-shaped member.

The method of forming the optical resin layers 109-1, 109-3 is not particularly limited, but it is desirable to form them by the CVD process using silica glass. The method of forming the optical resin layers 109-2, 109-4 is not particularly limited, but it is desirable to form them using ladder silicone. A good optical resin layer can be obtained by forming the optical resin layers 109-1 and 109-3 of silica glass. Moreover, the optical resin layers 109-1–109-4 can be formed in shorter time when the optical resin layer 109-2, 109-4 are formed of ladder silicone than when they are formed of silica glass.

The groove 106 is formed on the top surface of the substrate 101 to extend downward.

This completes the fabrication of the waveguide-embedded optical circuit 100C of this embodiment. However, the method of producing the waveguide-embedded optical circuit 100C of this embodiment is not limited to the foregoing, and it can also be fabricated by other methods.

A further preferred embodiment of the present invention will now be explained with reference to the drawings.

Figure 23:
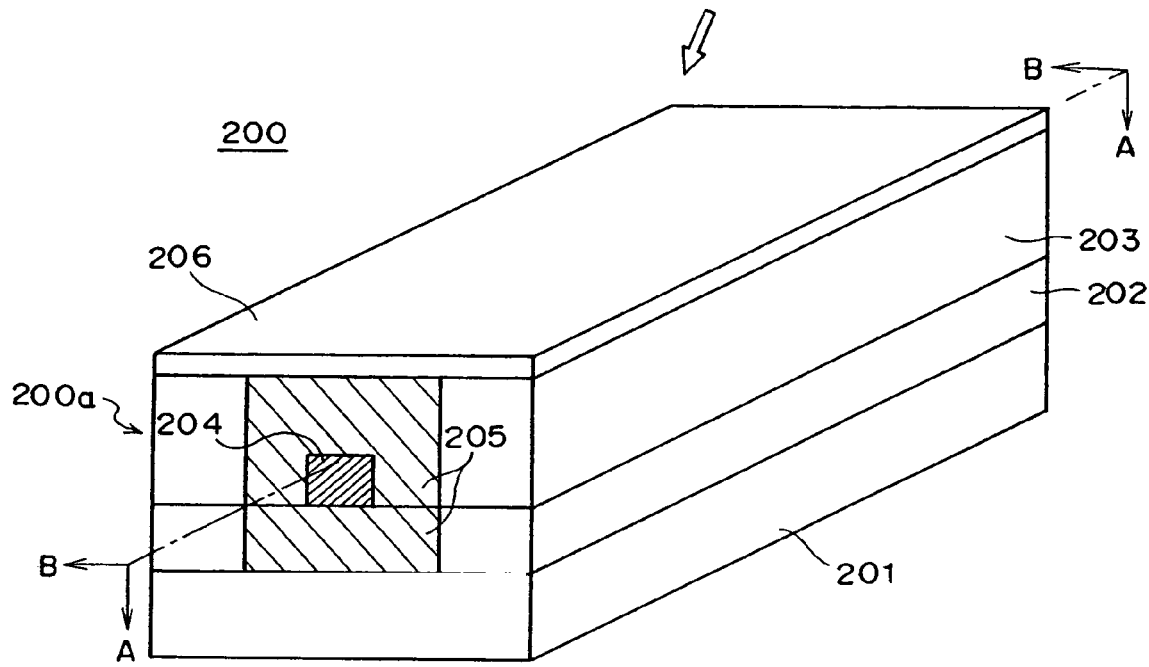
FIG. 23 is a schematic perspective view of a spot-size transformer 200 according to a preferred embodiment of the present invention seen from one side
Figure 24:
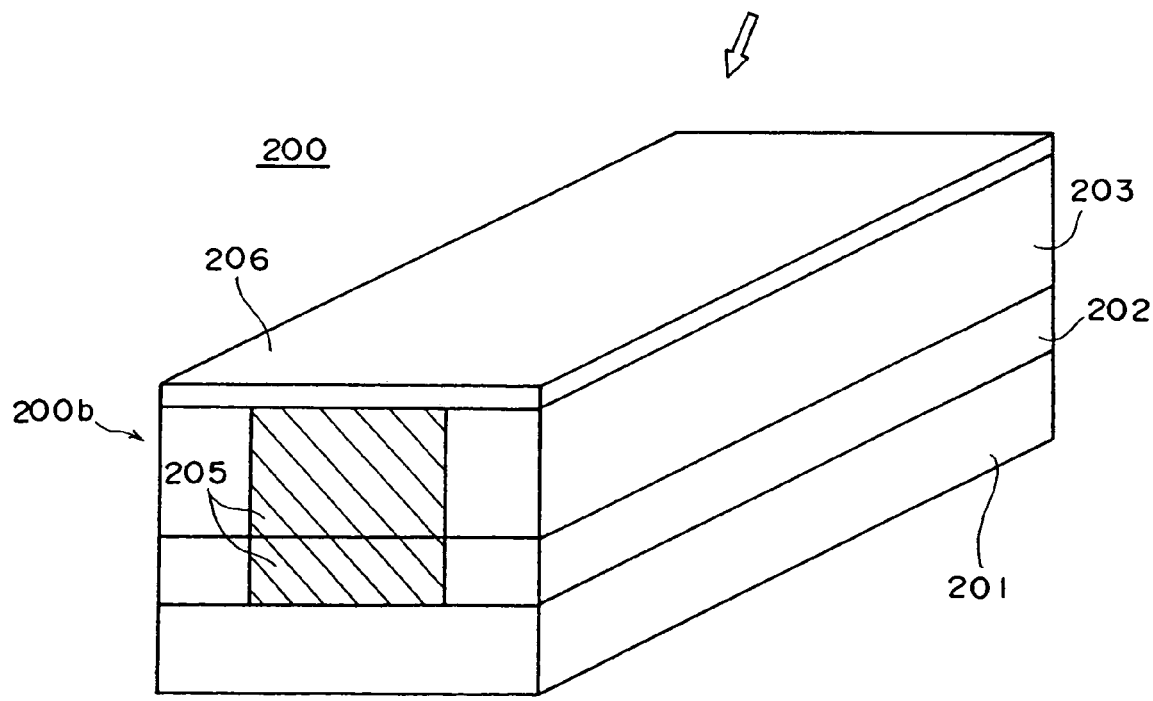
FIG. 24 is a schematic perspective view of the spot-size transformer 200 seen from opposite side.

FIG. 23 is a schematic perspective view of a spot-size transformer 200 according to a preferred embodiment of the present invention seen from one side, and FIG. 24 is a schematic perspective view of the spot-size transformer 200 seen from the opposite side. Though described later in detail, the spot-size transformer 200 of this embodiment is preferably used as a component of s waveguide-embedded optical circuit.

As shown in FIG. 23 and FIG. 24, the spot-size transformer 200 comprises a substrate 201, lower cladding layer 202, upper cladding layer 203, a core region 204, a refractive index changing region 205 and a topmost cladding layer 206, and the core region 204 and the refractive index changing region 205 which surrounds the core region 204 are exposed on one end face 200a of the spot-size transformer 200 (see FIG. 23).

The substrate 201 ensures the mechanical strength of the spot-size transformer 200 and serves as a part of "the second cladding" described later in detail. In this embodiment, a non-doped silica glass ($SiO_2$) is used as the material of the substrate 201. The refractive index n of the silica glass is 1.446.

The lower cladding layer 202 and the upper cladding layer 203 serve as part of "the second cladding" described later in detail. In this embodiment, germanium (Ge) and Boron (B)-doped silica glass (GBSG) is used as the material of the lower cladding layer 202 and the upper cladding layer 203. If germanium (Ge) is doped to silica glass, the refractive index increases, and if boron (B) is doped to silica glass, the refractive index decreases. Therefore, the refractive indexes of the lower cladding layer 202 and the upper cladding layer 203 become almost the same as the refractive index (n=1.4460) of the substrate 201 which consists of non-doped silica glass. The germanium (Ge) is doped so that part of the lower cladding layer 202 and the upper cladding layer 203 can be changed into a refractive index changing region 205 by irradiation of ultraviolet rays, and the boron (B) is doped in order to reduce the refractive index raised by doping of germanium (Ge) and match the index to the almost the same refractive index as the substrate 201. Therefore, the element doped together with the Germanium (Ge) can be any element that reduces the refractive index of silica glass, and, for example, iron (Fe) may be used with or instead of boron (B).

The refractive index changing region 205 serves as "the first cladding" and "the second core" described later in detail, and it is formed by irradiating part of the lower cladding layer 202 and the upper cladding layer 203 with ultraviolet rays. Although the refractive index changing region 205 has the same composition as the lower cladding layer 202 and the upper cladding layer 203, it has a refractive index (n=1.4485) higher than that of the lower cladding layer 202 and the upper cladding layer 203 because refractive index increases when silica glass including germanium (Ge) is exposed to ultraviolet rays.

The core region 204 serves as "the first core" described later in detail, and germanium (Ge), boron (B) and phosphorus (P)-doped silica glass (GBPSG) is used as the material of the core region 204 in this embodiment. Since the core region 204 is covered with the refractive index changing region 205 and it includes germanium (Ge), the refractive index of the core region 204 after irradiation with ultraviolet rays increases relative to that at the time of film forming. Further, since the refractive index of the silica glass increases when phosphorus (P) is doped, the refractive index of the core region 204 is higher than the refractive index changing region 205 which surrounds it (n=1.4517). However, in order to match the refractive indexes before and after irradiation of ultraviolet rays in the core region 204 and the refractive index of the changing region 205 into agreement, it is preferable to make the concentration of the germanium (Ge) doped to the refractive index changing region 205 and the concentration of the germanium (Ge) doped to the core region 204 almost equal. In addition, it is more preferable to make the concentration of the boron (B) doped in the refractive index changing region 205 and the concentration of the boron (B) doped in the core region 204 almost equal.

The topmost cladding layer 206 serves as a part of the second cladding described later in detail, and non-doped silica grass (SiO$_2$) is used s the material for the topmost cladding layer 206 in the embodiment. As described above, the refractive index of the non-doped silica glass is 1.4460.

Figure 25:
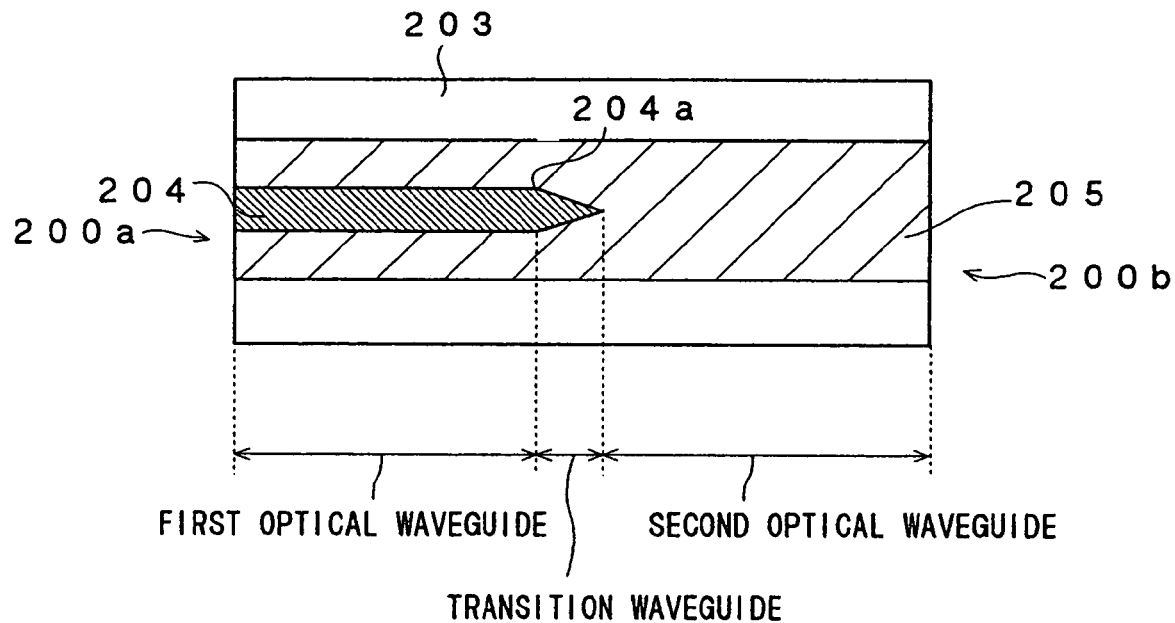
FIG. 25 is a cross sectional view taken along line A—A of FIG. 23.
Figure 26:
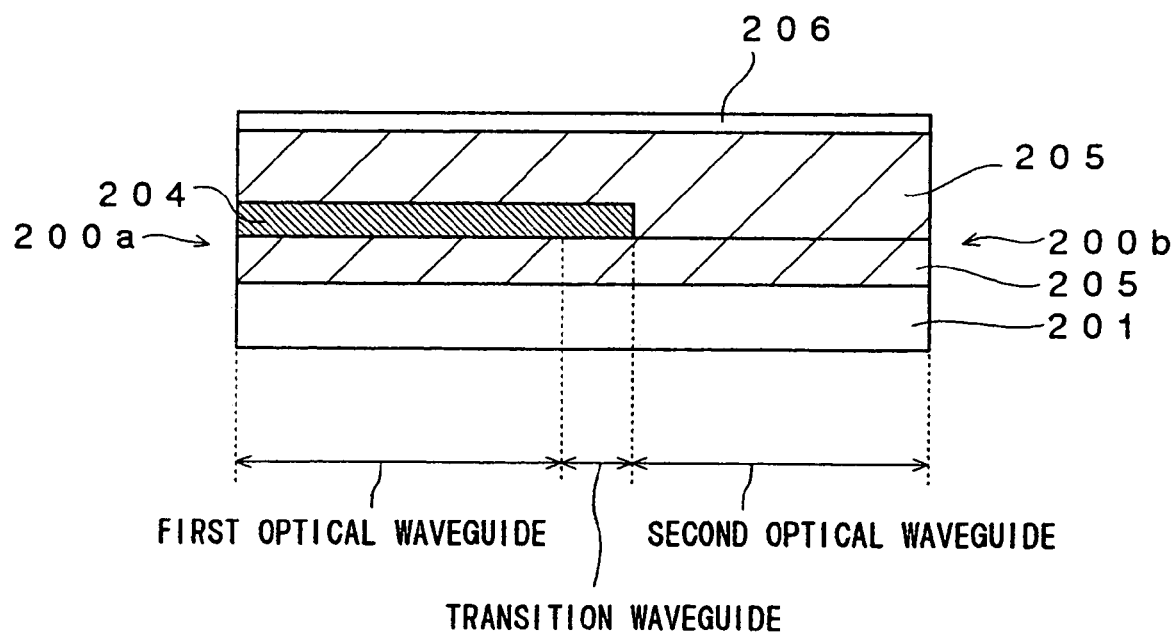
FIG. 26 is a cross sectional view taken along line B—B of FIG. 23.

FIG. 25 is a cross sectional view taken along line A—A in FIG. 23, and FIG. 26 is a cross sectional view taken along line B—B of FIG. 23.

As shown in FIG. 25 and FIG. 26, the core region 204 has substantially a fixed width (the vertical length of the up and down in FIG. 25) in the section from the end face 200a, and after that, the width of the end portion of the core region 204 becomes gradually narrower as it goes toward the end face 200b. For this reason, the core region 204 is not present between the lower cladding layer 202 and the upper cladding layer 203 in the portion near the end face 200b and the two layers are contacted each other there in a state of being laminated directly.

Moreover, the refractive index changing region 205 is formed to have a fixed width (the vertical length of the up and down in FIG. 25) in the section from the end face 200a to the end face 200b. However, it is not necessary to form the refractive index changing region 205 in portion in which the width of the core region 204 is fixed, and it may be formed in the section from the end face 200b to the position 204a where the core region 204 is formed to taper. Moreover, the height (the vertical length of the up and down in FIG. 26) of the refractive index changing region 205 is as same as the height of the layered members of the lower cladding layer 202 and the upper cladding layer 203. As described above, the width and height of the refractive index changing region 205 (the vertical length of the up and down in FIG. 26) is set substantially uniform.

In this specification, the section in the spot-size transformer 200 where the width of the core region 204 is set substantially uniform is called "the first waveguide", the section where the core region 204 is not present is called "the second waveguide", and the section where the width of the core region 204 becomes gradually narrower as it goes toward the end face 200b is called "the transition waveguide". That is, the spot-size transformer 200 of this embodiment comprises the first optical waveguide, the second waveguide and the transition waveguide provided between the first optical waveguide and the second optical waveguide.

The first waveguide is a channel type optical waveguide constituted by the first the core and first cladding, and the second optical waveguide is a channel type optical waveguide, constituted by the second core and the second cladding. As mentioned above, each of the first cladding and the second core is constituted by the refractive index changing region 205. Moreover, the transition waveguide is the region where the core changes from the first core to the second core and the cladding changes from the first cladding to the second cladding. In this transition region, the beam spot-size propagated changes from the relatively small spot-size in the first optical waveguide to a relatively large spot-size in the second optical waveguide (from relatively large spot-size in the second optical waveguide to relatively small spot-size in the first optical waveguide). That is, the actual the spot size transformation is performed in the transition waveguide.

Figure 27:
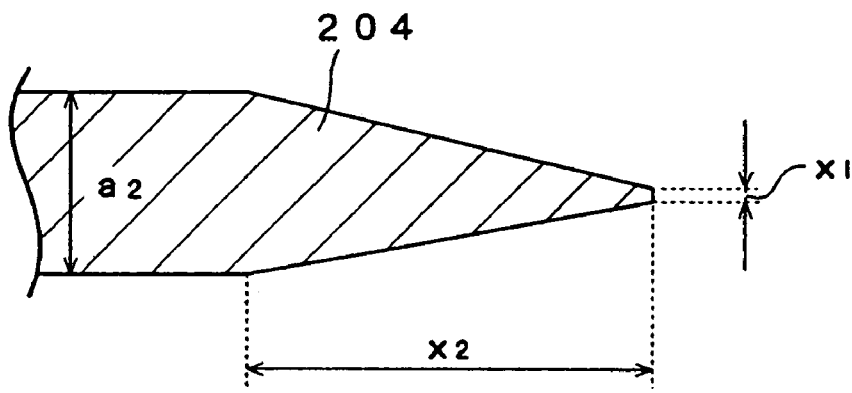
FIG. 27 is an expanded plain view which shows the end of the core region 204.

It is preferable for the end of the taper portion of the core region 204 to be sharper from the theoretical viewpoint of suppressing excessive loss. However, from the viewpoint of actual fabrication, a shape with the end of the taper portion cut off as shown in FIG. 27 is preferable. In this case, the width of the end part "$x_1$" is preferably set to a small value within the range which does not vary greatly depending on the fabrication conditions. Specifically, it is preferably set to 1 μm or less, more preferably set to 0.6 μm or less. If the width $x_1$ of the end part is set to 1 μm or less, it becomes possible to suppress excessive loss to about 0.8 dB or less in most cases, and if the width $x_1$ of the end part is set to 0.6 μm or less, it becomes possible to suppress excessive loss to about 0.4 dB or less in most cases. The length "x2" of the tapered part is not limited but it is preferably set between about from 100 times to 200 times the width $a_2$ of the untapered part (the region corresponding to the first optical waveguide) in the core region 204. By these settings, it becomes possible to prevent enlargement of the spot-size transformer and effectively suppress the excessive loss generated in the transition waveguide.

Figure 28:
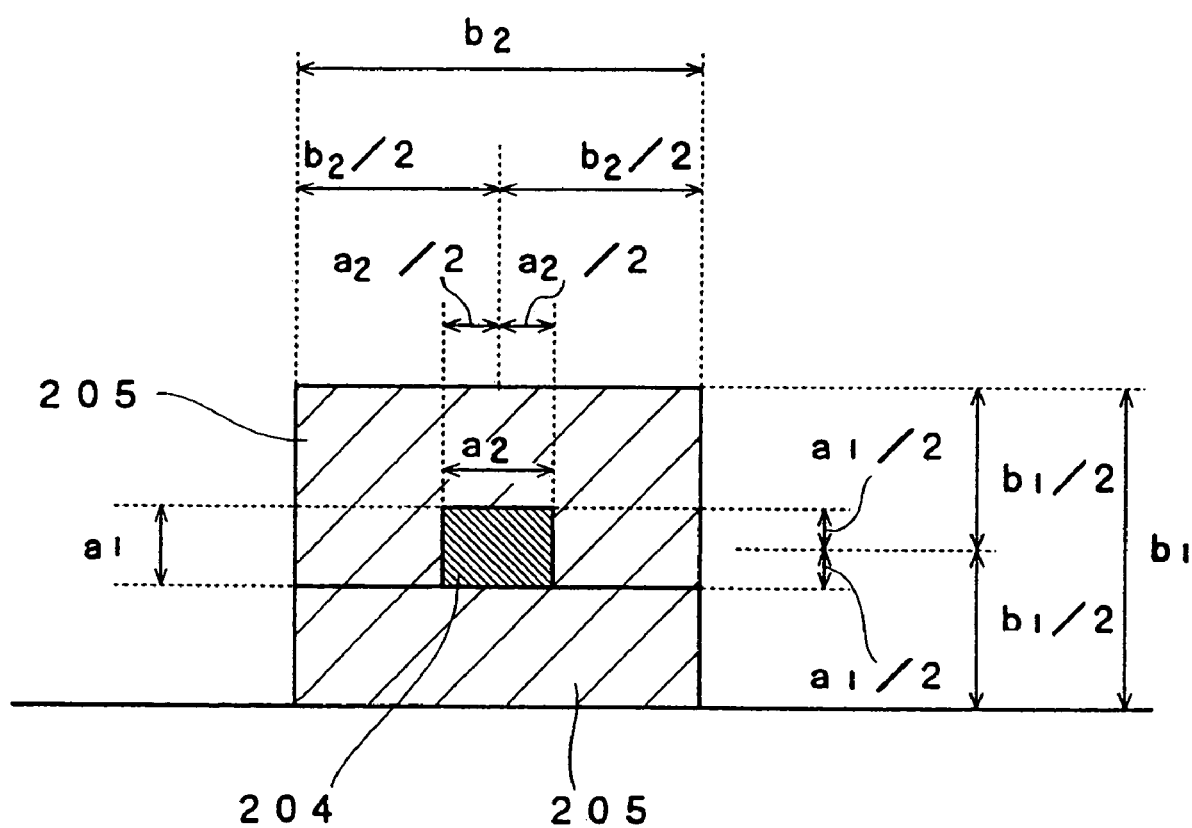
FIG. 28 shows a desirable configuration between the core region 204 and the refractive index region 205 and a part of the end face 200a shown in FIG. 23 on larger scale.

FIG. 28 shows a desirable configuration between the core region 204 and the refractive index region 205 and a part of the end face 200a shown in FIG. 23 on larger scale.

As shown in FIG. 28, when the height of the core region 204 is set to $a_1$ and the height of the refractive index changing region 205 is set to $b_1$, it is preferable to align the line which separates the core region 204 in the height direction $a_1/2$ and the line which separates the refractive changing region 205 in the height direction $b_1/2$ substantially coincide. That is, it is preferable to align the center line in the height direction of the core region 204 and the center line in the height direction of the refractive index changing region 205 substantially coincide. Similarly, when the width of the core region 204 is set to $a_2$ and the width of the refractive index changing region 205 is set to $b_2$, it is preferable to align the line which separates the core region 204 in the height direction $a_2/2$ and the line which separates the refractive changing region 205 in the height direction $b_2/2$ substantially coincide. That is, it is preferable to align the center line in the width direction of the core region 204 and the center line in the width direction of the refractive index changing region 205 substantially coincide.

The height $a_1$ and width $a_2$ of the core region 204 is not limited but is preferably set to almost the same size as the diameter of the core of and ordinary optical fiber (about 7 μm). When they are so set, it becomes possible to connect the first optical waveguide and optical fiber directly by a groove of V shape etc.

In the waveguide-embedded optical circuit 200 having the above-described configuration, after the light entering the end face 200a of the first optical waveguide propagates through the first core to the end face 200b, gradually penetrates into the first cladding in the transition waveguide where the width of the first core becomes gradually narrower. Thus, in the transition waveguide, the first cladding begins to serve as the second core as it goes toward the end face 200b and comes to serve almost totally as the second core in the second optical waveguide. Therefore, the beam spot exiting from the end face 200b is expanded to larger than the beam spot entering the end face 200a. Further, after the light entering the end face 200b in the second optical waveguide propagates through the second core to the end face 200a, it gradually penetrates to the first cladding in the transition waveguide where the width of the first core becomes gradually wider. Thus, in the transition waveguide, the second core begins to serve as the first cladding as it goes toward the end face 200a and comes to server almost totally as the first cladding in the first optical waveguide. Therefore, the beam spot exiting from the end face 200a is reduced to smaller than the beam spot entering from the end face 200b.

Next, the fabrication process of the spot-size transformer 200 of this embodiment will be explained with reference to the drawing. However, since the spot-size transformer 200 of this embodiment is preferably used as a component of a waveguide-embedded optical circuit, the spot-size transformer 200 is not necessarily separately fabricated.

Figure 29:
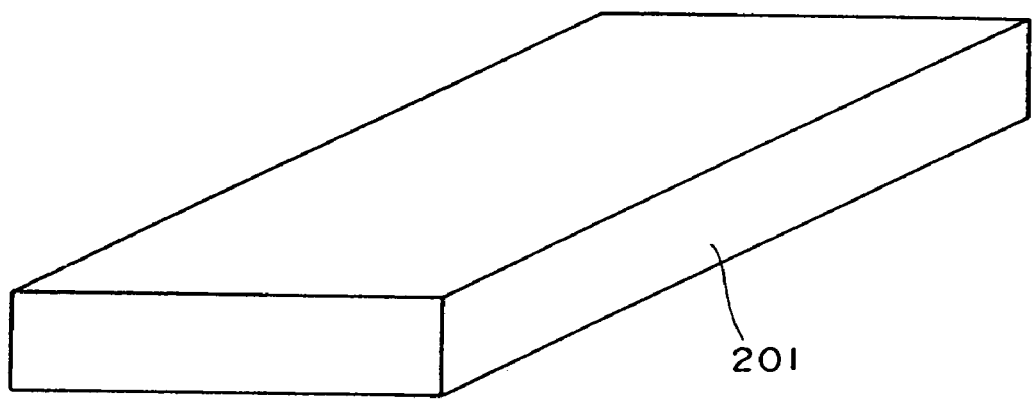
FIG. 29 shows a part of the fabrication process of the spot-size transformer 200.
Figure 30:
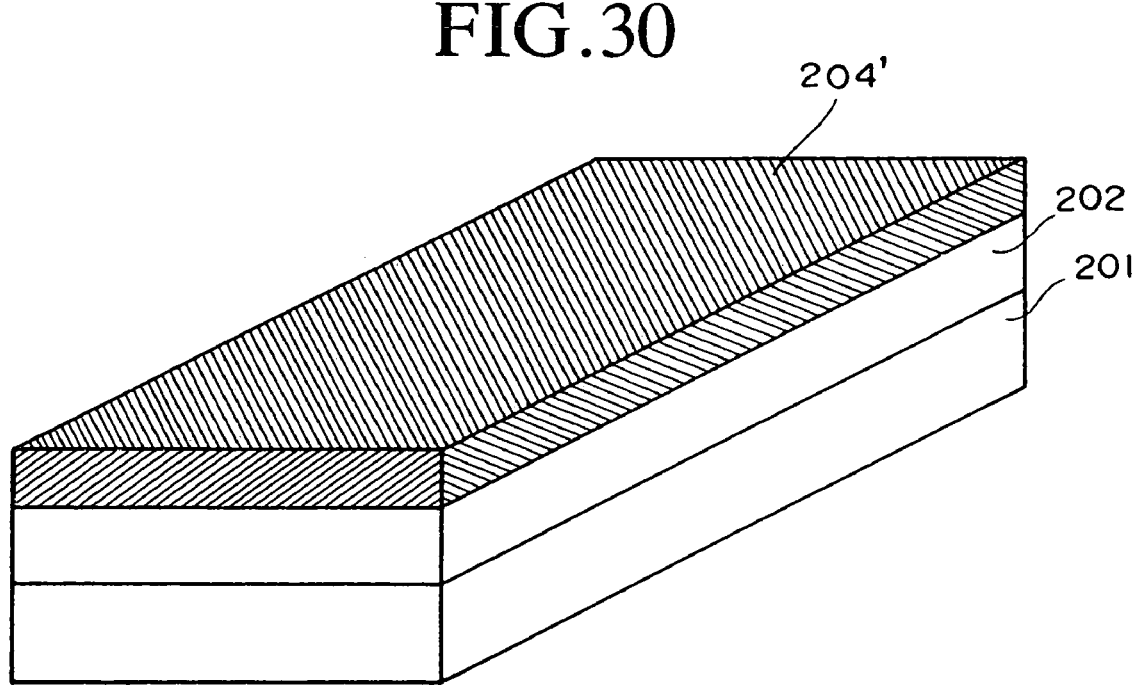
FIG. 30 shows a part of the fabrication process of the spot-size transformer 200.

First, the substrate 201 consisting of non-doped silica glass is prepared (FIG. 29) and the lower cladding layer 202 and core layer 204' are formed in order over the whole surface of the substrate 201 (FIG. 30). As mentioned above, the lower cladding layer 202 consists of germanium (Ge) and boron (B)-doped silica glass (GBSG). The core layer 204' is a layer which becomes the core region 204 by patterning and consists of germanium (Ge), boron (B), and phosphorus (P)-doped silica glass (GPSG)). The method of forming the lower cladding layer 202 and the core layer 204' is not particularly limited but a vapor phase growth process using chemical species containing elements for forming the lower cladding layer 202 and the core layer 204' such as a CVD process, a sputtering process, a vacuum deposition process, an FHD or the like is preferably used. Further, from the viewpoint of productivity and quality, the CVD method or the FHD method is more preferably used.

Figure 31:
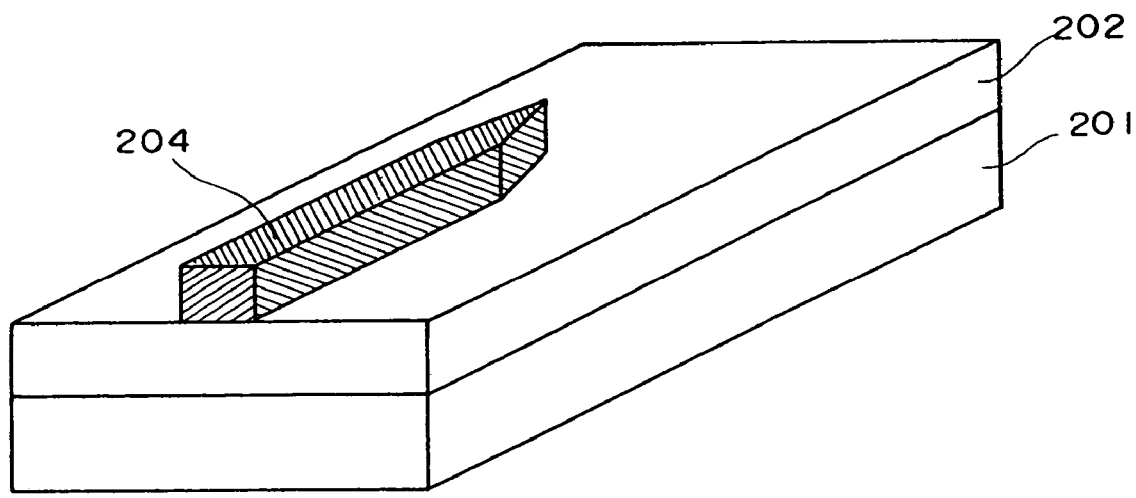
FIG. 31 shows a part of the fabrication process of the spot-size transformer 200.

Next, the core region 204 is formed by patterning the core layer 204' (FIG. 31). The core region 204 is formed to the shape mentioned above so as to provide the part where the width is fixed and the part where the width becomes gradually narrower. The method of patterning the core layer 204' is not particularly limited but it is preferable to form a metal mask layer over the whole surface of the core layer 204', apply photoresist on the metal mask layer, form an etching mask for leaving the core region 204, and remove the unnecessary portions of the core layer 204' using the etching mask. The removal of the unnecessary portions of the core layer 204' is preferably performed by dry etching.

Figure 32:
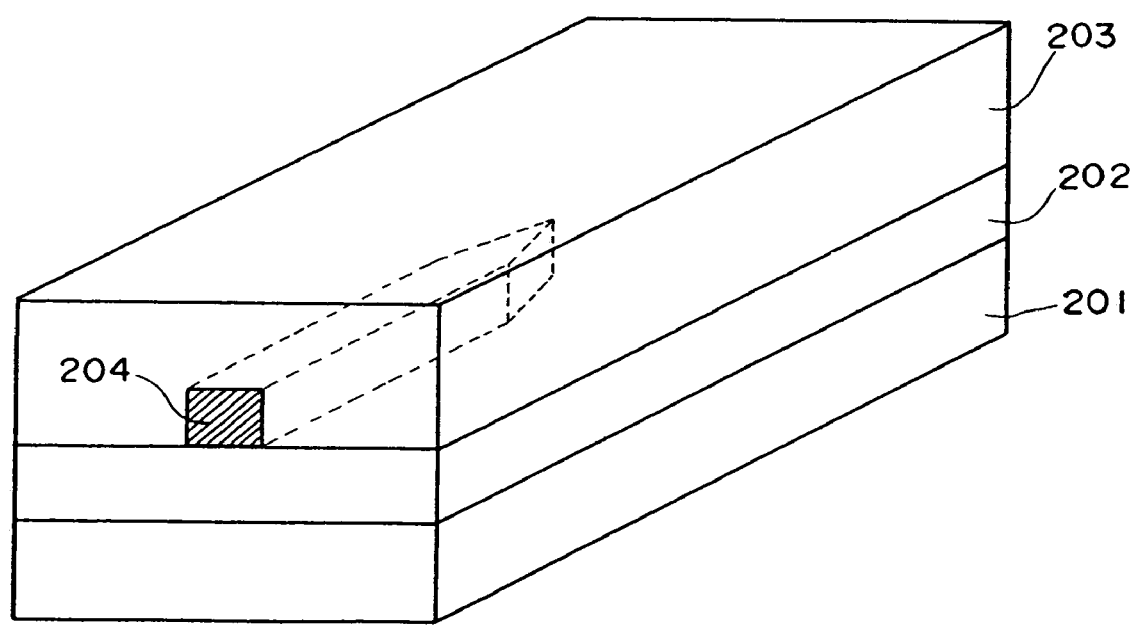
FIG. 32 shows a part of the fabrication process of the spot-size transformer 200.
Figure 33:
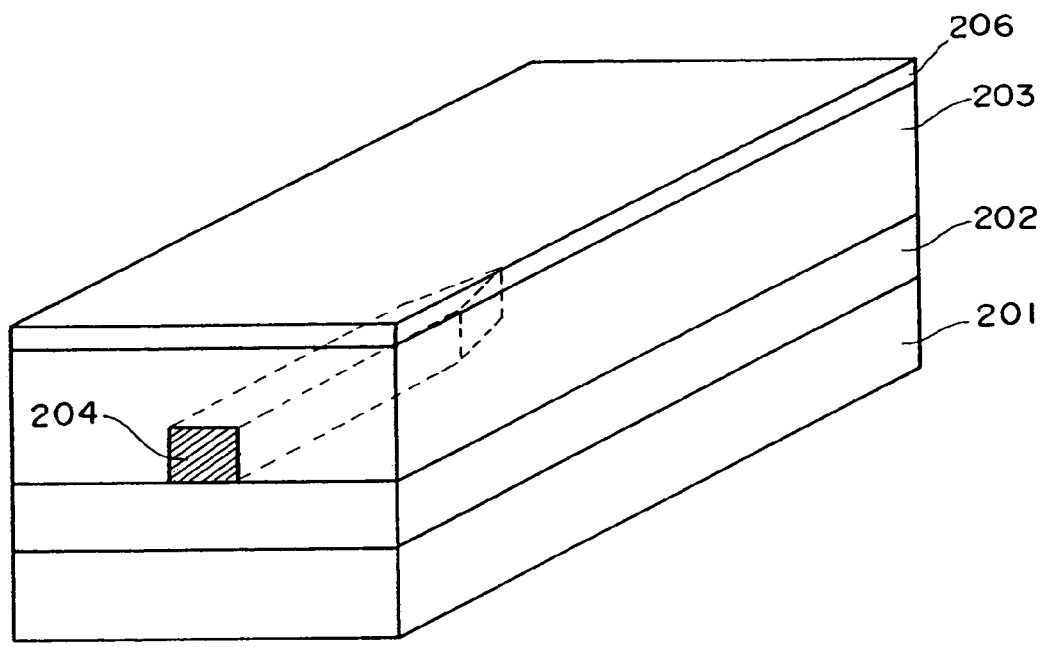
FIG. 33 shows a part of the fabrication process of the spot-size transformer 200.

Next, the upper cladding layer 203 is formed over the whole surface (FIG. 32). The method of forming the upper cladding layer 203 is not particularly limited but a vapor phase growth process using chemical species containing elements for forming the upper cladding layer 203 such as a CVD process or an FHD process is preferably used by the same method as in forming the lower cladding layer 202 and the core cladding layer 204'. Although unevenness corresponding to the core region 204 appears on the surface of the upper cladding layer in the state immediately after film formation of the upper cladding layer 203, the surface can be flattened by flowing during the annealing process. Then, the topmost cladding layer 206 is formed on the surface of the upper cladding layer 203 (FIG. 33). The method of forming the topmost cladding layer 206 is not particularly limited but vapor deposition using a chemical species containing the elements constituting the upper cladding layer 203 is preferably used by the same method as in forming the lower cladding layer 202 and the like.

Figure 34:
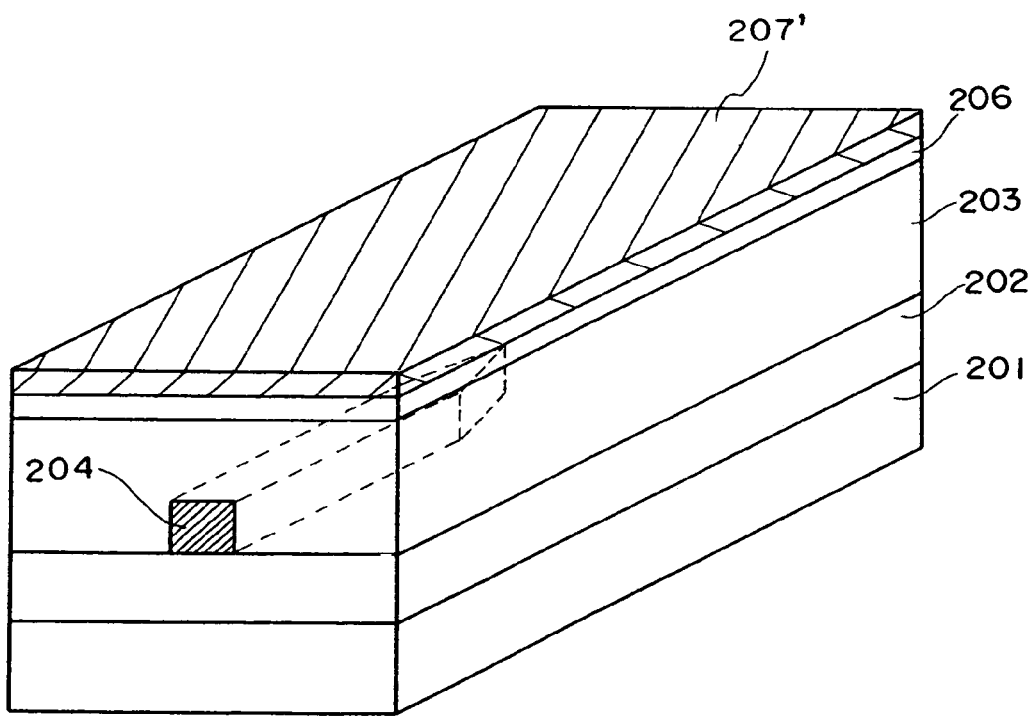
FIG. 34 shows a part of the fabrication process of the spot-size transformer 200.
Figure 35:
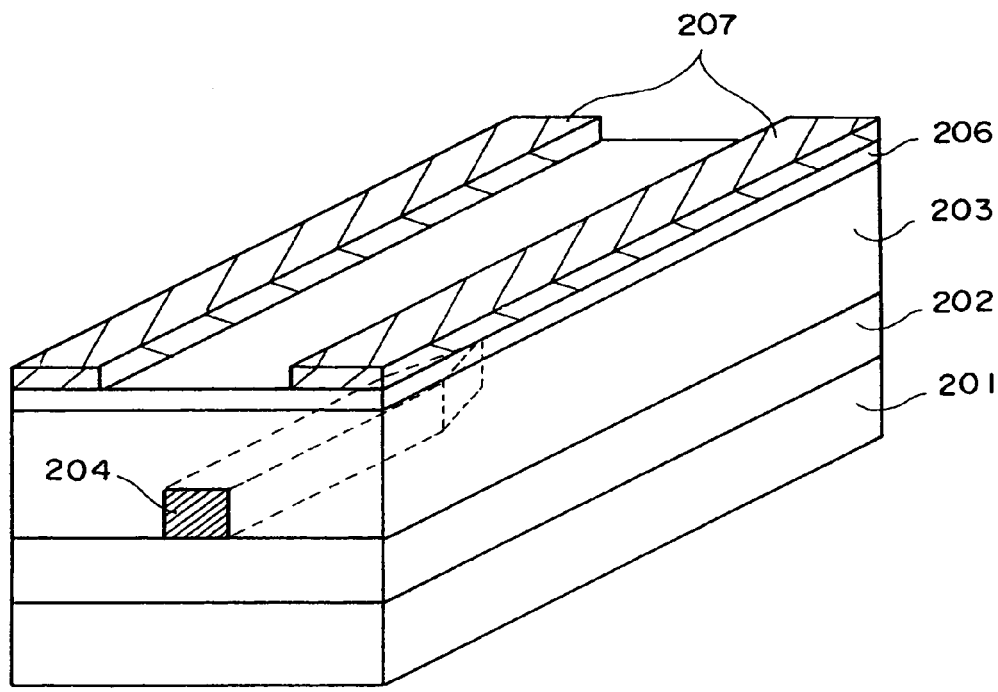
FIG. 35 shows a part of the fabrication process of the spot-size transformer 200.

Next, the metal mask layer 207' is formed on the surface of the topmost cladding layer 206 (FIG. 34) and the metal mask 207 is formed by removing the metal mask layer 207' where the transition changing region 205 should be formed (FIG. 35). The material and thickness of the metal mask layer 207' are not particularly limited insofar as metal mask layer 207' can substantially block ultraviolet rays. For example, WSi of a thickness of about 1 μm can be used. The method forming the thin film of the metal mask layer 207' is not particularly limited but vapor deposition using a chemical species containing the elements constituting the metal mask layer 207' is preferably used. From the viewpoint of productivity, sputtering is preferably used. The method of patterning the metal mask layer 207' is not particularly limited but it is preferable to form a metal mask layer over the whole surface of the metal mask layer 207', apply photoresist on the metal mask layer, form an etching mask for leaving the metal mask 207, and remove unnecessary portions of the metal mask layer 207' using the etching mask. The removal of the unnecessary portions of the metal mask layer 207' is preferably removed by dry etching.

Figure 36:
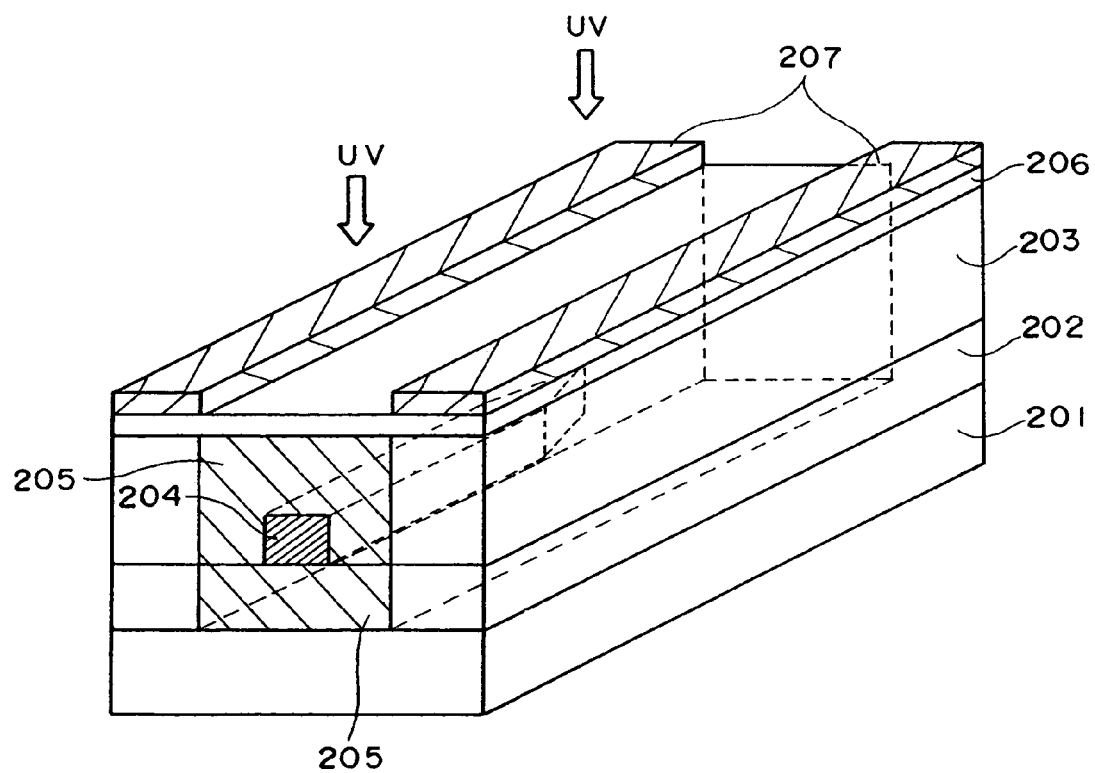
FIG. 36 shows a part of the fabrication process of the spot-size transformer 200.

Next, a portion of the surfaces of the lower cladding layer 202 and upper cladding layer 203 that is not covered by the metal mask 207 is converted into the refractive index changing region 205 by being exposed in ultraviolet rays through the patterned metal mask layer 207 (FIG. 36). More specifically, since the germanium (Ge) was doped to the lower cladding layer 202 and upper cladding layer 203, the refractive index increases upon irradiation with ultraviolet rays. As a result, a part of the lower cladding layer 202 and the upper cladding layer 203 can be made into the refractive index changing region 205 which has a high refractive index. At this time, the ultraviolet rays are irradiated onto the core region 204, so that the refractive index of the core region 204 also increases together with that of the lower cladding layer 202 and the upper cladding layer 203.

Then the metal mask 207 is removed to complete the spot-size transformer 200 of this embodiment (FIG. 23).

As described above, the spot-size transformer 200 comprises the first optical waveguide, the transition waveguide and the second optical waveguide. It can expand the relatively small spot size of a beam propagating through the first optical waveguide send it to the second optical waveguide and reduce the relatively large spot size of a beam propagating through the second optical waveguide and send to the first optical waveguide. Further, since the portion that serves as the first cladding and the second core (the refractive index changing region 205) is formed by irradiation of ultraviolet rays, the spot-size transformer 200 can be fabricated with a comparatively easy process. Further, as explained with reference to FIG. 28, it is possible to suppress the loss occurring in the transition waveguide minimum because the center of the beam spot hardly displaces in the transition waveguide if the center of the first core and the center of the second core (first cladding) are aligned.

Next, a waveguide-embedded optical circuit 300 using a pair of the spot-size transformers 200 will be explained.

Figure 37:
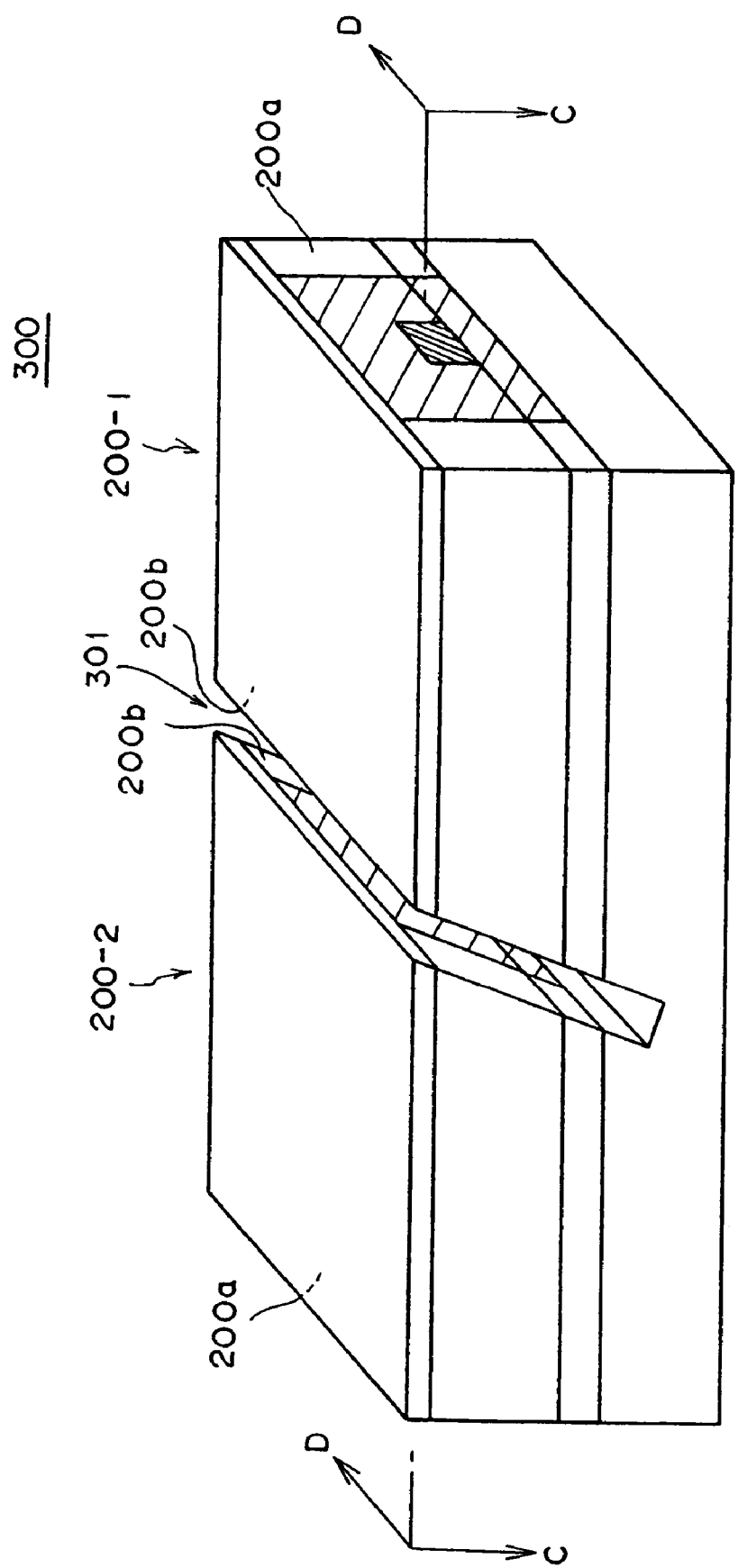
FIG. 37 is a schematic perspective view of the waveguide-embedded optical circuit 300.
Figure 38:
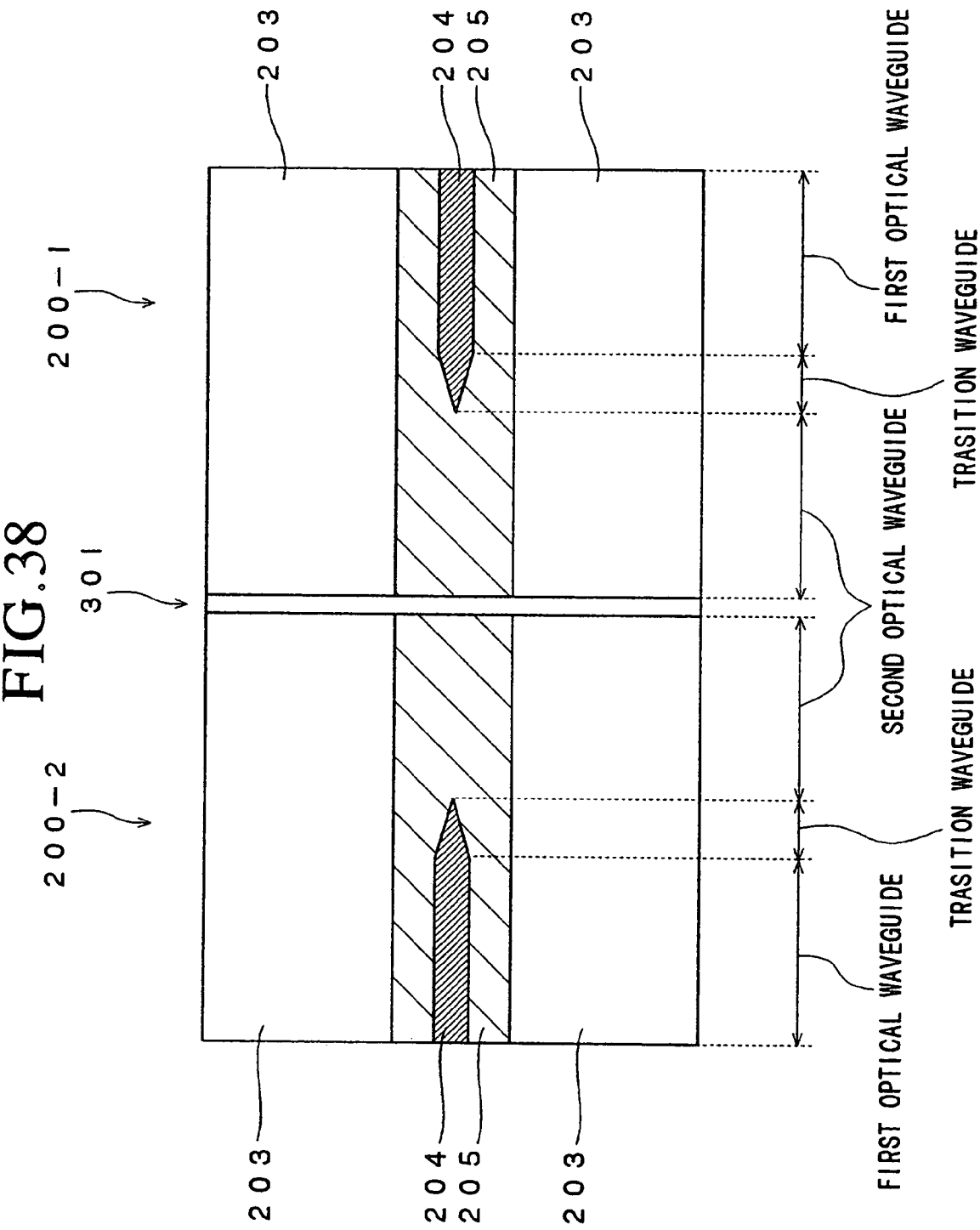
FIG. 38 is a cross sectional view taken along line C—C of FIG. 37.
Figure 39:
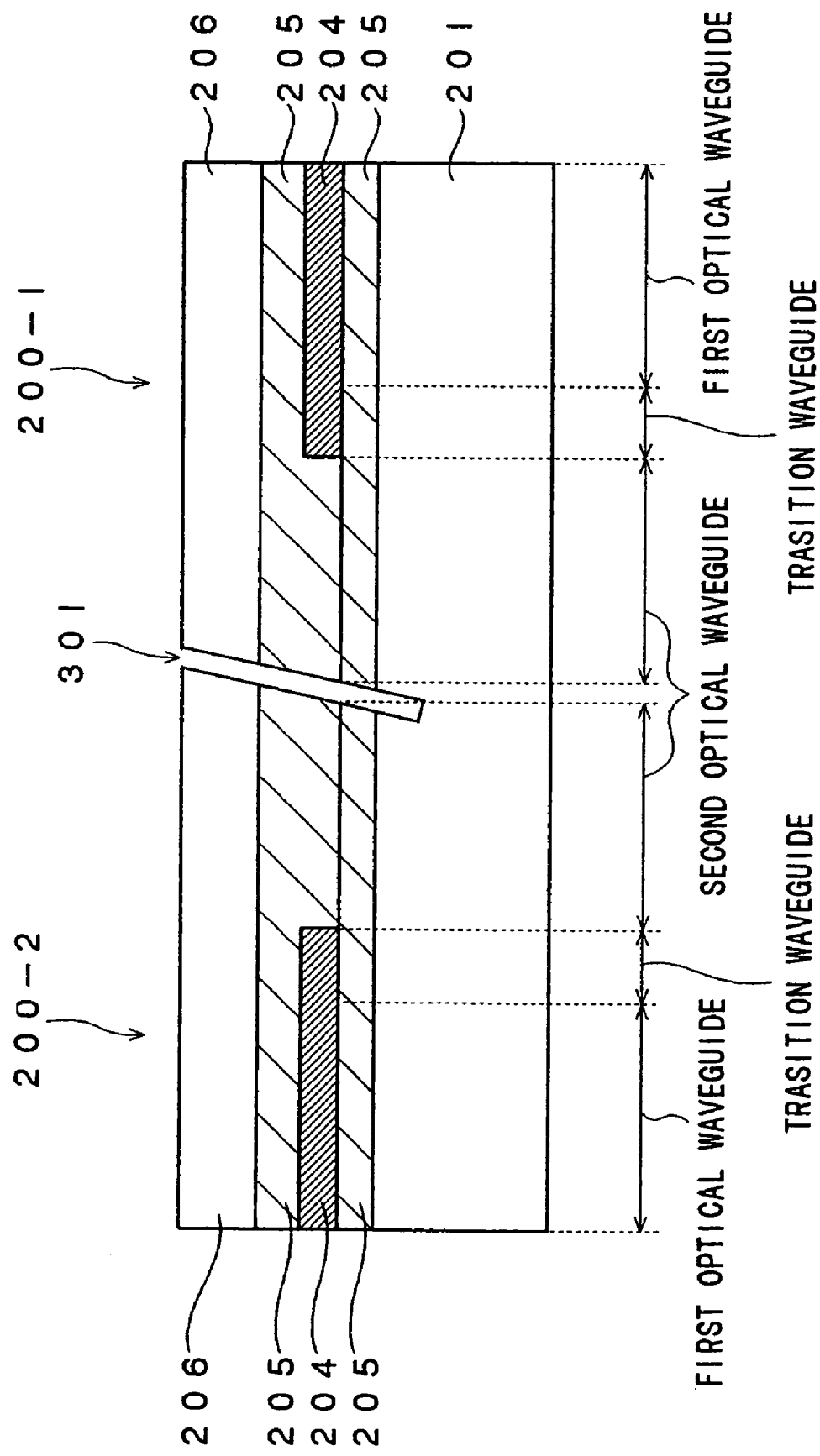
FIG. 39 is a cross sectional view taken along line D—D of FIG. 37.

FIG. 37 is a schematic perspective view of the waveguide-embedded optical circuit using a pair of the spot-size transformers 200-1, 200-2 (optical filter circuit), and FIG. 38 is a cross sectional view taken along line C—C of FIG. 37, and FIG. 39 is a cross sectional view taken along line D—D of FIG. 37.

As shown from FIG. 37 to FIG. 39, the waveguide-embedded optical circuit 300 has the structure wherein a pair of the spot-size transformer 200-1, 200-2 are arranged so that the end faces 200b face each other across a groove 301. The spot-size transformer 200-1, 200-2 has same structure as the spot-size transformer 200 shown in FIG. 23 to FIG. 28 and can be fabricated by same method as explained with reference to FIG. 29 to FIG. 36. An optical functional element such as optical filter can be inserted into the groove 301 of the waveguide-embedded optical circuit 300 of this configuration.

A groove 301 is so formed on the upper face of the substrate 201 to extend downward, that making it possible to insert an optical filter so as to covers the whole cross-sectional area of the core region 204, the upper cladding layer 203 and the lower cladding layer 202 with an optical filter inserted.

Figure 40:
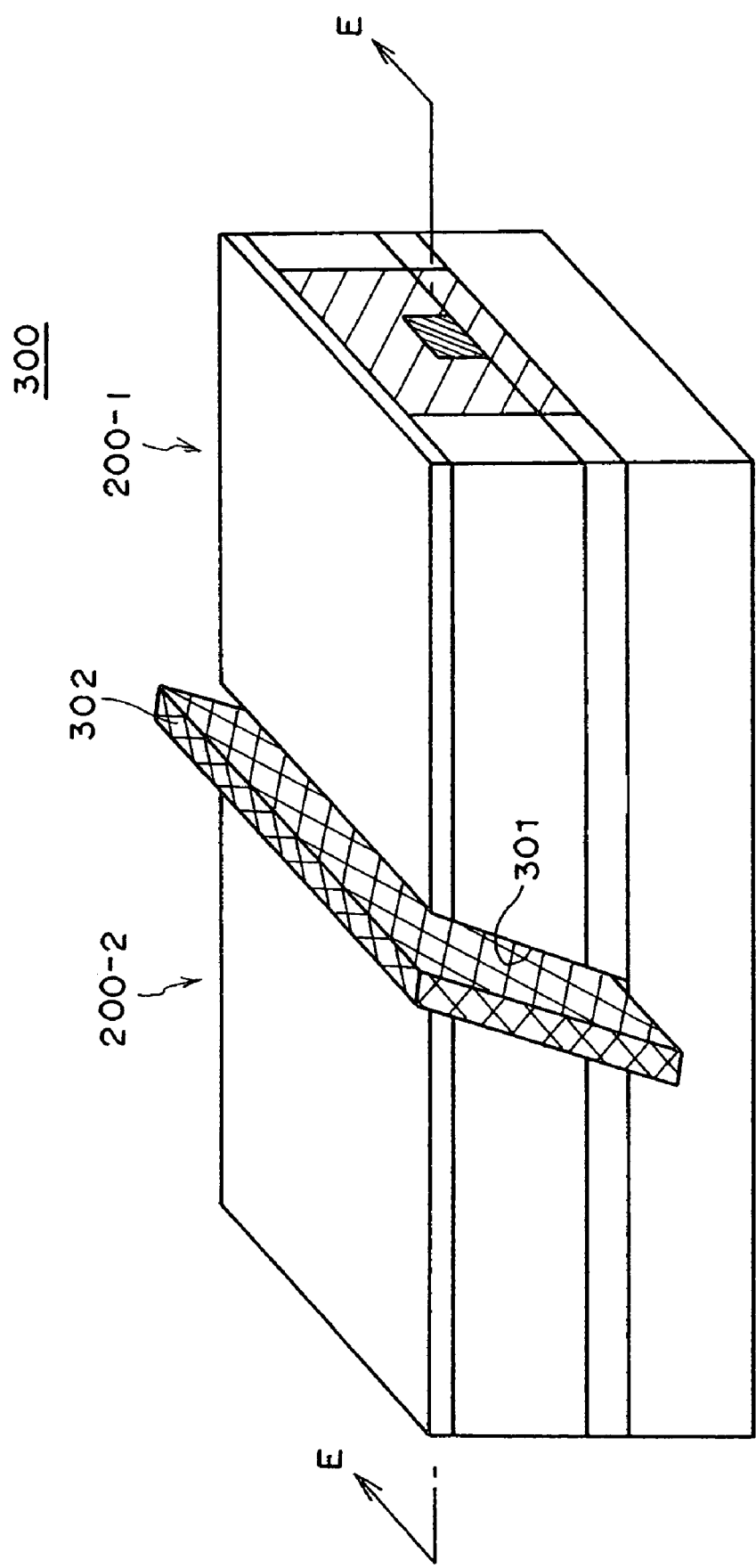
FIG. 40 is a schematic perspective view schematically showing the state where the optical filter 302 is equipped in the waveguide-embedded optical circuit 300.
Figure 41:
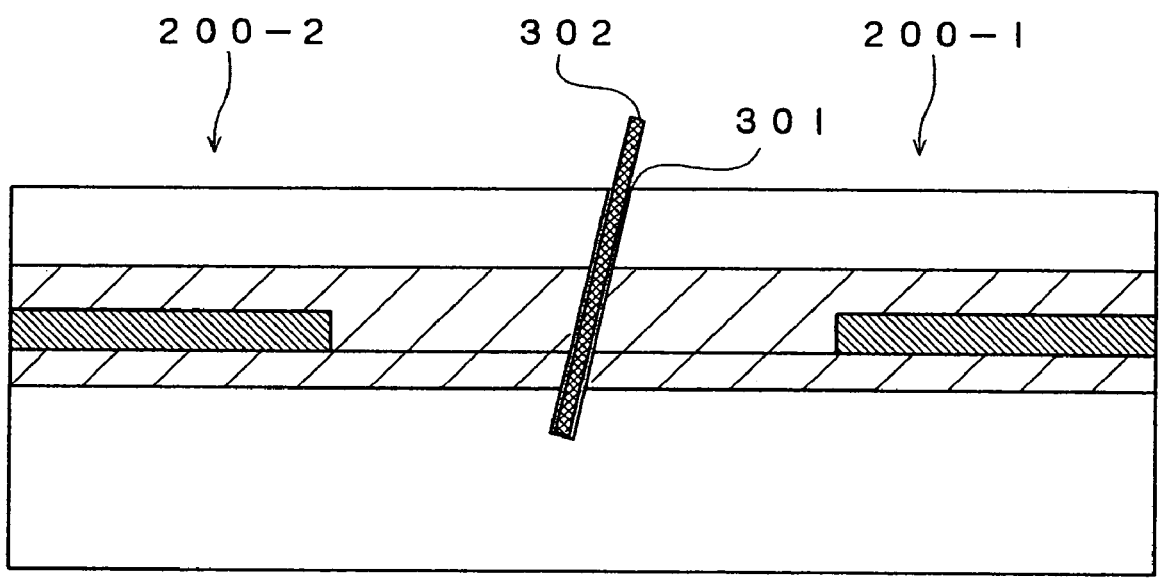
FIG. 41 is a cross sectional view taken along line E—E of FIG. 40.

FIG. 40 is a schematic perspective view schematically showing an optical filter 302 installed in the waveguide-embedded optical circuit 300, and FIG. 41 is a cross-sectional view taken along line E—E of FIG. 40. As shown in FIG. 40 and FIG. 41, the beam propagating through the waveguide constituting one side of the spot-size transformer 200-1 and 200-2 is filtered according to the characteristic of the optical filter 302 inserted into the groove 301 and transmits to the waveguide constituting the other side of the spot-size transformer 200-1 and 200-2. Thereby, it is possible to extract a light of desired wavelength.

In the waveguide-embedded optical circuit 300 of this embodiment, since the portion separated by the groove 301 serves as a second optical waveguide with a core of larger diameter than the first optical waveguide, the beam spot propagating through the groove 301 is expanded to larger than the beam spot which propagates through the first waveguide. As a result, it is possible to significantly reduce the diffraction loss arising in a groove.

As explained above, since the waveguide-embedded optical circuit 300 is configured using a pair of the spot-size transformers 200 arranged so that the end faces 200b face each other across a groove 301 and the optical filter 302 is inserted into the groove 301, the optical filter circuit with low loss can be realized.

Figure 42:
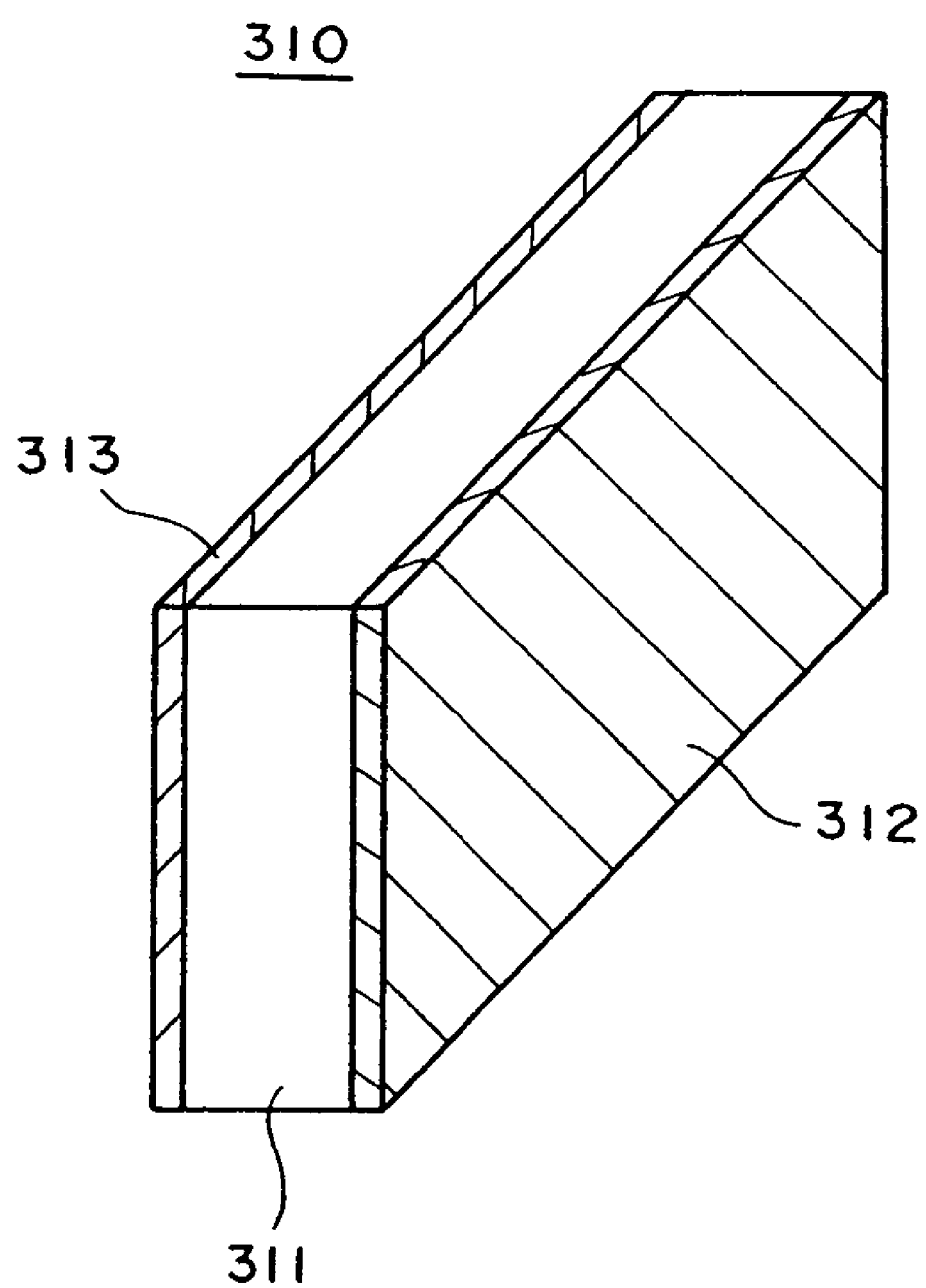
FIG. 42 is a schematic perspective view which shows the external of the optical isolator element 310.

The optical functional element inserted into such a groove 301 is of course not limited to an optical filter, and an optical isolator circuit or an optical circulator circuit can be constituted by inserting an optical isolator element including Faraday rotator or the like. For example, as shown in FIG. 42, a low-loss optical isolator element can be constituted by inserting into the groove an optical isolator element 310 equipped with a Faraday rotator 311 that rotates polarization 45 degrees and polarizers 312, 313 of different transmittance polarization directions provided on two surfaces of the Faraday rotator 311 to face each other and applying a magnetic field along the direction of the optical axis.

Figure 43:
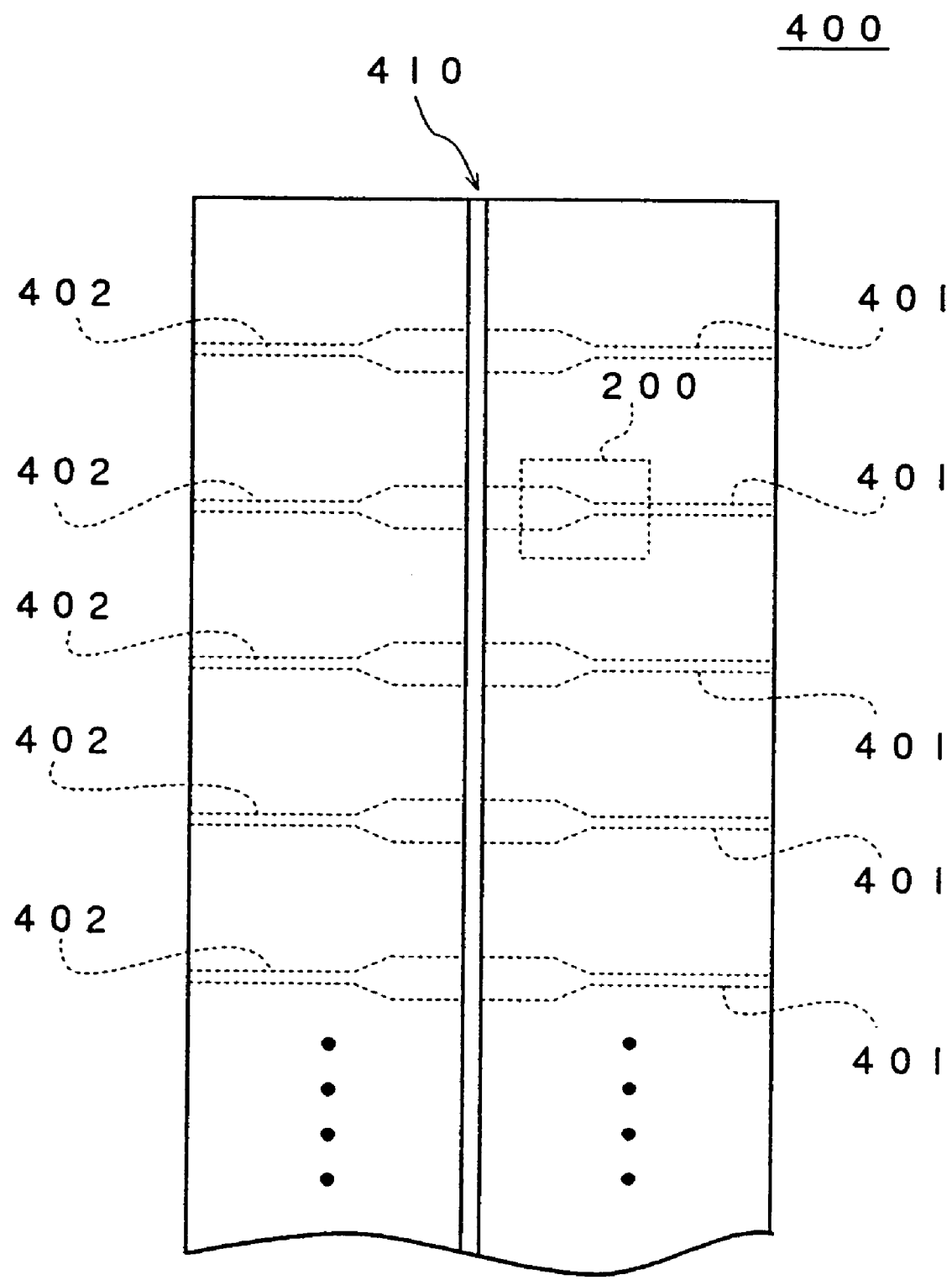
FIG. 43 is a plain view which shows the arrayed waveguide-embedded optical circuit 400 which comprises several pair of the first embedded optical waveguide and the second embedded optical waveguide.

Further, as shown in FIG. 43, in an arrayed waveguide-embedded optical circuit 400 which comprises several pairs of the first embedded optical waveguide and the second embedded optical waveguide facing each other across a groove 410, since the optical transformer 200 is provided on each of the first embedded optical waveguide and the second embedded optical waveguide, a low loss arrayed waveguide-embedded optical circuit can be realized.

Therefore, a low loss optical filter array can be realized by inserting an optical filter into the groove 410 shown in FIG. 43. In this case, the same filtering characteristic can be imparted to every channel by inserting a large optical filter into the groove 410, or inserting several optical filters corresponding to one or more channels.

In addition, an optical isolator element array can be constituted by inserting an optical isolator element into the groove 410 shown in FIG. 43. In this case, by inserting an optical isolator element in a prescribed part of the groove 410 and inserting an optical filter in remaining part of the groove 410, it can be made serve as an optical isolator circuit with respect to a certain channel or channels and to serve as an optical filter circuit with respect to the remaining channel or channels.

Figure 44:
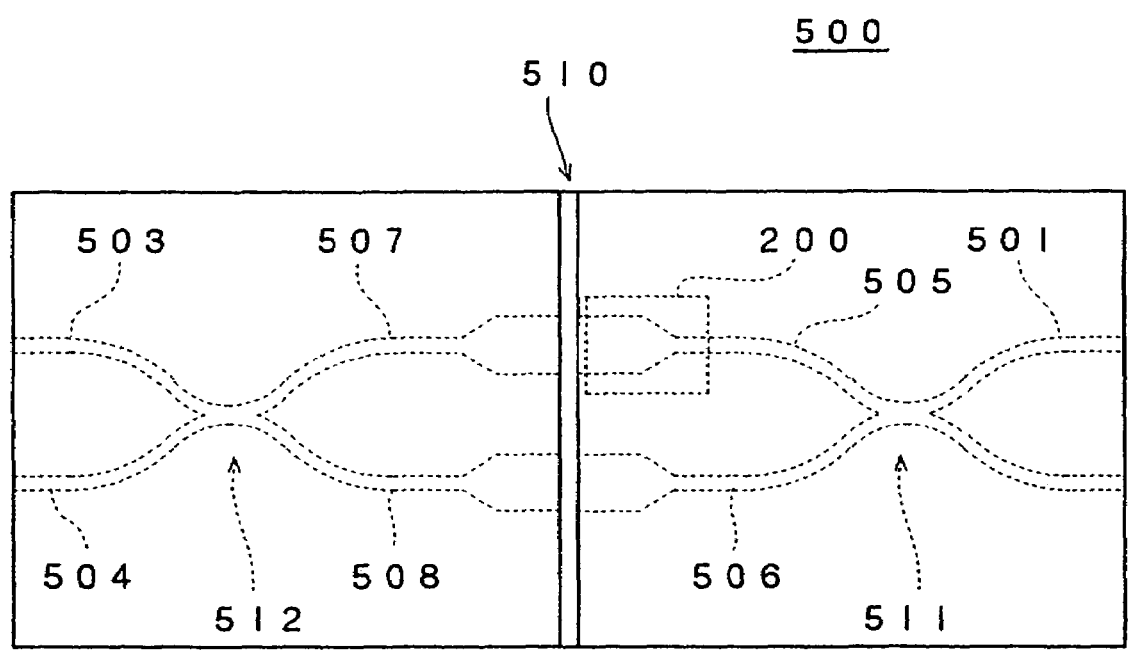
FIG. 44 is a plain view which shows the waveguide-embedded optical waveguide 500.

Further, as shown in FIG. 44, in the waveguide-embedded optical waveguide 500, which comprises a embedded optical waveguide 501–508, a groove 510 which separates the embedded optical waveguide 505 and the embedded optical waveguide 507 and separates the embedded optical waveguide 506 and the embedded optical waveguide 508 and optical combining/dividing members 511 and 512 and constitutes an interferometer, if a non-reciprocal element (not shown) consisting of a Faraday rotator which rotates polarization 45 is inserted into the groove 510 and a birefringent element provided on either side of the Faraday rotator, an optical circulator can be constituted.

The present invention has thus been shown and described with reference to specific embodiments. However, it should be noted that the present invention is in no way limited to the details of the described arrangements but changes and modifications may be made without departing from the scope of the appended claims.

For example, in the above-described, the optical resin layer 105 is formed in the part corresponding to the first optical waveguide. However, since the optical resin layer 105 serves as the second optical waveguide (second cladding), it can be omitted in the part corresponding to the first optical waveguide. And it is not necessary to use the optical resin layer 105 as the second cladding insofar as the refractive index of the optical resin layer 105 is different from the refractive index of the lower cladding layer 102 and the upper cladding layer 103 and other materials may be used.

In the above-described embodiments, the optical filter 110 is inserted into the groove 106 formed in the waveguide-embedded optical circuit 100. However, optical filters which can be inserted into the groove 106 are not limited to the optical filter 110 and other kinds of optical filters such as a Faraday rotator or the like may be used.

In the above-described embodiments, the substrate 101 is formed using silica glass. However, the substrate 101 is not limited to silica glass insofar as a beam can be effectively confined in the lower cladding layer 102 and the substrate 101 may be formed by of silicon that has silica glass layer on the surface.

In the above-described embodiments, the groove 106 is formed by dicing with a dicing machine. However, the groove 106 may be formed by forming a metal mask layer over the whole of the upper cladding layer 103 and the optical resin layer 105, applying spin-coating a photoresist on the metal mask layer, forming an etching mask for leaving parts other than that corresponding to the groove 106 and removing unnecessary portions of the optical resin layer 105, the lower cladding layer 102, the upper cladding layer 103 and the part of the substrate 101 using the etching mask.

In the above-described embodiments, silica glass or a material which includes silica as the principal ingredient is used as the material of components of the spot-size transformer 200 (e.g. upper cladding layer 202). However, other materials may be used insofar as the components corresponding to the lower cladding layer 202 and upper cladding layer 203 are formed using a material which changes its refractive index upon irradiation by a high-energy beam such as ultraviolet rays. Various photopolymers are known to undergo a change of that shows refractive index change upon exposure to a high-energy beam such as ultraviolet rays are known. One such photopolymer is silicone doped branched polysilane. When such organic materials are used, it is preferable for it to be spin-coated.

In the above-described embodiments, non-doped silica glass ($SiO_2$) is used as the material of the substrate 201. However, silicon or the like may be used on instead of the $SiO_2$ substrate and non-doped silica glass ($SiO_2$) may be formed on the surface of the substrate and used as part of the second cladding.

EXAMPLE 1

The part of the spot-size transformer seen from the groove 106 of the waveguide-embedded optical circuit 100 of the above-mentioned embodiment, that is, the spot-size transformer, was fabricated of only the substrate 101, the lower cladding layer 102-1–102-3, the upper cladding layer 103-1–103-3, the core region 104-1 and the optical resin layer 105-1. A silica glass containing germanium was used as the material of the core region 104-1 (first core) and BPSG (silica glass doped with boron and phosphorus; n=1.4558) was used as the material of the lower cladding layer 102-2 and the upper cladding layer 103-2 (first cladding=second core) and the same may be said of the lower cladding layer 102-1,102-3, and the upper cladding layer 103-1, 103-3 and an optical adhesive (n=1.4473) was used as the optical resin layer 105-1 (second cladding).

Furthermore, as the size of the core region 104-1 (first core), the length of the region corresponding to the first optical waveguide was set to 200 μm and the width and the length of the region was set to 7 μm and the length ×2 of the taper corresponding to the transition waveguide was set to 1000 μm and the width ×1 of the end of the taper was set to 0.4 μm.

Furthermore, in the layered members consisting of the lower cladding layer 102-2 and the upper cladding layer 103-2 (first core=second core), the length, the height, and the width of the layered members were 2400 μm, 35 μm, 34 μm, respectively. The 200 μm section in which the height and the width of the core region 104-1 of the first core is set constant (the part corresponding to the first optical waveguide) served as the first cladding layer and the 1200 μm section where the core region 104-1 is not present served as the second core (the part corresponding to the second optical waveguide). And the 1000 μm section in which the core region 104-1 was tapered (the part corresponding to the transition waveguide) gradually changed in function from that of the first cladding layer to that of the second core.

Figure 45:
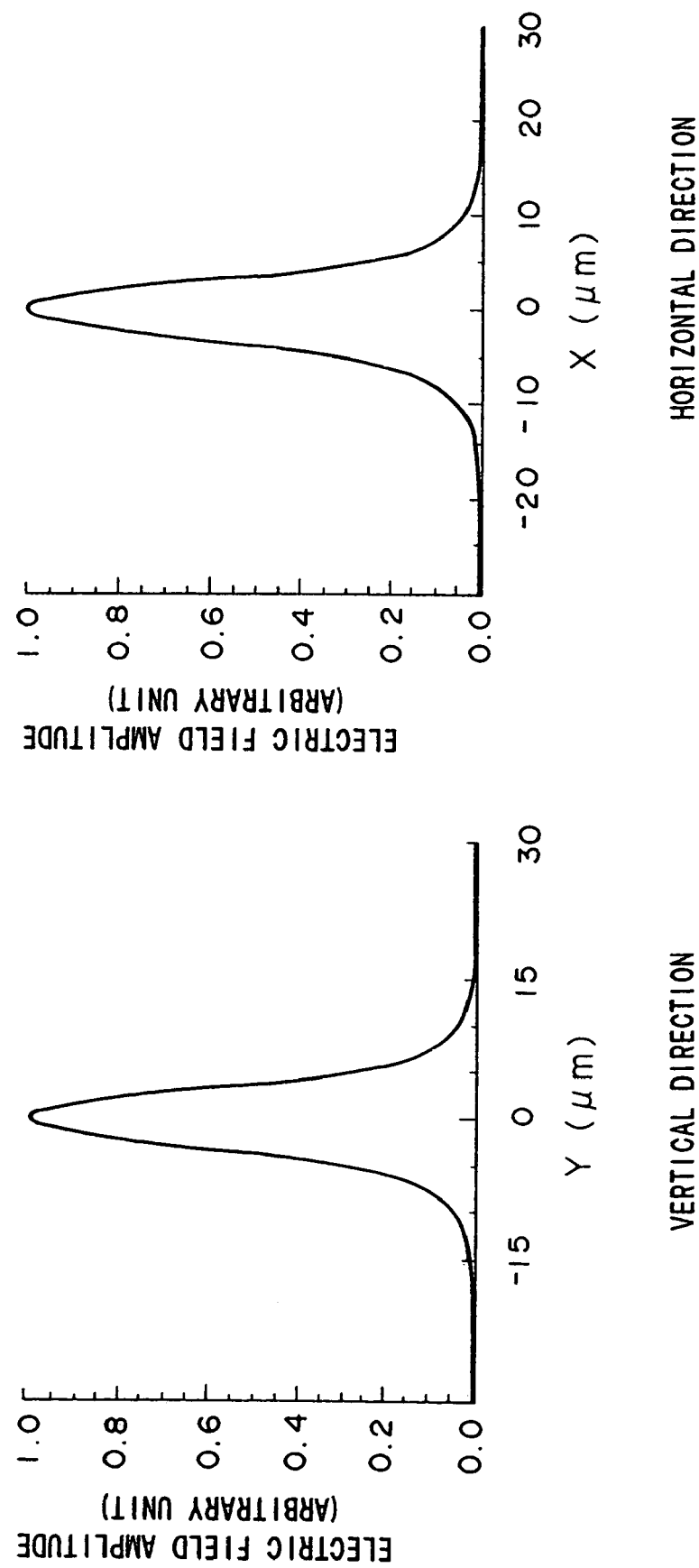
FIG. 45 is a graph which shows the optical field mode distribution of the beam inputted to the first optical waveguide in the example 1.
Figure 46:
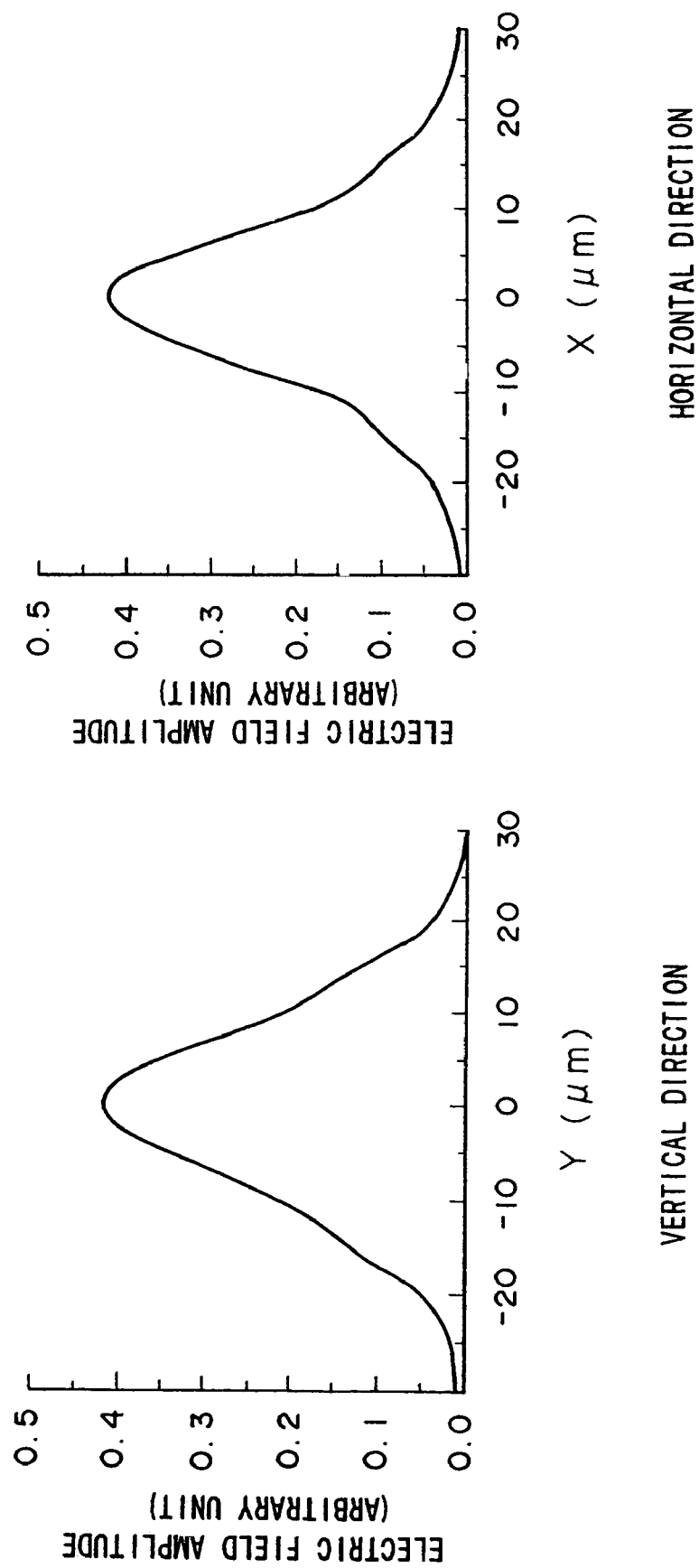
FIG. 46 is a graph which shows the optical field mode distribution of the beam outputted from the second optical waveguide in the example 1.

A beam having the optical field mode distribution shown in FIG. 45 (spot-size=about 10 μm) and the beam was input to the first optical waveguide of the spot-size transformer of such structure and optical field mode distribution of the beam output from the second optical waveguide was measured. The optical field mode distribution of the beam output from the second optical waveguide is shown in FIG. 46. As shown in FIG. 46, it was found that the spot-size of the beam output from the second optical waveguide was about 28 μm, meaning that it had been enlarged 2.8 times.

EXAMPLE 2

A waveguide-embedded optical circuit was fabricated in the same manner as in the Example 1. The two spot-size transformers included in the waveguide-embedded optical circuit in accordance with the Example 2 were of the same material and in the same size as the one in accordance with the Example 1. The width of the slit separating the two spot-size transformers was set to 400 μm.

On the other hand, as a comparative example, a waveguide-embedded optical circuit was fabricated in which the core region 104-1 was not tapered and the height and width of the core region was fixed at 7 μm. Since the spot-size was not transformed in the waveguide-embedded optical circuit according to the comparative example and all regions corresponded to the first optical waveguide, the optical resin layer 105 was not provided. That is, the waveguide-embedded optical circuit according to the comparative example corresponded to the conventional waveguide-embedded optical circuit shown FIG. 3. In the waveguide-embedded optical circuit according to the comparative example, the width of the slit separating the two spot-size transformers was set to 400 μm.

The excessive loss of a beam propagated through the groove was measured for the waveguide-embedded optical circuits according to the Example 2 and the comparative example. The excessive loss was 0.33 dB in the waveguide-embedded optical circuit according to the Example 2 and 8.1 dB in the waveguide-embedded optical circuit according to the comparative example, thus confirming that the diffraction loss by the spot-size transformer was reduced significantly in the optical circuit according to the invention.

EXAMPLE 3

A spot-size transformer having the structure of the spot-size transformer 200 shown from FIG. 23 to FIG. 28 was produced.

First, the substrate 201 was formed of silica (n=1.4460) to a thickness of about 1 mm (see FIG. 29). Next, the lower cladding layer 202 was formed of GBSG (n=1.4660) to a thickness of 14 μm and the core layer 204' was formed of GBPSG (n=1.4517) to a thickness of 7 μm. These layers were formed on the surface of the substrate 201 in the order mentioned by the CVD process (see FIG. 30), and the core region 204 was formed by pattering the core layer 204' (see FIG. 31). As the size of the core region 204 (first core), the length of the region corresponding to the first optical waveguide was set to 200 μm and the width of the region was set to 7 μm and the length $x_2$ of the taper corresponding to the transition waveguide was set to 1000 μm and the width $x_1$ of the end of the taper was set to 0.4 μm.

Next, the upper cladding layer 203 consisting of GBSG (n=1.4460) of a thickness of 17 μm was formed on the surface of the lower cladding layer 202 and the core layer 204 by the CVD process (see to FIG. 32). Then, by annealing at 1100° C. for 24 hours, the flow of the upper cladding layer 203 was flowed to flatten. By the annealing process, the thickness of the upper cladding layer 203 decreased to 14 μm. Then, the topmost cladding layer 206 consisting of GBSG (n=1.4460) of a thickness of 17 μm was formed on the surface of the upper cladding layer 203 by the CVD process (see FIG. 33).

Next, with the sputtering process, the metal mask layer 207' was formed on the topmost cladding layer 206 to a thickness of 1 μm using WS (see FIG. 34) and a metal mask 207 was pattered the metal mask layer 207' (see FIG. 35). The width of the aperture of the metal mask 207 was set to 34 μm. Next, a refractive index changing region was formed by irradiation of a KrF excimer laser beam (pulse power=10 mJ/cm$^2$) through the aperture of the metal mask 207 onto the lower cladding layer 202 and upper cladding layer 203 through the topmost cladding layer 206 for about 10 hours, with the wavelength of the laser set to 248 nm and the pulse frequency set to 20 Hz (see FIG. 36). As a result, the refractive index of the refractive index changing region was adjusted to 1.4485. In addition, the refractive index of the core region 204 also was increased to about 1.4542.

The metal mask 207 was removed from on the topmost cladding layer 206 to complete, then the spot-size transformer in accordance with Example 3 was completed.

The length of the refractive index changing region 205 was 2300 μm, and the width and the height thereof were 34 μm and 35 μm, respectively. The 200 μm section in which the height and the width of the core region 204 of the first core was set constant (the part corresponding to the first optical waveguide) served as the first cladding and the 1100 μm section where the core region 204 was not present (the part corresponding to the second optical waveguide) served as the second cladding. And the 1000 μm section in which the core region 204 was tapered (the part corresponding to the transition waveguide) gradually changed in function from that of the first cladding to that of the second core.

Figure 47:
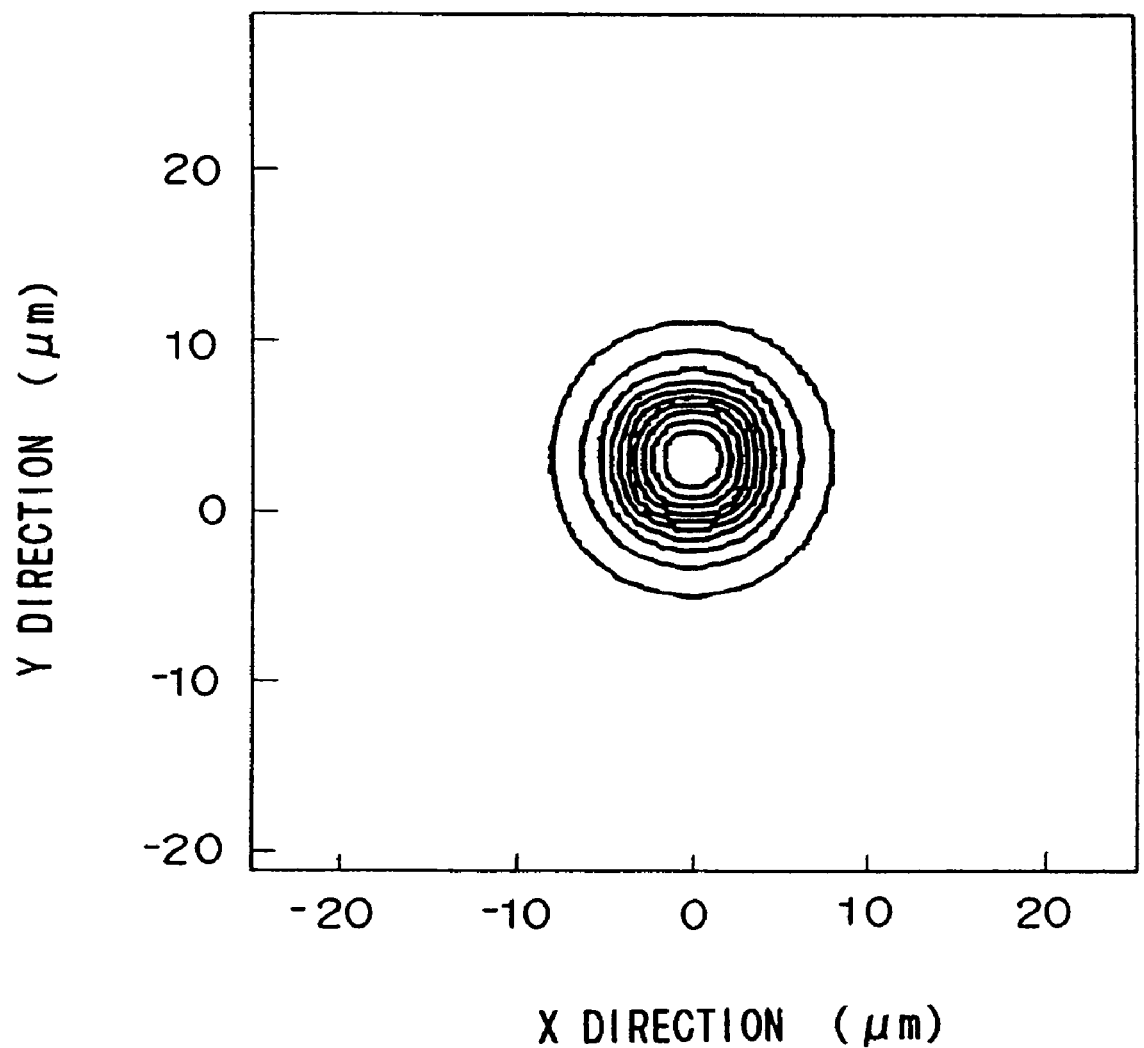
FIG. 47 is a graph which shows the optical field mode distribution of the beam inputted to the first optical waveguide in the example 3.
Figure 48:
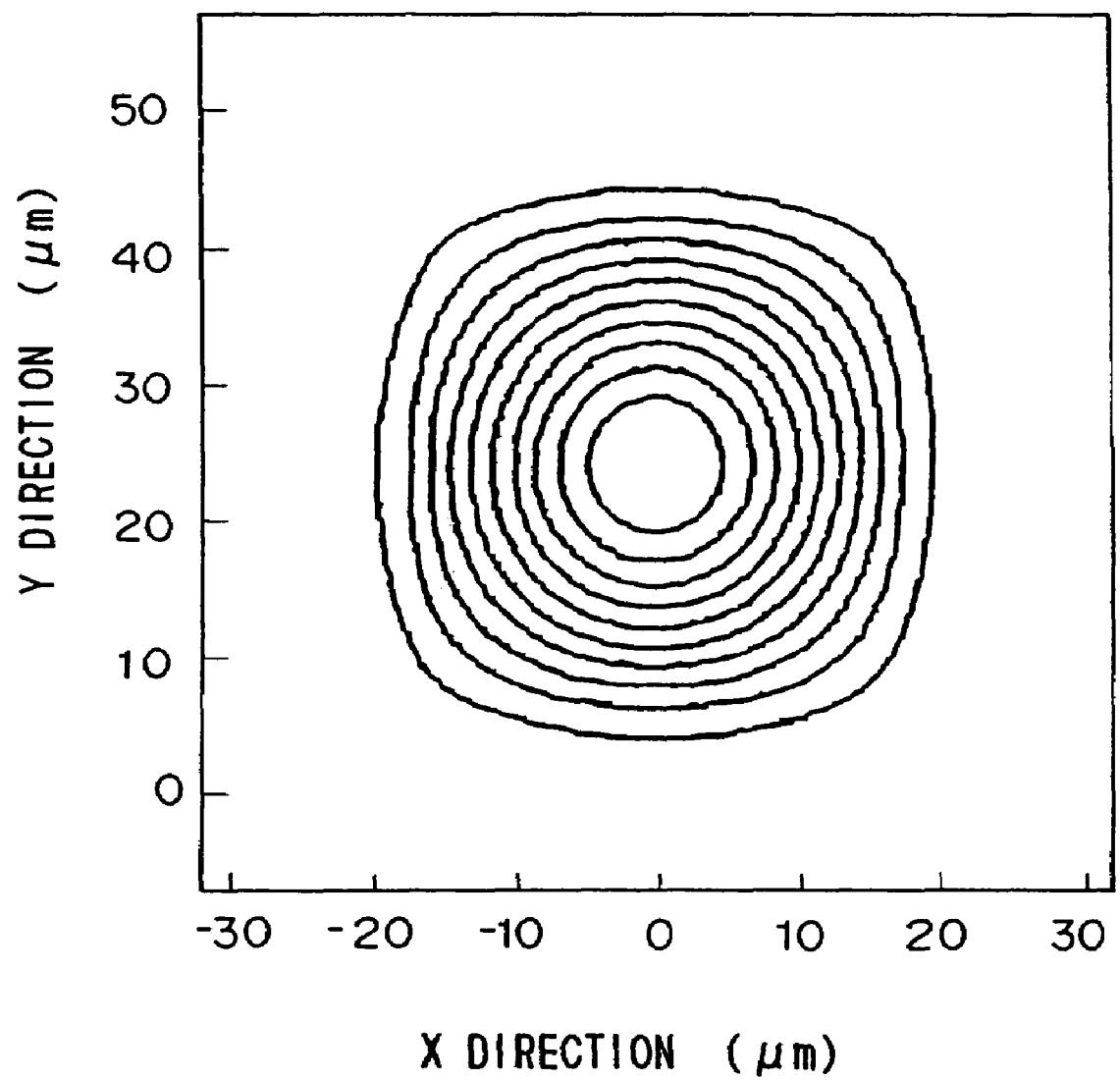
FIG. 48 is a graph which shows the optical field mode distribution of the beam outputted from the second optical waveguide in the example 3.

A beam having the optical field mode distribution shown in FIG. 47 (spot-size=about 10 μm) and a wavelength of 1550 μm was input to the first optical waveguide of the spot-size transformer of this structure, and optical field mode distribution of the beam output from the second optical waveguide was measured. The optical field mode distribution of the beam output from the second optical waveguide is shown in FIG. 48. As shown in FIG. 48, the spot-size of the beam output from the second optical waveguide was found to be about 28 μm, meaning that it had been enlarged 2.8 times.

EXAMPLE 4

A waveguide-embedded optical circuit having the structure of the waveguide-embedded optical circuit 300 shown in FIG. 37 to FIG. 39 was produced. The two spot-size transformers included in the waveguide-embedded optical circuit in accordance with Example 3 were of the same material and same size as the one in accordance with the Example 3, and differed therefrom only in that the irradiating energy of the KrF excimer laser was set to various values. The width of the groove separating the two spot-size transformers was set to 400 μm, and an optical resin having a refractive index of 1.447 was filled in the groove. As for the irradiating energy of the KrF excimer laser, the pulse power was set to 40 mJ/cm$^2$ and the frequency to 20 Hz. The irradiation time was changed for each sample.

The relation between the total irradiation energy of the KrF excimer laser and insertion loss was evaluated by transmitting the light with the wavelength of 1550 μm from one spot-size transformer of the first optical waveguide to the other spot-size transformer of the first optical waveguide for each sample.

Figure 49:
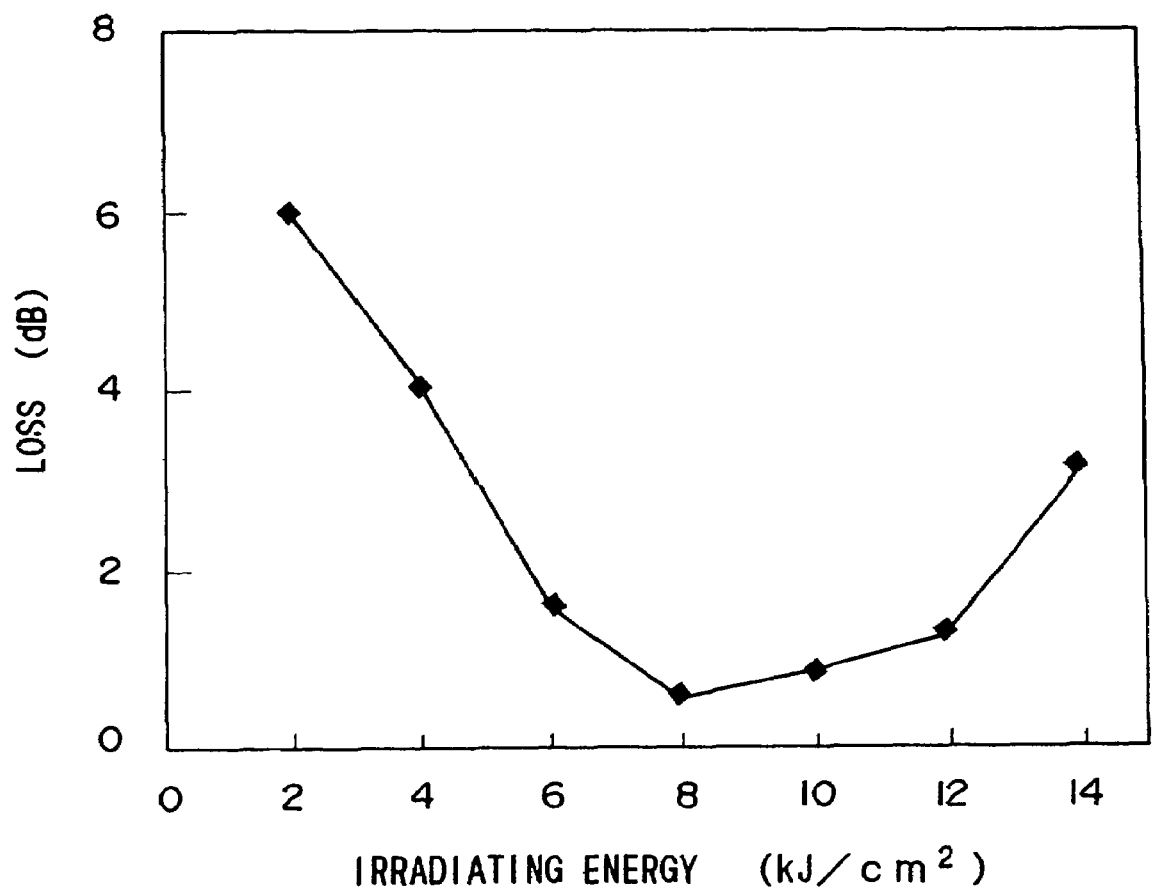
FIG. 49 is a graph which shows the relation between the total irradiation energy of the KrF excimer laser and insertion loss.

FIG. 49 is a graph showing the relation between the total irradiation energy of the KrF excimer laser and insertion loss. As shown in FIG. 49, when the total energy of the KrF excimer laser was 6 mJ/cm$^2$–12 mJ/cm$^2$, the insertion loss became small, and in particular, when it was 8 mJ/cm$^2$, the insertion loss became smallest (0.51 dB). It was found that when the materials mentioned were used to constitute the components of the spot-size transformer, it was preferable to set the irradiation energy of the KrF excimer laser at 6 mJ/cm$^2$–12 mJ/cm$^2$, and more preferable to set it at about 8 mJ/cm$^2$.

On the other hand, as a comparative example a waveguide-embedded optical circuit was fabricated in which the core region 204 was not tapered and the height and the width of the core region 204 was fixed at 7 μm. Since the spot-size was not transformed in the waveguide-embedded optical circuit according to the comparative example and all regions corresponded to the first optical waveguide, formation of the refractive index changing region by irradiating ultraviolet ray was not formed. In the waveguide-embedded optical circuit according to the comparative example, the width of the groove separating the two spot-size transformers was set to 400 μm, and an optical resin which had a refractive index of 1.447 was filled in the groove. When a light with a wavelength of 1550 μm was transmitted through the waveguide-embedded optical circuit of the comparative example, the insertion loss was became very large (8.1 dB).

The invention claimed is:

1. A spot-size transformer comprising:
    a first optical waveguide having a first core and a first cladding having an upper portion and a lower portion of a same material covering substantially a whole surface of the first core, the first core having a surface region and a first axis and the first cladding having a second axis;
    a second optical waveguide having a second cladding and a second core, the second core being a continuation of the upper and the lower portions of the first cladding; and
    a transition region between the first and second optical waveguides, the transition region having an extension of the first core whose width becomes gradually narrower as it extends toward the second optical waveguide.

2. The spot-size transformer in accordance with claim 1, wherein each of the first optical waveguide and the optical waveguide is channel-type.

3. The spot-size transformer in accordance with claim 2, wherein a center of the first core and a center of the second core are positioned substantially on a common axis.

4. The spot-size transformer in accordance with claim 3, wherein the first cladding has at least a lower portion positioned under the first core and an upper portion positioned above the first core.

5. The spot-size transformer in accordance with claim 4, wherein a bottom of the first core is in contact with the lower portion and a top surface and both sides of the first core are in contact with the upper portion.

6. The spot-size transformer in accordance with claim 5, wherein an end face of the second core is substantially rectangular.

7. The spot-size transformer in accordance with claim 1, wherein a section with the first cladding and a part constituting the second core that is an extension thereof substantially perpendicular to the first axis of the first core are rectangular.

8. The spot-size transformer in accordance with claim 2, wherein a section with the first cladding and a part constituting the second core that is an extension thereof substantially perpendicular to the first axis of the first core are rectangular.

9. The spot-size transformer in accordance with claim 3, wherein a section with the first cladding and a part constituting the second core that is an extension thereof substantially perpendicular to the first axis of the first core are rectangular.

10. The spot-size transformer in accordance with claim 4, wherein a section with the first cladding and a part constituting the second core that is an extension thereof substantially perpendicular to the first axis of the first core are rectangular.

11. The spot-size transformer in accordance with claim 5, wherein a section with the first cladding and a part constituting the second core that is an extension thereof substantially perpendicular to the first axis of the first core are rectangular.

12. The spot-size transformer in accordance with claim 6, wherein a section with the first cladding and a part constituting the second core that is an extension thereof substantially perpendicular to the first axis of the first core are rectangular.

13. The spot-size transformer in accordance with claim 12, wherein the first core has a shape obtained by omitting the extension of the first core whose width becomes gradually narrower.

14. The spot-size transformer in accordance with claim 13, wherein the second cladding is formed of a ladder silicone.

15. The spot-size transformer in accordance with claim 13, wherein the second cladding is formed of a silica glass.

16. The spot-size transformer in accordance with claim 15, wherein the second cladding is formed using a thin film process selected from a group consisting of a CVD process, a sputtering process, a vacuum deposition process, a FHD process and a sol-gel process.

17. A spot-size transformer, comprising: a first optical waveguide having a first core and a first cladding having an upper portion and a lower portion of a same material covering the first core;
- a second optical waveguide having a second core and a second cladding covering the second core, wherein the second core is a continuation of the upper and the lower portions of the first cladding;
- a transition waveguide which is positioned between the first and the second optical waveguides;
- wherein a light propagated into the first optical waveguide has a first optical field distribution;
- wherein a light propagated into the second optical waveguide has a second optical field distribution;
- wherein the transition waveguide changes from the first optical field to the second optical field gradually or changes from the second optical field to the first optical field gradually;
- and wherein the second core covers the first core at least in a part corresponding to the transition waveguide and includes a region where a refractive index is changed by irradiating energy beam.

18. The spot-size transformer in accordance with claim 17, wherein a width of the part of the first core that corresponds to the transition waveguide becomes gradually narrower as it goes toward the second optical waveguide.

19. The spot-size transformer in accordance with claim 18, wherein a part of at least the first cladding is provided as an extension of the second core.

20. The spot-size transformer in accordance with claim 19, wherein the second cladding has a part which comprises substantially non-doped silica glass and a second part which comprises silica glass containing at least germanium (Ge).

21. The spot-size transformer in accordance with claim 20, wherein the second part further contains a first element which reduces refractive index.

22. The spot-size transformer in accordance with claim 21, wherein refractive indexes of the first part and the second part are substantially equal.

23. The spot-size transformer in accordance with claim 22, wherein the first core comprises a material in which at least germanium (Ge), a first element and a second element which raise its refractive index are contained in silica glass.

24. The spot-size transformer in accordance with claim 23, wherein the first element is boron (B) and the second element is phosphorus (P).

25. The spot-size transformer in accordance with claim 24, wherein the first optical waveguide and the second optical waveguide are channel-type and a center of the first core and a center of the second core are located approximately on a same axis.

* * * * *